US010671275B2

(12) United States Patent
Chaudhri et al.

(10) Patent No.: US 10,671,275 B2
(45) Date of Patent: Jun. 2, 2020

(54) USER INTERFACES FOR IMPROVING SINGLE-HANDED OPERATION OF DEVICES

(71) Applicant: Apple Inc., Cupertino, CA (US)

(72) Inventors: Imran Chaudhri, San Francisco, CA (US); Daniel Tyler Kurtz, Sunnyvale, CA (US); Jacob Xiao, Los Gatos, CA (US); Jason C. Beaver, San Jose, CA (US); Elisabeth J. Kain, Santa Clara, CA (US); Balaji Sarpeshkar, San Mateo, CA (US); Kenneth Luke Kocienda, San Jose, CA (US); Freddy Allen Anzures, San Francisco, CA (US); Andrew Wadycki, San Mateo, CA (US); Joshua Hal Shaffer, Woodside, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/502,275

(22) Filed: Sep. 30, 2014

(65) Prior Publication Data
US 2016/0070466 A1 Mar. 10, 2016

Related U.S. Application Data

(60) Provisional application No. 62/045,971, filed on Sep. 4, 2014.

(51) Int. Cl.
*G06F 3/0488* (2013.01)
*G06F 3/0489* (2013.01)
(Continued)

(52) U.S. Cl.
CPC ........ *G06F 3/04886* (2013.01); *G06F 3/0484* (2013.01); *G06F 3/0488* (2013.01);
(Continued)

(58) Field of Classification Search
CPC .............. G06F 3/04886; G06F 3/0484; G06F 3/04842; G06F 3/0488; G06F 3/04883; G06F 3/04897
See application file for complete search history.

(56) References Cited

U.S. PATENT DOCUMENTS 5,533,180 A   7/1996  Zhou et al.
5,572,647 A   11/1996 Blades
(Continued)

FOREIGN PATENT DOCUMENTS

CN   101170764 A   4/2008
CN   102830914 A   12/2012
(Continued)

OTHER PUBLICATIONS

Norman, Donald A. The Design of Everyday Things. Basic Books, 2013.*
(Continued)

*Primary Examiner* — Justin R. Blaufeld
(74) *Attorney, Agent, or Firm* — Dentons US LLP

(57) ABSTRACT

The embodiments herein describe a mode of applications on the portable electronic device that improves single-handed operation of the devices. For example, the embodiments herein describe an ergonomic mode of an application that displays the graphical user interface (GUI) of the application in a bottom area of the display screen of the electronic device to allow the user to more easily interact with objects. The embodiments herein also describe an ergonomic mode of a keyboard displayed on the display screen of the portable electronic device. During the ergonomic mode of the keyboard, the keyboard is shifted towards a vertical edge of the display screen to allow a user to more easily reach keys of the keyboard that were previously unreachable without the
(Continued)

user switching to two handed operation of the device or repositioning the electronic device in the user's hand.

48 Claims, 56 Drawing Sheets

(51) Int. Cl.
- *G06F 3/0484* (2013.01)
- *H04M 1/725* (2006.01)
- *H04M 1/02* (2006.01)

(52) U.S. Cl.
CPC ...... *G06F 3/04842* (2013.01); *G06F 3/04883* (2013.01); *G06F 3/04897* (2013.01); *H04M 1/72519* (2013.01); *G06F 2203/04805* (2013.01); *G06F 2203/04806* (2013.01); *H04M 1/0281* (2013.01)

(56) References Cited

U.S. PATENT DOCUMENTS

| | | | |
|---|---|---|---|
| 5,917,480 A | 6/1999 | Tafoya et al. | |
| 6,147,674 A | 11/2000 | Rosenberg et al. | |
| 6,232,972 B1 | 5/2001 | Arcuri et al. | |
| 6,256,649 B1 | 7/2001 | Mackinlay et al. | |
| 6,259,436 B1 | 7/2001 | Moon et al. | |
| 6,300,967 B1 | 10/2001 | Wagner et al. | |
| 6,330,004 B1 | 12/2001 | Matsuzawa et al. | |
| 6,417,855 B1 | 7/2002 | Yonts | |
| 6,433,801 B1 | 8/2002 | Moon et al. | |
| 6,448,985 B1 | 9/2002 | McNally | |
| 6,734,882 B1 | 5/2004 | Becker | |
| 6,833,827 B2 | 12/2004 | Lui et al. | |
| 6,904,570 B2 | 6/2005 | Foote | |
| 7,080,324 B1 | 7/2006 | Nelson et al. | |
| 7,184,028 B2 | 2/2007 | Wu et al. | |
| 7,215,436 B2 | 5/2007 | Hull et al. | |
| 7,395,089 B1* | 7/2008 | Hawkins | H04M 1/0245 455/556.1 |
| 7,444,599 B1 | 10/2008 | Chaudhri et al. | |
| 7,571,384 B1 | 8/2009 | Webb | |
| 7,665,038 B1 | 2/2010 | Chaudhri et al. | |
| 7,665,039 B2 | 2/2010 | Chaudhri et al. | |
| 7,737,996 B2 | 6/2010 | Gerhard et al. | |
| 7,768,501 B1 | 8/2010 | Maddalozzo, Jr. et al. | |
| 7,992,101 B1 | 8/2011 | Chaudhri et al. | |
| 7,996,045 B1* | 8/2011 | Bauer | G06F 3/0488 455/566 |
| 8,707,201 B1* | 4/2014 | Aradhye | G06Q 10/107 715/789 |
| 8,799,775 B2 | 8/2014 | Weeldreyer et al. | |
| 9,423,856 B2* | 8/2016 | DeLuca | G06F 1/3206 |
| 2002/0089536 A1 | 7/2002 | Dang | |
| 2003/0038821 A1 | 2/2003 | Kraft | |
| 2003/0063073 A1 | 4/2003 | Geaghan et al. | |
| 2003/0110120 A1 | 6/2003 | Salehi | |
| 2003/0193484 A1 | 10/2003 | Lui et al. | |
| 2003/0223182 A1 | 12/2003 | Yurugi | |
| 2004/0017394 A1 | 1/2004 | Adachi | |
| 2004/0066422 A1 | 4/2004 | Chandane | |
| 2004/0194014 A1 | 9/2004 | Anwar | |
| 2004/0217944 A1 | 11/2004 | Kong | |
| 2004/0244037 A1 | 12/2004 | Yamaguchi et al. | |
| 2005/0024322 A1 | 2/2005 | Kupka | |
| 2005/0024341 A1 | 2/2005 | Gillespie et al. | |
| 2005/0278475 A1 | 12/2005 | Karatel et al. | |
| 2006/0007174 A1 | 1/2006 | Shen | |
| 2006/0017852 A1 | 1/2006 | Iwaki | |
| 2006/0026535 A1 | 2/2006 | Hotelling et al. | |
| 2006/0052885 A1 | 3/2006 | Kong | |
| 2006/0064643 A1 | 3/2006 | Hariton | |
| 2006/0069635 A1 | 3/2006 | Ram et al. | |
| 2006/0123353 A1* | 6/2006 | Matthews | G06F 3/0481 715/779 |
| 2006/0212806 A1 | 9/2006 | Griffin et al. | |
| 2006/0218500 A1* | 9/2006 | Sauve | G06F 3/0481 715/767 |
| 2006/0267957 A1 | 11/2006 | Kolmykov-Zotov et al. | |
| 2007/0113201 A1 | 5/2007 | Bales et al. | |
| 2007/0126741 A1 | 6/2007 | Gerhard et al. | |
| 2007/0186158 A1 | 8/2007 | Kim et al. | |
| 2007/0229476 A1 | 10/2007 | Huh | |
| 2008/0057926 A1 | 3/2008 | Forstall et al. | |
| 2008/0094356 A1 | 4/2008 | Ording et al. | |
| 2008/0165160 A1 | 7/2008 | Kocienda et al. | |
| 2008/0168349 A1* | 7/2008 | Lamiraux | G06F 3/0482 715/702 |
| 2008/0195951 A1 | 8/2008 | Oshiro et al. | |
| 2008/0276161 A1 | 11/2008 | Slavens | |
| 2009/0077464 A1 | 3/2009 | Goldsmith et al. | |
| 2009/0144651 A1 | 6/2009 | Sprang et al. | |
| 2009/0144656 A1 | 6/2009 | Kwon et al. | |
| 2009/0193366 A1 | 7/2009 | Davidson | |
| 2009/0292989 A1 | 11/2009 | Matthews et al. | |
| 2010/0031202 A1 | 2/2010 | Morris et al. | |
| 2010/0241985 A1* | 9/2010 | Kim | G06F 3/04886 715/773 |
| 2010/0248788 A1* | 9/2010 | Yook | G06F 3/0481 455/566 |
| 2010/0259561 A1 | 10/2010 | Forutanpour et al. | |
| 2010/0269029 A1 | 10/2010 | Siegel et al. | |
| 2010/0323762 A1* | 12/2010 | Sindhu | G06F 1/1613 455/566 |
| 2011/0252350 A1* | 10/2011 | Chaudhri | G06F 9/451 715/784 |
| 2011/0283225 A1 | 11/2011 | Chaudhri et al. | |
| 2012/0079586 A1* | 3/2012 | Brown | G06F 21/31 726/16 |
| 2012/0081375 A1 | 4/2012 | Robert et al. | |
| 2012/0117505 A1* | 5/2012 | Koch | G06F 3/04886 715/773 |
| 2012/0117507 A1* | 5/2012 | Tseng | H04M 1/72552 715/774 |
| 2012/0131321 A1* | 5/2012 | Jitkoff | G06F 3/0483 713/2 |
| 2012/0185762 A1* | 7/2012 | Ozer | G06F 17/2288 715/229 |
| 2012/0185781 A1* | 7/2012 | Guzman | G06Q 10/107 715/752 |
| 2012/0198524 A1* | 8/2012 | Celebisoy | G06F 21/6263 726/5 |
| 2012/0236035 A1* | 9/2012 | Kimura | H04M 1/0239 345/660 |
| 2012/0290972 A1* | 11/2012 | Yook | G06F 3/0482 715/800 |
| 2012/0291068 A1* | 11/2012 | Khushoo | H04L 12/282 725/38 |
| 2013/0057475 A1* | 3/2013 | Duggan | G06F 3/04886 345/168 |
| 2013/0132870 A1* | 5/2013 | Vishnubhatta | G06F 3/0481 715/762 |
| 2013/0181902 A1* | 7/2013 | Hinckley | G06F 1/1684 345/168 |
| 2013/0271447 A1* | 10/2013 | Setlur | G06F 1/1626 345/418 |
| 2013/0285933 A1* | 10/2013 | Sim | G06F 3/04883 345/173 |
| 2013/0290856 A1 | 10/2013 | Beveridge et al. | |
| 2013/0307801 A1* | 11/2013 | Nam | G06F 3/041 345/173 |
| 2013/0339830 A1* | 12/2013 | Yuan | G06F 3/0485 715/209 |
| 2014/0022183 A1* | 1/2014 | Ayoub | H04W 4/023 345/173 |
| 2014/0053090 A1 | 2/2014 | Lu et al. | |
| 2014/0109022 A1* | 4/2014 | Wei | G06F 3/0488 715/863 |
| 2014/0204063 A1* | 7/2014 | Kaida | G06F 1/169 345/184 |
| 2014/0208128 A1* | 7/2014 | Gyorfi | G06F 9/542 713/300 |

(56) References Cited

U.S. PATENT DOCUMENTS

| | | | |
|---|---|---|---|
| 2014/0208333 A1* | 7/2014 | Beals | G06F 9/542 719/318 |
| 2014/0267233 A1* | 9/2014 | Lee | G06F 1/1639 345/419 |
| 2014/0289637 A1 | 9/2014 | Coviello et al. | |
| 2014/0337791 A1* | 11/2014 | Agnetta | G06F 3/0346 715/784 |
| 2015/0095826 A1* | 4/2015 | Ahn | G06F 3/0488 715/769 |
| 2015/0160849 A1* | 6/2015 | Weiss | G06F 3/044 345/174 |
| 2015/0234581 A1* | 8/2015 | Terrero | G06F 3/04847 715/863 |
| 2015/0248200 A1* | 9/2015 | Cho | G06F 3/0482 715/773 |
| 2015/0253984 A1* | 9/2015 | Zhang | G06F 1/1643 715/771 |
| 2015/0278388 A1 | 10/2015 | Markov et al. | |
| 2015/0293659 A1* | 10/2015 | Yoo | G06F 3/04817 715/765 |
| 2015/0346973 A1 | 12/2015 | Shaffer et al. | |
| 2016/0048294 A1* | 2/2016 | Micheva | G06F 3/04817 715/739 |
| 2016/0048319 A1* | 2/2016 | Micheva | G06F 3/04883 715/863 |
| 2016/0085401 A1* | 3/2016 | Takimoto | G06F 3/0485 715/765 |

FOREIGN PATENT DOCUMENTS

| | | |
|---|---|---|
| CN | 103635873 A | 3/2014 |
| CN | 104007930 A | 8/2014 |
| EP | 3076277 B1 | 3/2019 |

OTHER PUBLICATIONS

Mcgrenere, Joanna & Ho, Wayne. (2000). Affordances: Clarifying and Evolving a Concept. Proceedings of the Graphics Interface 2000 Conference. 179-186.*

Non-Final Office Action in U.S. Appl. No. 12/559,782 dated Jul. 31, 2012.*

Non-Final Office Action in U.S. Appl. No. 12/806,398 dated Feb. 15, 2012.*

PCT International Search Report and Written Opinion for PCT/US2015/037763, dated Jan. 4, 2016, 17 Pages.

"LG G2 review: Beautiful monster", GSMArena Team, Sep. 7, 2013, 7 Pages, [Online], [Retrieved from the Internet Mar. 18, 2015], Retrieved from the Internet, < http://www.gsmarena.com/lg_g2-review-982p4.php >.

"LG G Pro 2 review: See you 2morrow", GSMArena Team, Mar. 4, 2014, 7 Pages, [Online], [Retrieved from the Internet Mar. 18, 2015], Retrieved from the Internet, < http://www.gsmarena.com/lg_g_pro_2-review-1056p4.php >.

One-Handed Operation use for all screens on Note 2, You Tube, Nov. 5, 2013, 2 Pages, [Online], [Retrieved from the Internet Mar. 18, 2015], Retrieved from the Internet, < https://www.youtube.com/watch?v=oPYuc0-HCmU >.

"Samsung patents a nifty thumb-friendly interface for one-handed operation", Android Top News, Dec. 2, 2013, 5 Pages, [Online], [Retrieved from the Internet Mar. 18, 2015], Retrieved from the Internet, < http://androidtopnews.com/samsung-patents-a-nifty-thumb-friendly-interface-for-one-handed-operation/ >.

PCT Written Opinion of the International Preliminary Examining Authority for PCT/US2015/037763, dated Sep. 23, 2016, 10 Pages.

Final Office Action received for U.S. Appl. No. 12/725,365, dated Feb. 14, 2013, 23 Pages.

Final Office Action received for U.S. Appl. No. 10/101,302, dated Jun. 15, 2005, 13 pages.

Final Office Action received for U.S. Appl. No. 11/643,228, dated Nov. 12, 2009, 20 pages.

Final Office Action received for U.S. Appl. No. 11/643,228, dated Oct. 12, 2010, 26 pages.

Final Office Action received for U.S. Appl. No. 11/643,315, dated Jun. 9, 2009, 17 pages.

Final Office Action received for U.S. Appl. No. 13/194,291, dated Jan. 15, 2014, 31 pages.

International Preliminary Report on Patentability received for PCT Patent Application No. PCT/US2015/037763, dated Jan. 2, 2017, 12 pages.

Microsoft Office 2000, (1983-1999), 68 pages.

Non Final Office Action received for U.S. Appl. No. 12/725,365, dated Jun. 11, 2012, 25 pages.

Non-Final Office Action received for U.S. Appl. No. 11/643,228, dated Jan. 21, 2009, 13 pages.

Non Final Office Action received for U.S. Appl. No. 12/725,365, dated Nov. 6, 2013, 14 pages.

Non-Final Office Action received for U.S. Appl. No. 13/194,291, dated Aug. 5, 2013, 29 pages.

Non-Final Office Action received for U.S. Appl. No. 12/259,233, dated Mar. 18, 2009, 18 pages.

Non-Final Office Action received for U.S. Appl. No. 10/101,302, dated Nov. 8, 2004, 14 pages.

Non-Final Office Action received for U.S. Appl. No. 11/643,228, dated Apr. 27, 2010, 24 pages.

Non-Final Office Action received for U.S. Appl. No. 11/643,315, dated Jan. 21, 2009, 13 pages.

Non-Final Office Action received for U.S. Appl. No. 14/690,009, dated Aug. 10, 2017, 26 pages.

Notice of Allowance received for U.S. Appl. No. 12/725,365, dated Mar. 21, 2014, 7 pages.

Notice of Allowance received for U.S. Appl. No. 10/101,302, dated Jun. 26, 2008, 14 pages.

Notice of Allowance received for U.S. Appl. No. 11/643,228, dated Mar. 29, 2011, 19 pages.

Notice of Allowance received for U.S. Appl. No. 11/643,315, dated Oct. 1, 2009, 19 pages.

Notice of Allowance received for U.S. Appl. No. 12/259,233, dated Oct. 2, 2009, 21 pages.

Non Final Office Action received for U.S. Appl. No. 11/643,228, dated Jul. 7, 2009, 5 pages.

Oracle VM Virtual Box®, User Manual, Oracle Corporation, available at http://download.virtualbox.org/virtualbox/4.2.0/UserManual.pdf, 2012, 316 pages.

Non-Final Office Action received for U.S. Appl. No. 14/690,009, dated Oct. 4, 2018, 34 pages.

Final Office Action received for U.S. Appl. No. 14/690,009, dated Jun. 1, 2018, 34 pages.

Microsoft Corporation, Microsoft Internet Explorer, version 6.0. 2800.1106CO, 2001, pp. 1-5.

Raghavendar, T.S, "Resolution Vs Pixel Density in Displays—All You Need to Know", "Technology Source", Available at: http://teknosrc.com/resolution-vs-pixel-density-in-displays-all-you-need-to-know/, Dec. 11, 2013, 6 pages.

Office Action received for European Patent Application No. 15739093.1, dated Apr. 24, 2019, 7 pages.

Office Action received for Chinese Patent Application No. 201580046789.7, dated Jul. 22, 2019, 23 pages (8 page of English Translation and 15 pages of Official Copy).

Summons to Attend Oral Proceedings received for European Patent Application No. 15739093.1, dated Feb. 28, 2020, 9 pages.

* cited by examiner

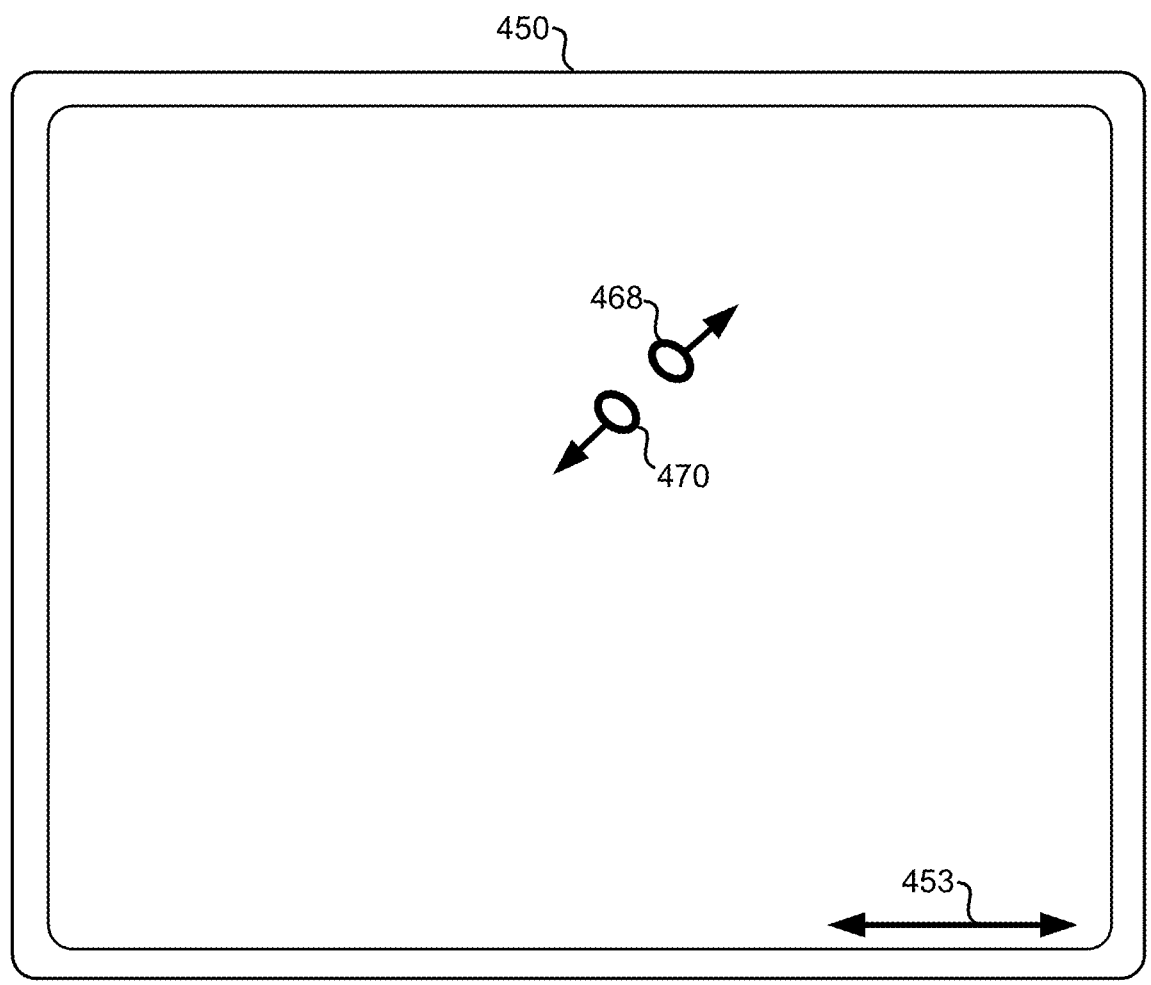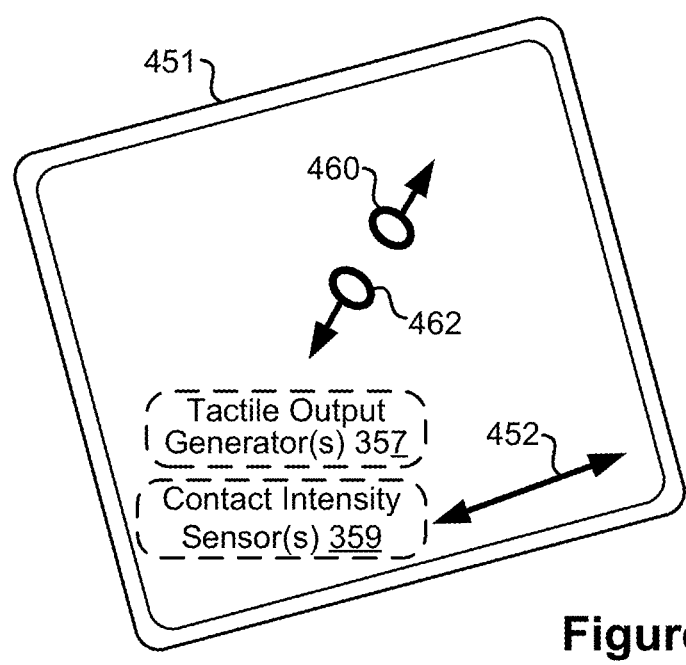
Figure 4B

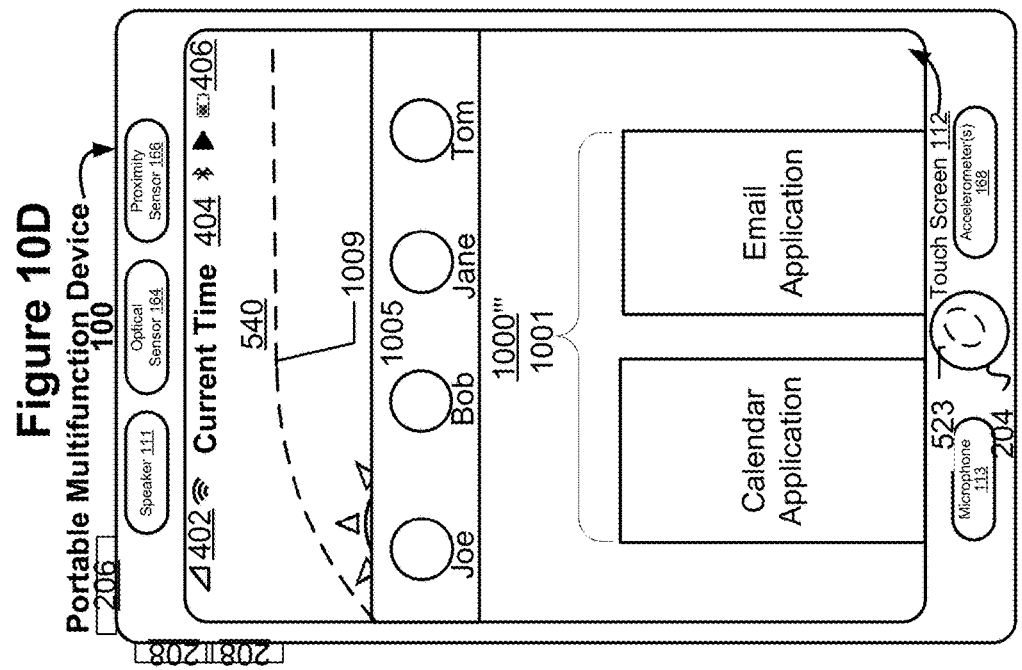
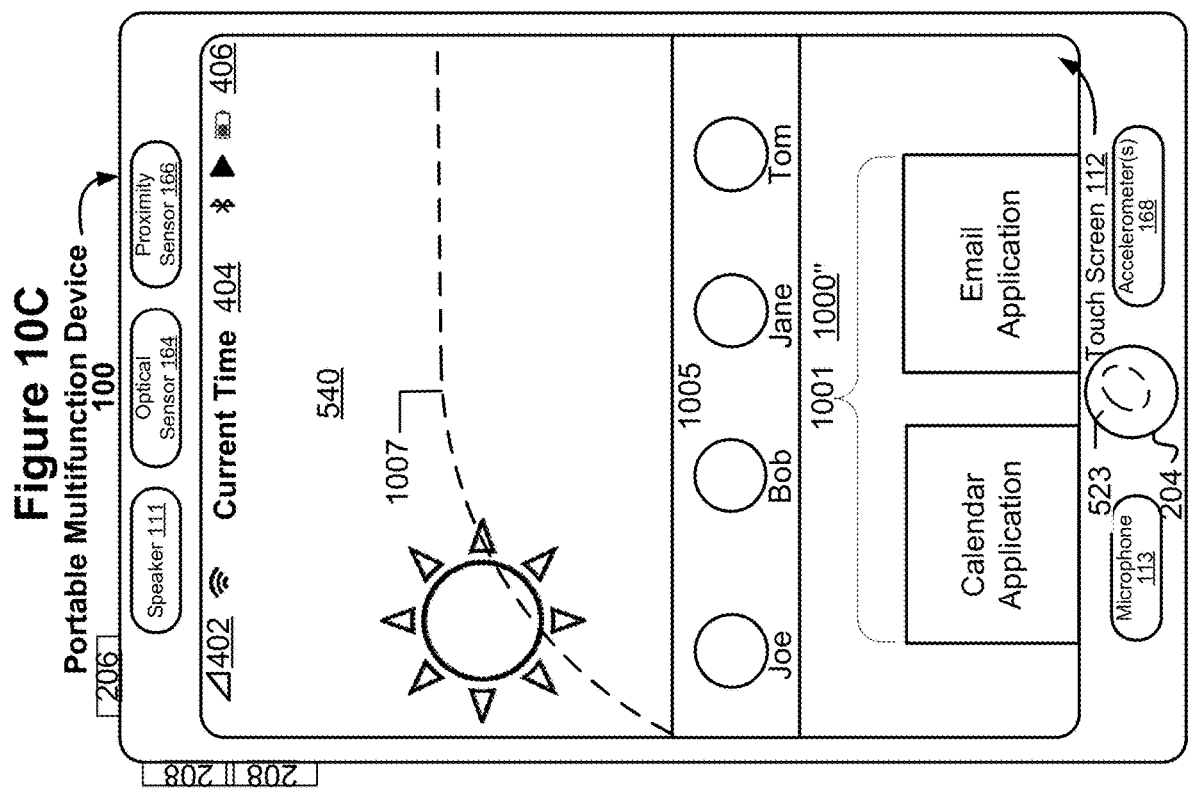

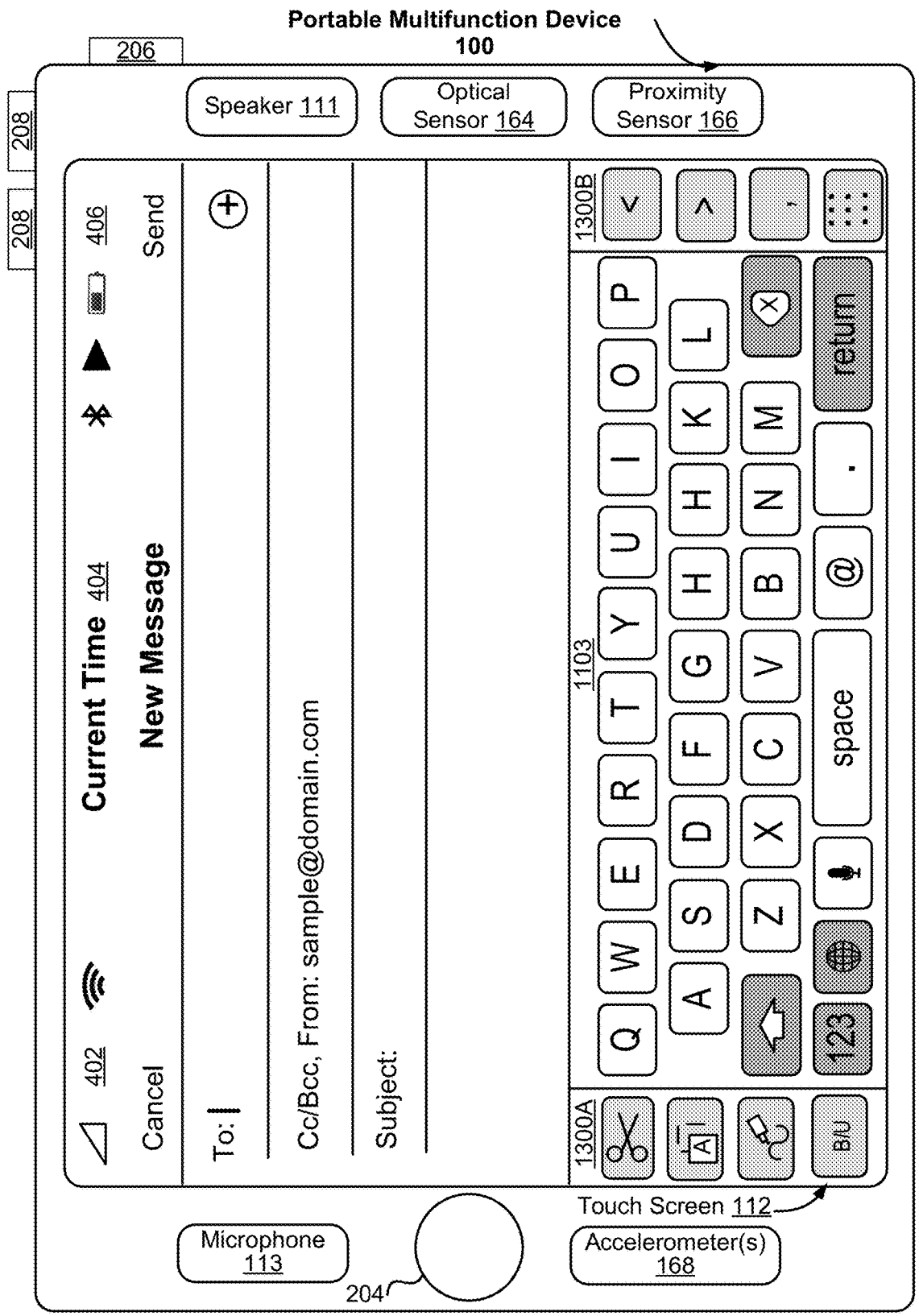

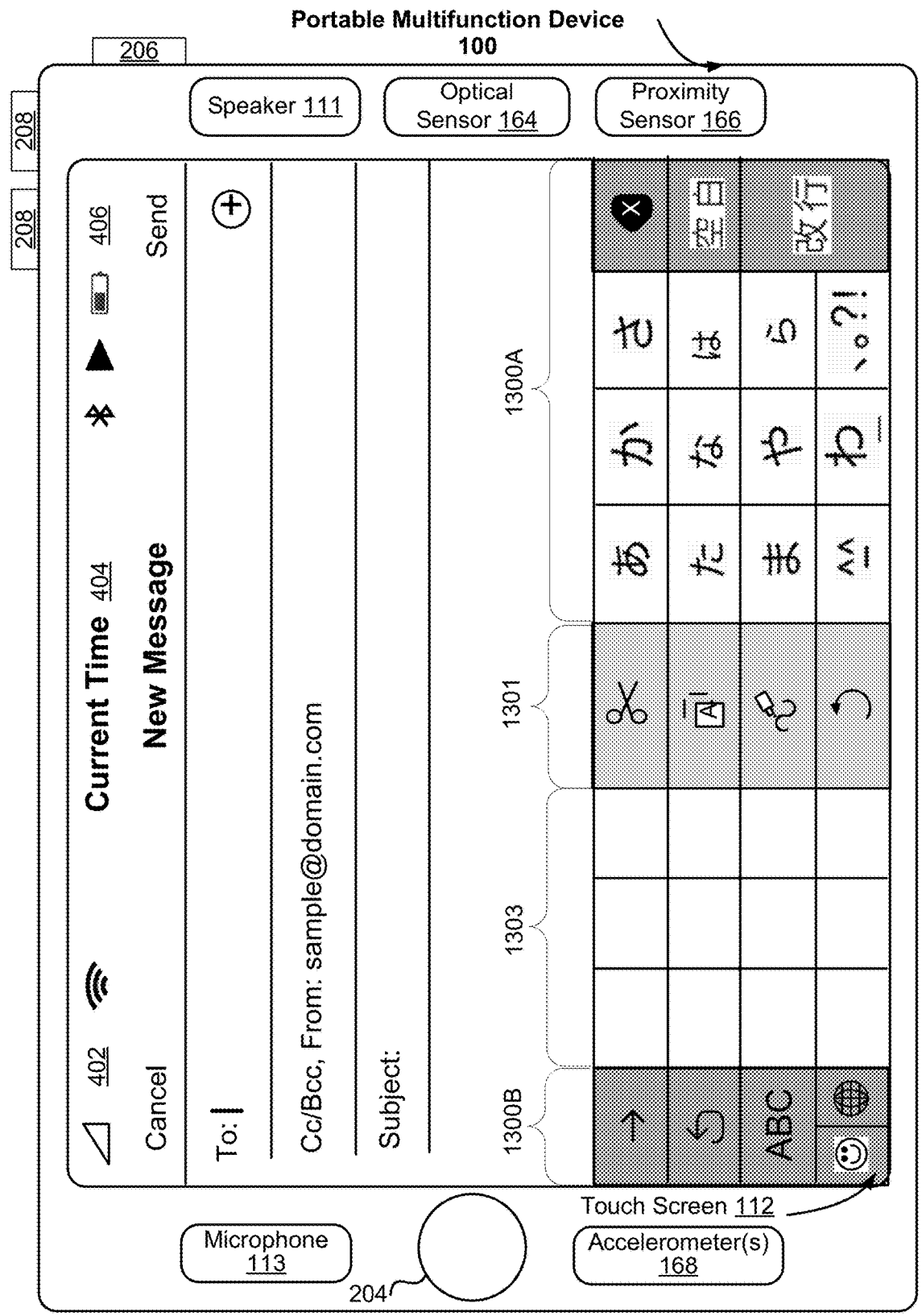

1900

```
┌─────────────────────────────────────────────────────────────────────┐
│ Displaying an application in a first mode at an electronic device   │
│ with a touch screen display. The application is displayed with a    │
│ first height while in the first mode.                               │
│                              1901                                   │
└─────────────────────────────────────────────────────────────────────┘
                                 ▼
┌─────────────────────────────────────────────────────────────────────┐
│ While the application is displayed in the first mode, a first input │
│ is detected.                                                        │
│                              1903                                   │
└─────────────────────────────────────────────────────────────────────┘
                                 ▼
┌─────────────────────────────────────────────────────────────────────┐
│              Responsive to detecting the first input                │
│                              1905                                   │
├─────────────────────────────────────────────────────────────────────┤
│ The content area 503 displays application views of an application.  │
│ Particularly, the device 100 displays an application view in the    │
│ content area 503 that corresponds to a selected UI element from the │
│ toolbar 501. In the example shown in Figure 5A, a world clock view  │
│ is displayed in the content area 503 as a result of the selection   │
│ of the world clock UI element 505.                                  │
│                              1907                                   │
├─────────────────────────────────────────────────────────────────────┤
│ Upon detecting an input to display the ergonomic mode of the        │
│ multitasking view 1000, the device 100 shifts the multitasking view │
│ 1000 downward toward the bottom area of the touch screen 112.       │
│                              1909                                   │
├─────────────────────────────────────────────────────────────────────┤
│ The multitasking view 1000 includes a plurality of contact icons    │
│ 1005.                                                               │
│                              1911                                   │
├─────────────────────────────────────────────────────────────────────┤
│ The application is displayed in the second mode with a second       │
│ height that is less than the first height.                          │
│                              1913                                   │
└─────────────────────────────────────────────────────────────────────┘
                                 ▼
┌─────────────────────────────────────────────────────────────────────┐
│ While the application is displayed in the second mode, a second     │
│ input is detected at a location on the touchscreen display that     │
│ corresponds to the application.                                     │
│                              1915                                   │
└─────────────────────────────────────────────────────────────────────┘
                                 ▼
┌─────────────────────────────────────────────────────────────────────┐
│ Responsive to detecting the second input a determination is made    │
│ whether the second input is a navigation input or an interaction    │
│ input                                                               │
│                              1917                                   │
├─────────────────────────────────────────────────────────────────────┤
│ In accordance with a determination that the second input is a       │
│ navigation input, the application is navigated without switching    │
│ back to the first mode                                              │
│                              1919                                   │
├─────────────────────────────────────────────────────────────────────┤
│ In accordance with a determination that the second input is an      │
│ interaction input, a response to the interaction input is generated │
│ and a switch is made from the second mode back to the first mode.   │
│                              1921                                   │
└─────────────────────────────────────────────────────────────────────┘
```

Figure 19

USER INTERFACES FOR IMPROVING SINGLE-HANDED OPERATION OF DEVICES

CROSS-REFERENCE TO RELATED APPLICATIONS

This application claims the benefit of U.S. Provisional Application No. 62/045,971 filed on Sep. 4, 2014, which is incorporated by reference in its entirety.

TECHNICAL FIELD

This relates generally to electronic devices with touch-sensitive surfaces, including but not limited to electronic devices with touch-sensitive surfaces that detect inputs for displaying user interfaces that improve single-handed operation of the electronic devices.

BACKGROUND

As technology progressed, portable electronic devices became more compact than their predecessors. The compactness of portable electronic devices allowed for ease of stowage of the devices. However, as the types of content capable of being displayed on the portable electronic devices increased, the small display screens of the devices made it increasingly more difficult for users to easily consume the content on the devices. As a result, portable electronic devices are now becoming larger to allow users to more easily consume content via the larger display screens.

SUMMARY

However, the larger display screens of portable electronic devices make it more difficult for users to operate the devices with a single hand. For example, in order to reach user interface elements of applications executing on a portable electronic device with a large display screen, a user either has to switch to two-handed operation of the device or the user must reposition the device in the user's hand. Thus, the large display screens of current portable electronic devices make single-handed operation of the devices awkward and uncomfortable to users.

The embodiments herein describe a mode of applications on a portable electronic device that improves single-handed operation of the devices. For example, the embodiments herein describe an ergonomic mode of an application that displays a graphical user interface (GUI) of the application in a bottom area of the display screen of the electronic device. By displaying the GUI in the bottom area of the display screen, the user can more easily interact with any user interface objects of the application that were previously unreachable without the user switching to two handed operation of the device or repositioning the electronic device in the user's hand.

In some embodiments, a computer-implemented method comprises displaying an application in a first mode at an electronic device with a touch screen display. The application is displayed with a first height while in the first mode, 1901 (FIG. 19). While the application is displayed in the first mode, a first input is detected, 1903 (FIG. 19) that corresponds to a request to display the application in a second mode. Responsive to detecting the first input, 1905 (FIG. 19) the application is displayed in the second mode, wherein in the second mode the application is displayed in a bottom area of the touch screen display. The application is displayed in the second mode with a second height that is less than the first height, 1913 (FIG. 19). While the application is displayed in the second mode, a second input is detected at a location on the touchscreen display that corresponds to the application, 1915 (FIG. 19). Responsive to detecting the second input, a determination is made whether the second input is a navigation input or an interaction input, 1917 (FIG. 19). In accordance with a determination that the second input is a navigation input, the application is navigated without switching back to the first mode, 1919 (FIG. 19). In accordance with a determination that the second input is an interaction input, a response to the interaction input is generated and a switch is made from the second mode back to the first mode. 1921 (FIG. 19).

Furthermore, the embodiments herein describe an ergonomic mode of a keyboard displayed on the display screen of the portable electronic device. During the ergonomic mode of the keyboard, the keyboard is shifted towards a vertical edge of the display screen to allow a user to more easily reach keys of the keyboard that were previously unreachable without the user switching to two handed operation of the device or repositioning the electronic device in the user's hand.

A computer-implemented method comprises at an electronic device with a display capable of receiving an input via the display, displaying a view of a first application and displaying a keyboard including a first set of keys while displaying the first application. The first set of keys is displayed at a first position on the display. The method further includes detecting, at the display, a gesture in a direction towards an edge of the display. Responsive to the detection, resizing and shifting the first set of keys in the direction of the gesture to a second position on the display without shifting the view of the application.

Note that the various embodiments of the calendar application described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4B illustrates an exemplary user interface for a multifunction device with a touch-sensitive surface that is separate from the display in accordance with some embodiments.

FIGS. 10C and 10D illustrate exemplary user interfaces of the ergonomic mode of the multitasking view displayed on exemplary multifunction devices of different sizes in accordance with some embodiments.

FIGS. 13A, 13B, and 13C illustrate exemplary user interfaces of a keyboard in a landscape view in accordance with some embodiments.

FIG. 19 is a method flow diagram in accordance with some embodiments.

DETAILED DESCRIPTION

Figure 1A:
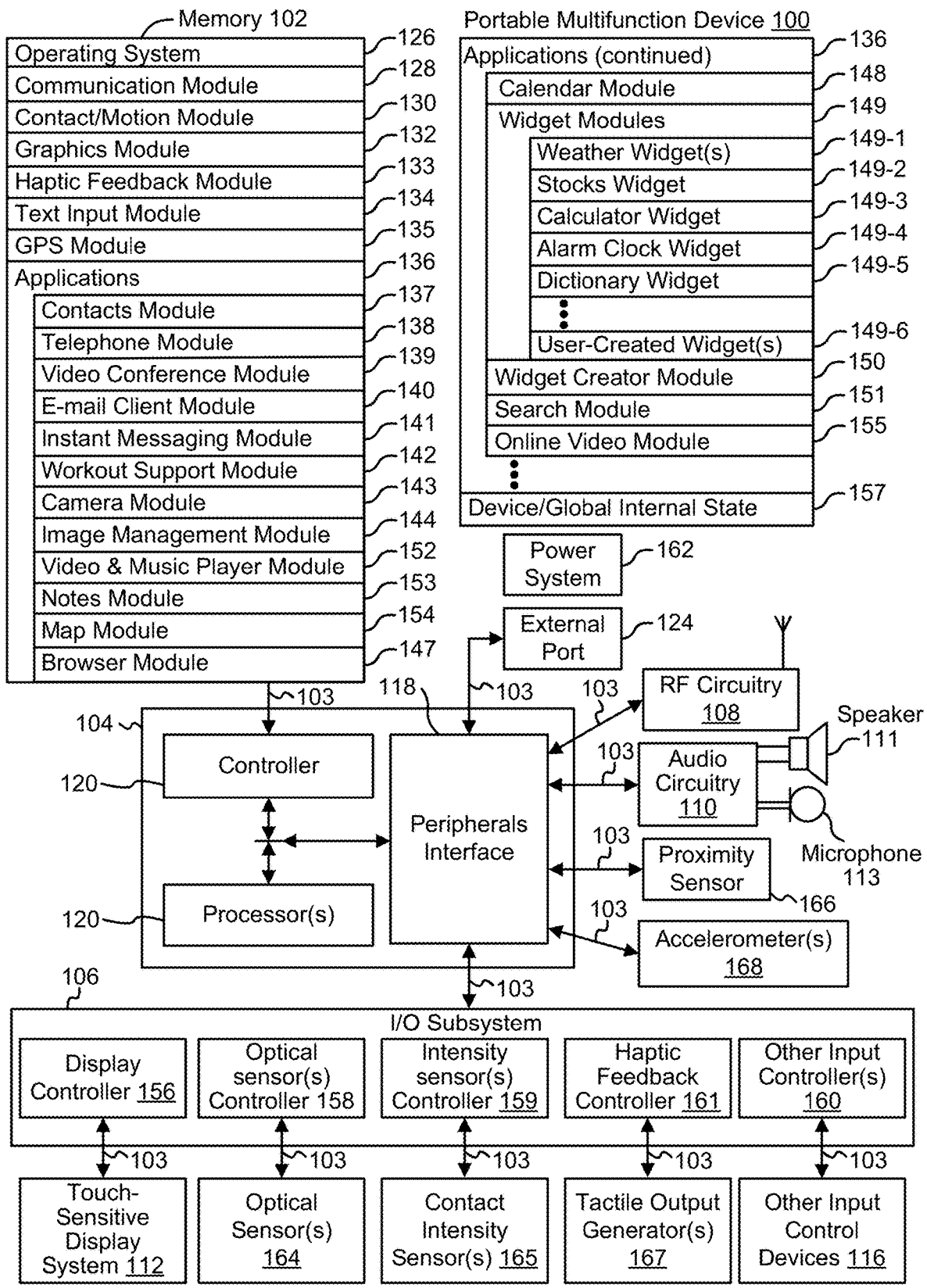
FIG. 1A is a block diagram illustrating a portable multifunction device with a touch-sensitive display in accordance with some embodiments.

Many portable electronic devices have graphical user interfaces (GUIs) for applications that are executable on the devices. A portable electronic device having a large display screen (e.g., greater than 5 inches in diagonal size) makes user interaction with a GUI of an application more difficult during single-handed operation of the device. For example, the portable electronic device typically displays an application in a full screen mode. In the full screen mode (e.g., a first mode) of the application, a GUI of the application is displayed with a height (e.g., a first height) that corresponds to the GUI occupying the entirety (e.g., all or substantially all) of the display screen of the portable electronic device excluding any regions allowed for a status bar of the device and/or control regions of the device. While the application is displayed in the full screen mode, the GUI includes one or more UI objects that are unreachable by a user's finger during single-handed operation of the device due to the size of the display screen. That is, in the full screen mode, the application includes a UI object that is outside of a reachable area of the touch screen 112. The user must either switch from single-handed operation of the device to two handed operation of the device or reposition the device in the user's hand in order to reach the UI object.

The embodiments herein describe a mode of applications on the portable electronic device that improves single-handed operation of the devices. For example, the embodiments herein describe an ergonomic mode (e.g., a second mode) of an application that displays the GUI of the application in a bottom area of the display screen of the electronic device. By displaying the GUI in the bottom area of the display screen, the user can more easily interact with any UI objects of the application that were previously unreachable without the user switching to two handed operation of the device or repositioning the electronic device in the user's hand. Thus, in the ergonomic mode of an application the UI objects are within the reachable area of the touch screen 112. For example, any UI objects that are displayed at the top of the display screen in the full screen mode are now closer to the bottom of the display screen since the GUI is displayed in the bottom area of the display screen during the second mode.

Furthermore, the embodiments herein describe an ergonomic mode of a keyboard displayed on the display screen of the portable electronic device. During the ergonomic mode of the keyboard, the keyboard is shifted towards a vertical edge of the display screen to enable a user to more easily reach keys of the keyboard that were previously unreachable without the user switching to two handed operation of the device or repositioning the electronic device in the user's hand. Thus, single-handed operation of the portable electronic device is improved through the various embodiments of the ergonomic mode as will be further described below.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100 as described in U.S. patent application Ser. No. 11/969,800 filed on Jan. 4, 2008, which is incorporated by reference in its entirety.

Figure 3:
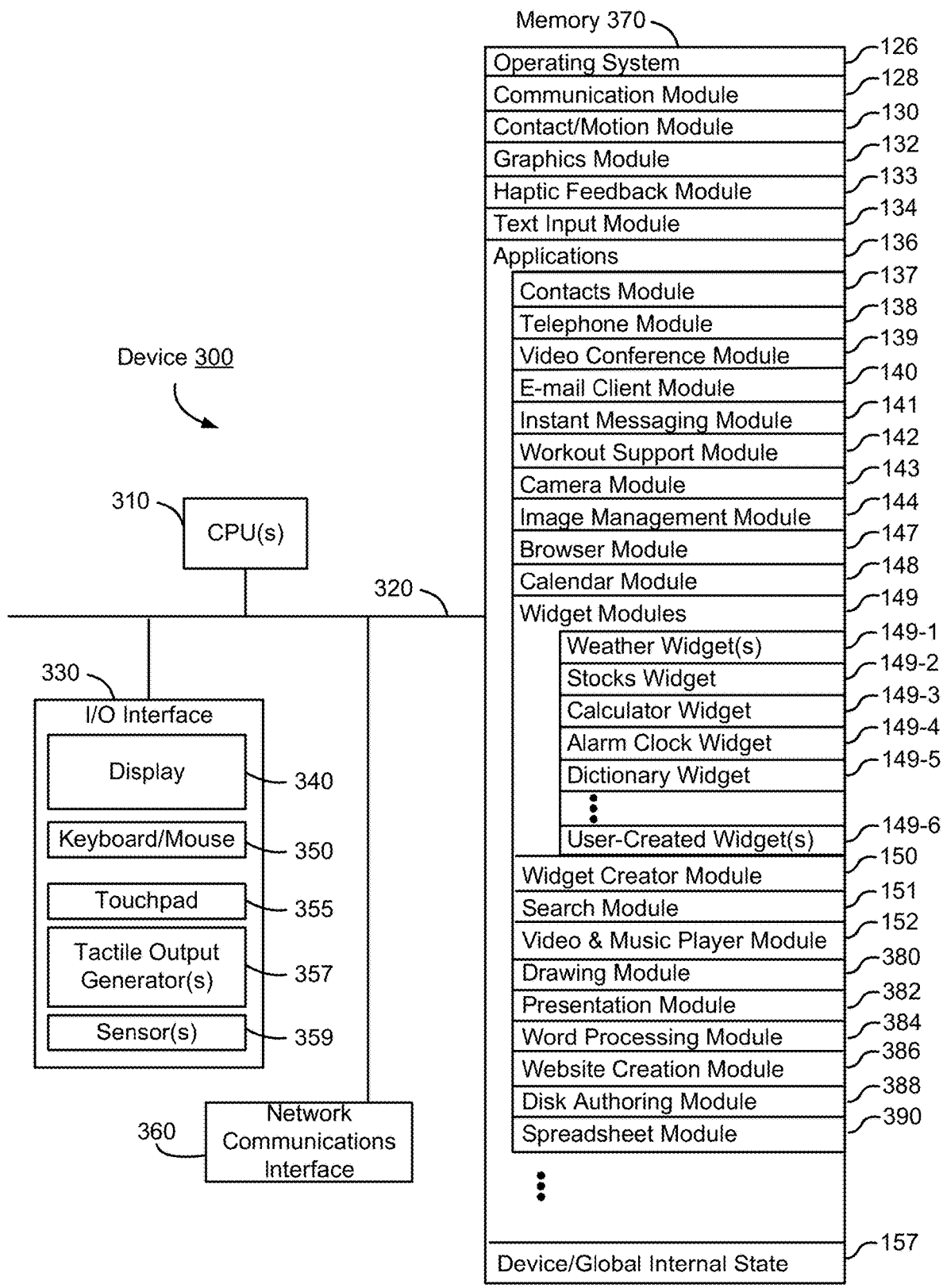
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
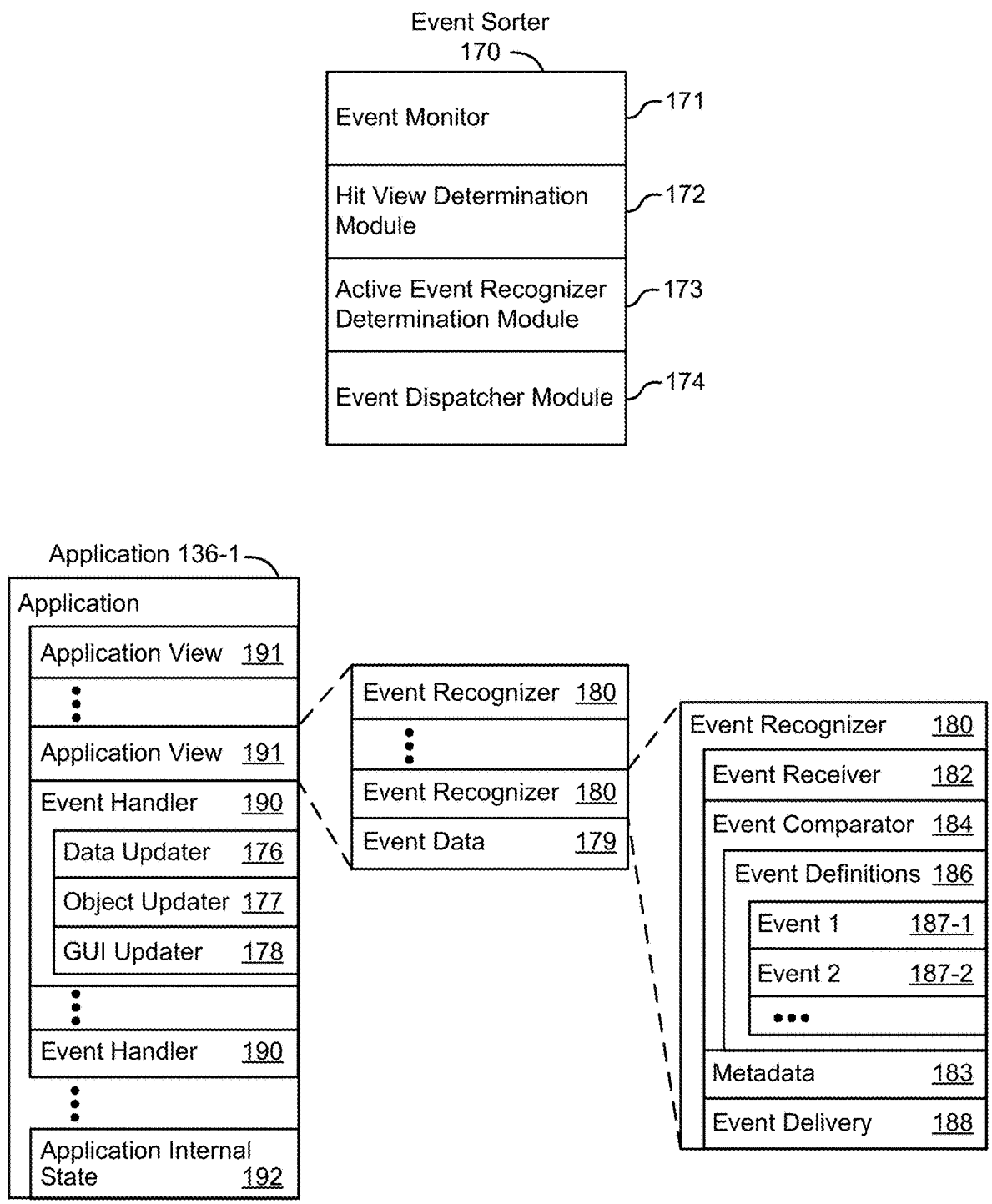
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. IA) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
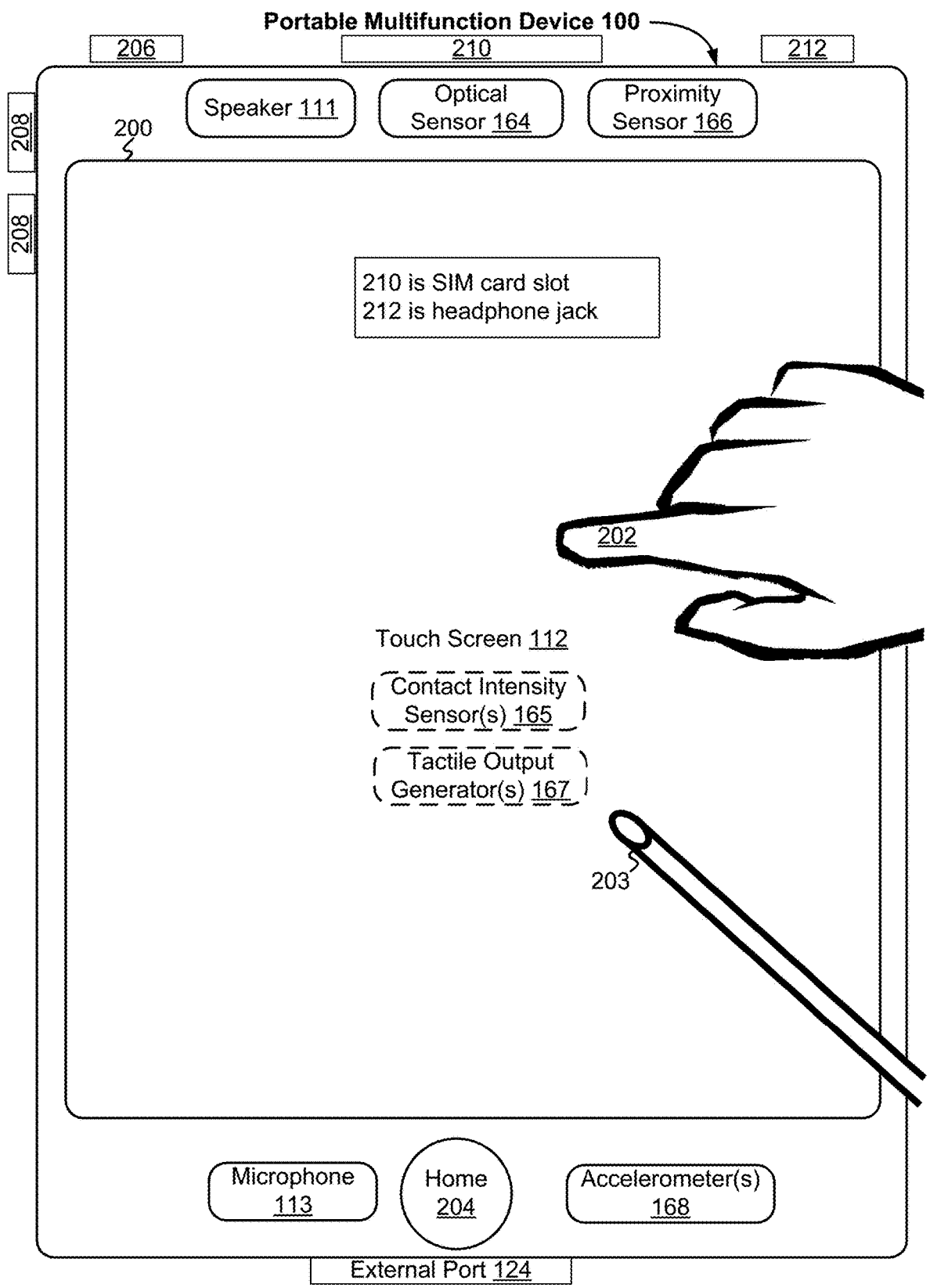
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or dnwnward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. In some embodiments, the menu button 204 includes a fingerprint sensor that identifies a fingerprint on the menu button 204. The fingerprint sensor is optionally used to determine whether a finger on the menu button 204 has a fingerprint that matches a fingerprint used to unlock the device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to Figure IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and Icons for other applications, such as:
Icon 424 for IM module 141, labeled "Text;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and a touch-sensitive surface, such as device 300 or portable multifunction device 100. Although the description below is with respect to device 100, the embodiments herein can be incorporated in device 300.

Figure 5A:
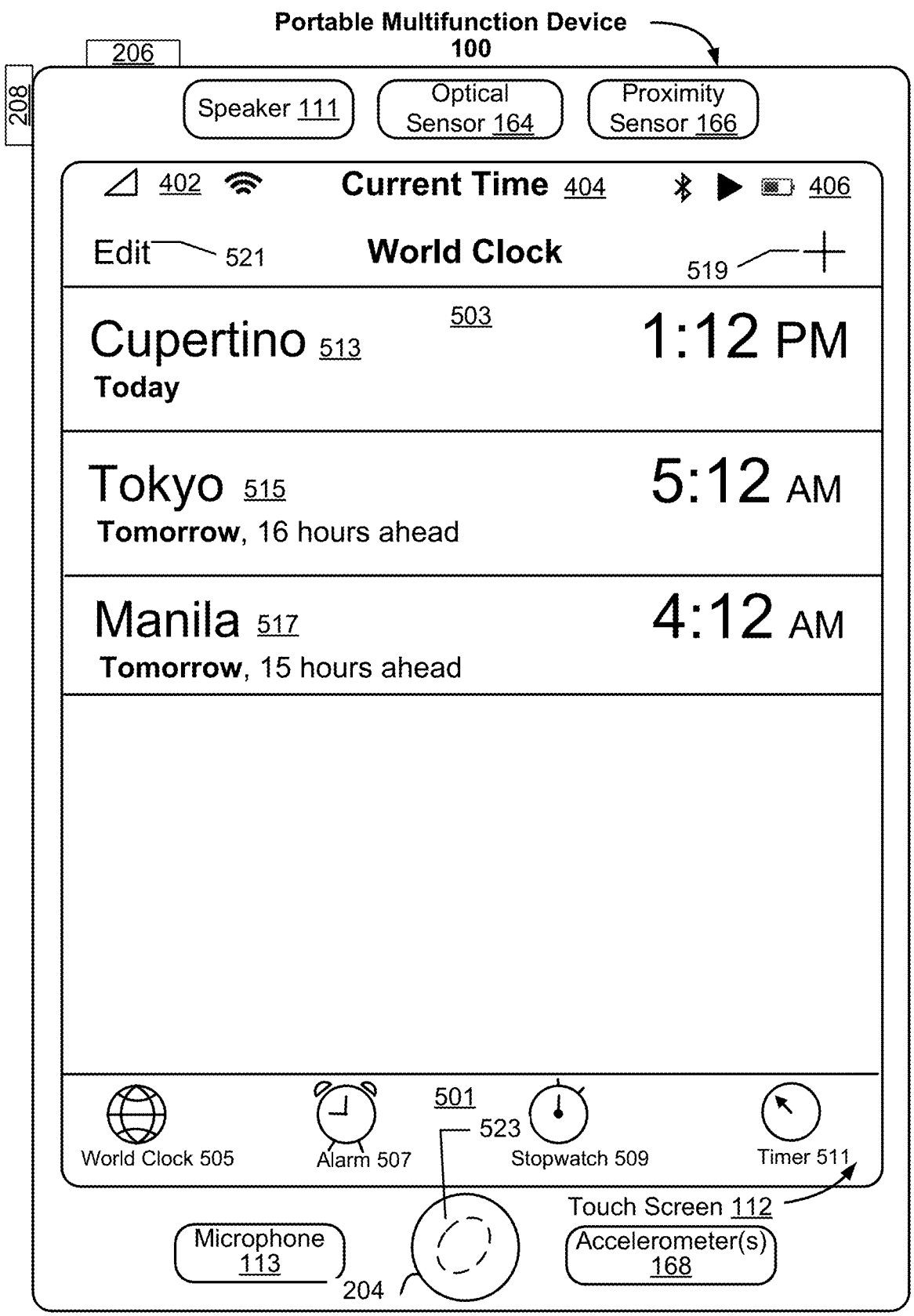
FIG. 5A illustrates an exemplary user interface of a clock application in accordance with some embodiments.

FIG. 5A illustrates an exemplary user interface of a clock application. In particular, FIG. 5A illustrates an application view of the full screen mode (e.g., a first mode) of the clock application. The full screen mode is optionally referred to as an expanded mode or a two-handed operation mode. The full screen mode of the clock application includes a toolbar 501 and a content area 503. While the following description is with respect to the clock application, the embodiments herein are applicable to any application.

The toolbar 501 optionally includes selectable UI elements. Each UI element included in the toolbar 501 is associated with a different functionality of the clock application. In some embodiments, the toolbar 501 includes a world clock UI element 505 associated with a world clock functionality, an alarm UI element 507 associated with an alarm functionality, a stopwatch UI element 509 associated with a stopwatch functionality, and a timer UI element 511 associated with a timer functionality.

The content area 503 displays application views of an application, Particularly, the device 100 displays an application view in the content area 503 that corresponds to a selected UI element from the toolbar 501. In the example shown in FIG. 5A, a world clock view is displayed in the content area 503 as a result of the selection of the world clock UI element 505, 1907 (FIG. 19).

Generally, the world clock view displays the current time of one or more cities in the content area 503. As shown in FIG. 5A, the content area 503 of the world clock view includes one or more rows where each row is associated with the current time of a particular city. For example row 513 illustrates the current time of Cupertino, Calif., row 515 illustrates the current time of Tokyo, Japan, and row 517 illustrates the current time of Manila, Philippines.

Figure 20A:
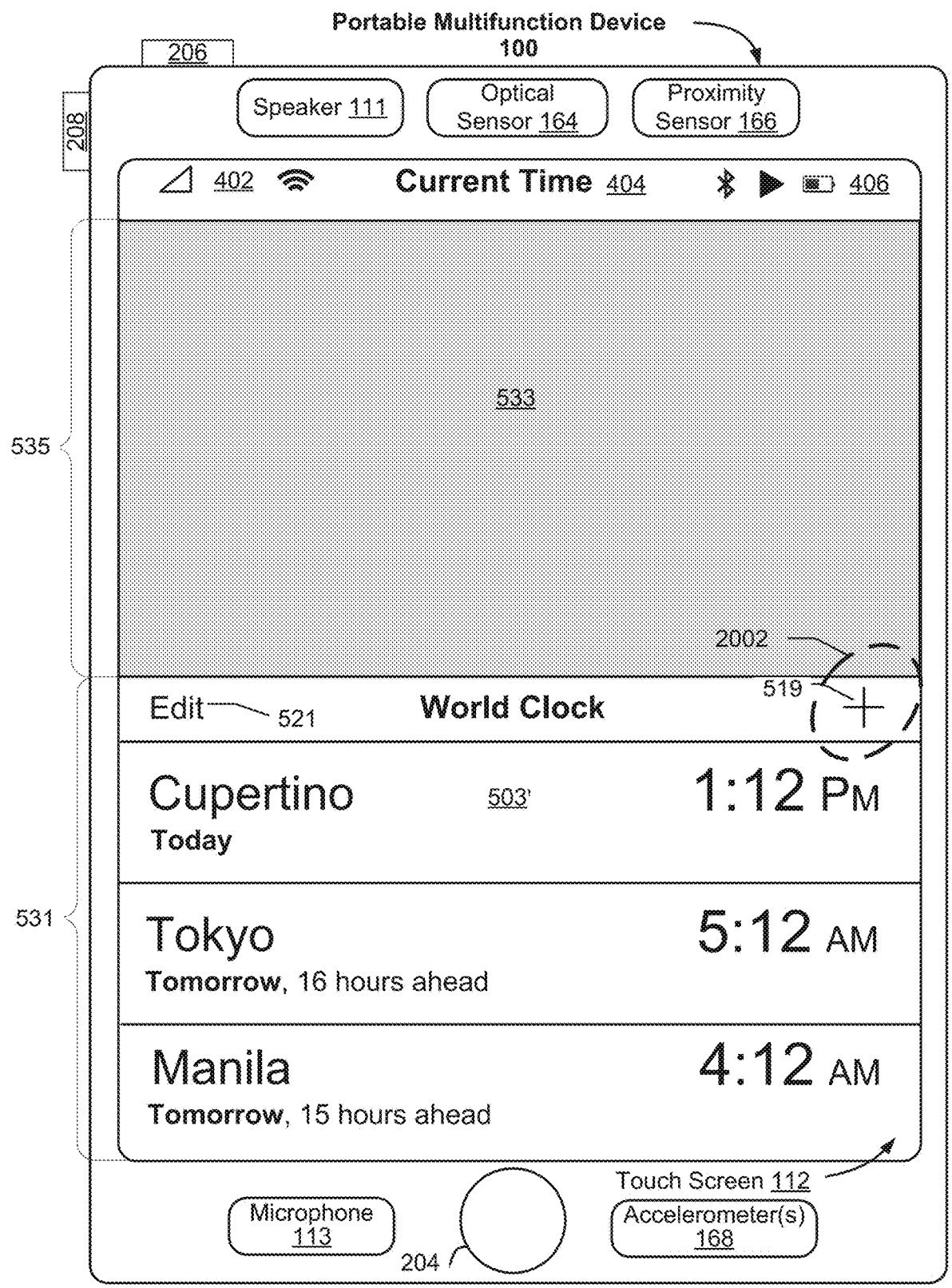
FIGS. 20A and 20B illustrate switching from an ergonomic mode to a full screen mode of the clock application in accordance with some embodiments.

The content area 503 of the world clock application also includes one or more user UI elements for interacting with the clock application. For example, the content area 503 includes an add UI element 519 and an edit UI element 521. The add UI element 519 is used to add the current time of another city to the world clock view. For example, the user optionally selects the add UI element 519 (e.g., represented by contact 2002 shown in FIG. 20A) to add the current time of Bologna, Italy to the world clock view. The edit UI element 521 is optionally used to revise the cities represented in the world clock view. For example, the user selects the edit UI element 521 to delete one or more cities from the world clock view or to revise the order in which the cities are arranged in the world clock view.

During single-handed operation of the device 100 (e.g., while the user is holding the device in the palm of their hand), the user may be unable to reach one or more UI elements of an application while it is displayed in the full screen mode on the touch screen 112, e.g., because the UI elements are located at a position greater than a predefined reachability metric. In some embodiments, the reachability metric is based on an area of the touch screen 112 that can be reached by a thumb of a typical user of the device 100 while holding the device 100 in the palm of the user's hand. For example, the reachability metric is the highest point from the bottom of the touch screen 112 that a typical user can reach from a first edge of the touch screen 112 when extending the user's thumb from a bottom corner of the device 100 that is adjacent to a second edge of the touch screen 112. Thus, in some embodiments the reachability metric is different for different devices (e.g., a wider device might have a smaller reachability metric than a narrower device, because a typical user cannot reach as high on the far edge of the wider device than the user can reach on the far edge of the narrower device). In some embodiments, the reachability metric is determined based on physical dimensions of the device 100 in addition to the size of the touch screen 112 since a wide bezel of the device 100 can reduce the ability of the user to reach across the touch screen 112.

If a UI element is located at a position greater than the reachability metric, the UI element is generally unreachable by the user's finger unless the electronic device is repositioned in the user's hand. In the example shown in FIG. 5A, the user is unable to select at least one of the edit UI element 521 and the add UI element 519 while the clock application is displayed in the full screen mode and while the user is operating the device 100 with one hand as the edit UI element 521 and the add UI element 519 are located at positions greater that the reachability metric. Rather than the user shifting the device 100 in the user's hand or switching to two-handed operation of the device 100, the user is provided with the option to activate an ergonomic mode of the application to improve single-handed operation of the device 100.

In some embodiments, the user provides an input to the device 100 that causes the device 100 to activate the ergonomic mode of an application. The user optionally provides multiple sequential inputs (e.g., a double tap) of the menu button 204, e.g., represented by contact 523 shown in FIG. 5A, to activate the ergonomic mode of the clock application. In some embodiments, the device 100 detects the multiple sequential inputs using a touch sensor included in the menu button 204 that detects finger contact with the menu button 204. The touch sensor is optionally a capacitive touch-sensitive surface or a fingerprint sensor that is integrated into a mechanical button.

In some embodiments, the menu button 204 has multiple states such as a "half press" state and a "full press" state. The user optionally provides a half press of the menu button 204 to activate the ergonomic mode of the clock application. The device 100 detects a half press of the menu button 204 is received when the menu button 204 is pressed less than a threshold amount. In contrast to the half press of the menu button 204, a full press of the menu button 204 occurs when the menu button 204 is pressed greater than the threshold distance and causes the device 100 to perform a different function such as switching from displaying either the full screen mode or ergonomic mode of an application to a home screen view of the device 100 as will be further described below. In some embodiments, a press of the menu button 204 is detected by a pressure sensor that detects a continuous range of pressure values, and a press is defined as an increase in a characteristic intensity (or pressure) of a contact on the button above a predetermined threshold value. In some embodiments, the pressure sensor performs different operations when different pressure thresholds are met (e.g., a first pressure threshold corresponds to a half press of the menu button 204 and a second pressure threshold that is higher than the first pressure threshold corresponds to a full press of the button).

Figure 5B:
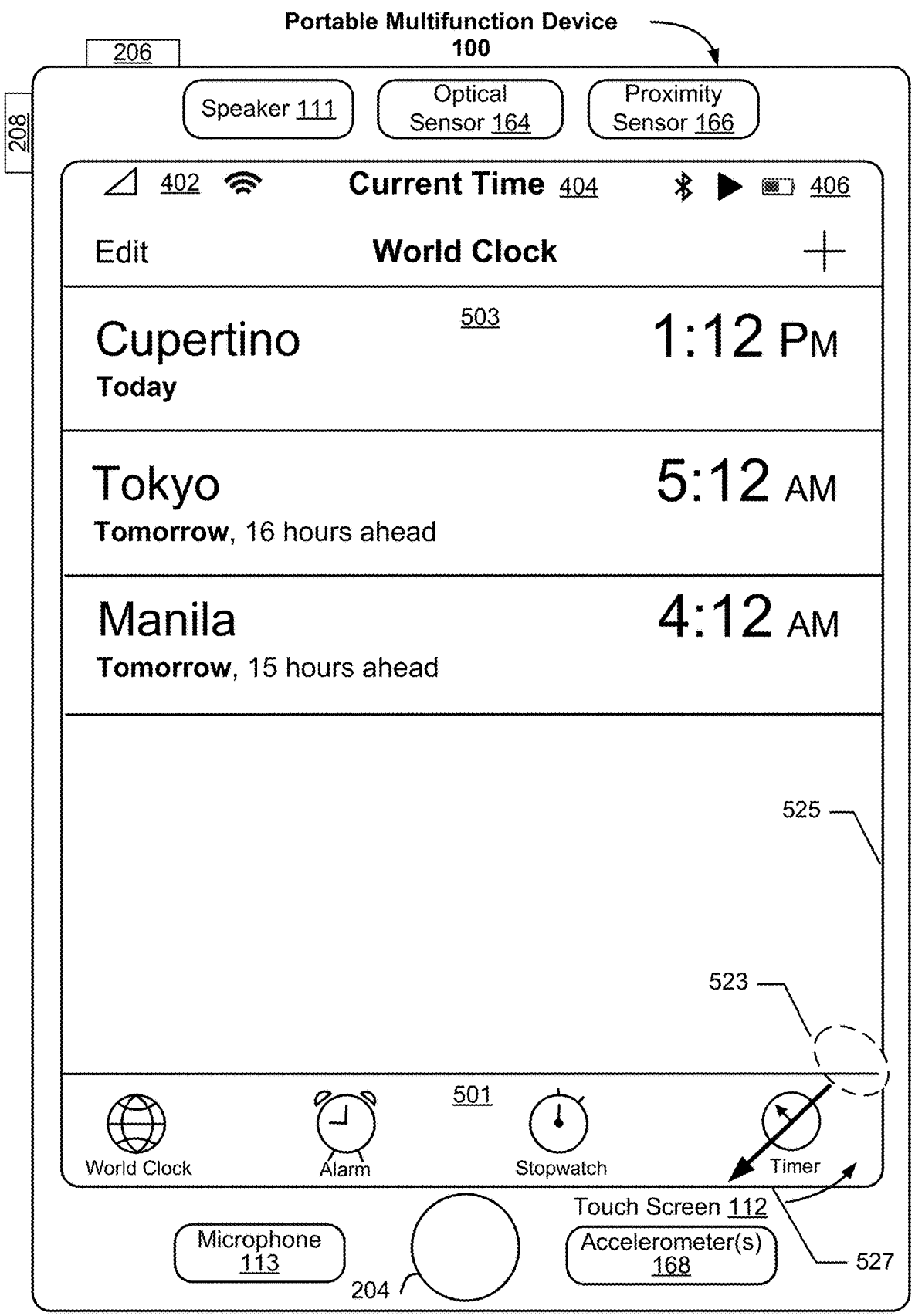
FIGS. 5B, 5C, and 5D illustrate various gestures on the user interface of the clock application to activate an ergonomic mode of the clock application in accordance with some embodiments.

Rather than provide a half press of the menu button 204 or multiple sequential inputs to activate the ergonomic mode, the user optionally inputs a gesture on an application to activate the ergonomic mode of the application. FIG. 5B illustrates a corner edge swipe gesture at the lower right corner of the touch screen 112. In some embodiments, the corner edge swipe gesture is used by the user to activate the ergonomic mode of an application.

In some embodiments, the device 100 determines the input of a corner edge swipe gesture by detecting a contact 523 on the touch screen 112 at a first position adjacent to the right vertical edge 525 of the touch screen 112. The device 100 then detects a continuous movement of the contact 523 in the direction of the arrow shown in FIG. 5B to a second position adjacent to the bottom horizontal edge 527 of the touch screen 112 that intersects the right vertical edge 525 without the contact 523 breaking contact with the touch screen 112. Lastly, the device 100 detects the completion of the corner edge swipe gesture in response to detecting a finger up at the second position such that the contact 523 breaks contact with the touch screen 112. In some embodiments, detecting the corner swipe gesture includes detecting that the contact has moved onto the touch screen 112 from a bezel of the device (e.g., by detecting the contact gradually increasing in size as it moves onto the touch screen).

Figure 5C:
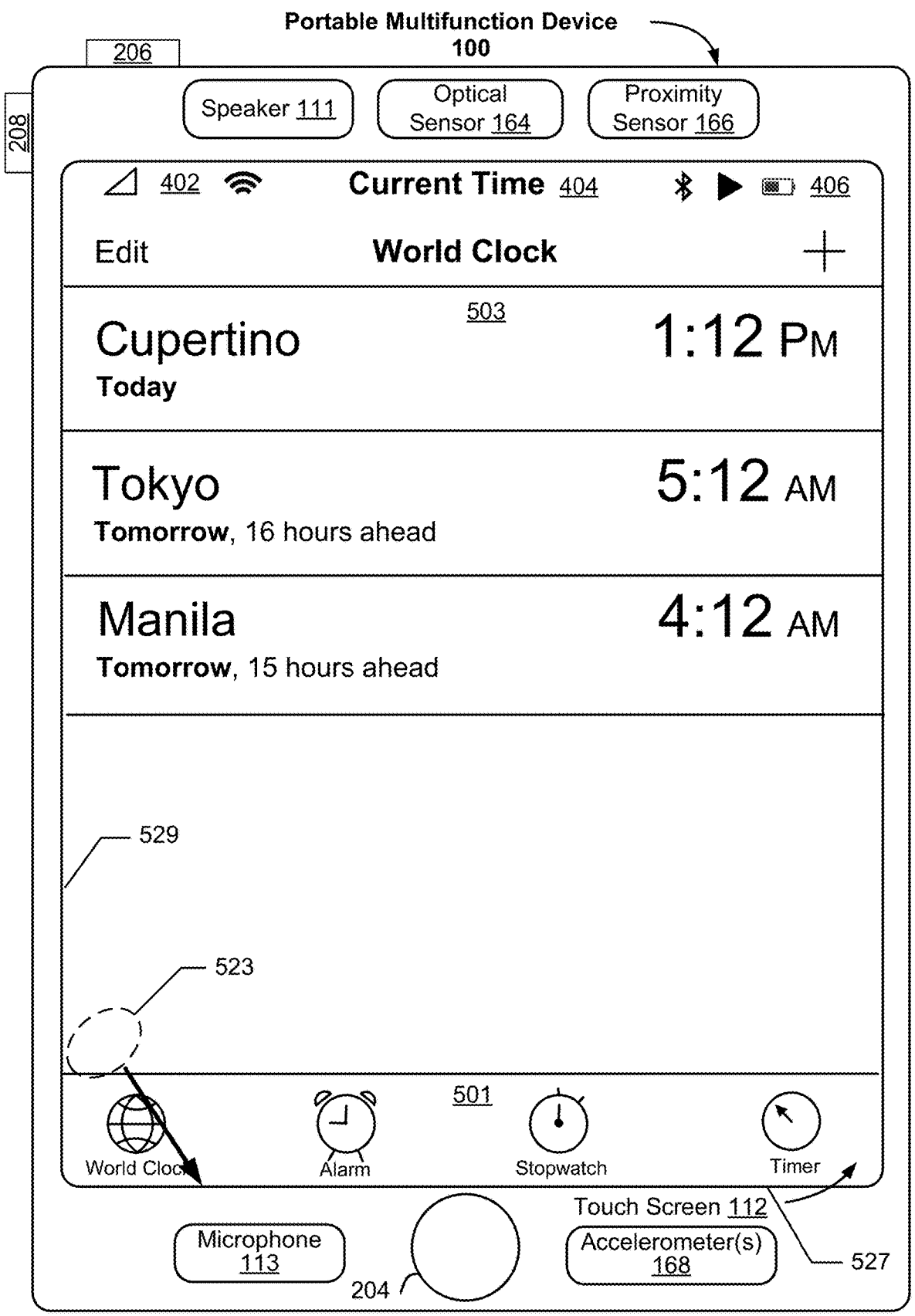

Similarly, FIG. 5C illustrates a corner edge swipe gesture at the lower left corner of the touch screen 112. The device 100 determines the input of a corner edge swipe gesture by detecting a contact 523 on the touch screen 112 at a first position adjacent to the left vertical edge 529 of the touch screen 112. The device 100 then detects a continuous movement of the contact 523 in the direction of the arrow shown in FIG. 5C to a second position adjacent to the bottom horizontal edge 527 of the touch screen 112 that intersects the left vertical edge 529 without the contact 523 breaking contact with the touch screen 112. Lastly, the device 100 detects the completion of the corner edge swipe gesture in response to detecting a finger up at the second position such that the contact 523 breaks contact with the touch screen 112.

Figure 5D:
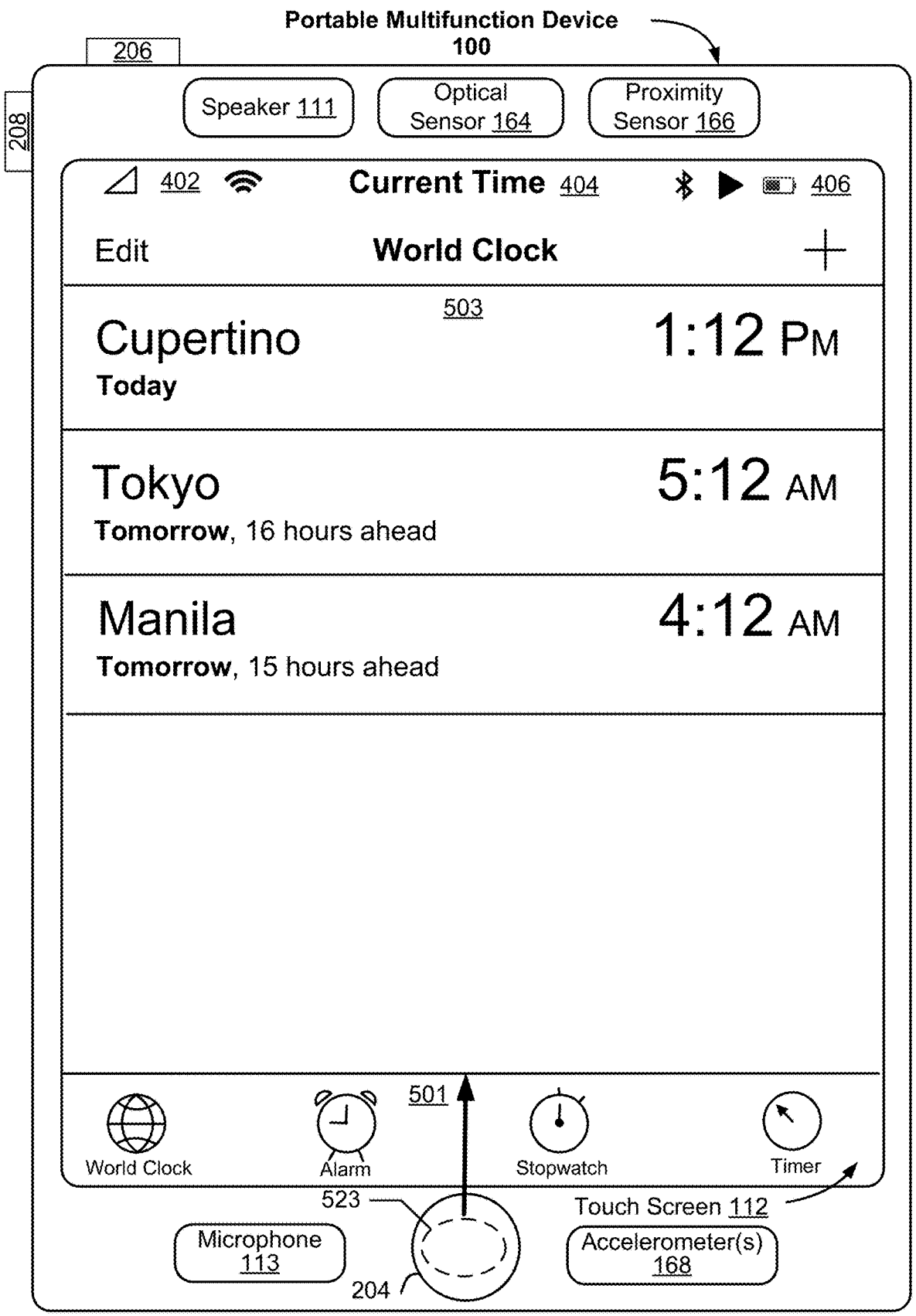

In some embodiments, the user inputs a gesture on the menu button 204 to activate the ergonomic mode of an application. FIG. 5D illustrates a flick gesture on the menu button 204 to activate the ergonomic mode of the clock application. The device 100 determines that a flick gesture is inputted by detecting a contact 523 of the user's finger with the home button 204 via a sensor such as a fingerprint sensor or a touch sensor. The flick gesture also includes a quick vertical movement of the finger placed on the home button 204. For example, the flick gesture includes a quick vertical movement of contact 523 in the direction of the arrow shown in FIG. 5D. The quick vertical movement of contact 523 is such that contact 523 accelerates in the vertical direction and breaks contact with the touch screen 112 signaling the completion of the gesture.

In accordance with the device 100 detecting any one of the inputs described above for invoking the ergonomic mode of an application, the device 100 switches from displaying the full screen mode of the application to the ergonomic mode of the application. While in the ergonomic mode, UI elements that were previously positioned a distance greater than the reachability metric are now located at a position less than the reachability metric. Thus, the UI elements are reachable by the user's finger without the device 100 being repositioned in the user's hand. In some embodiments, the ergonomic mode of an application is only displayable in the portrait view. Alternatively, the ergonomic mode of an application is displayable in either the portrait view or landscape view.

Figure 5E:
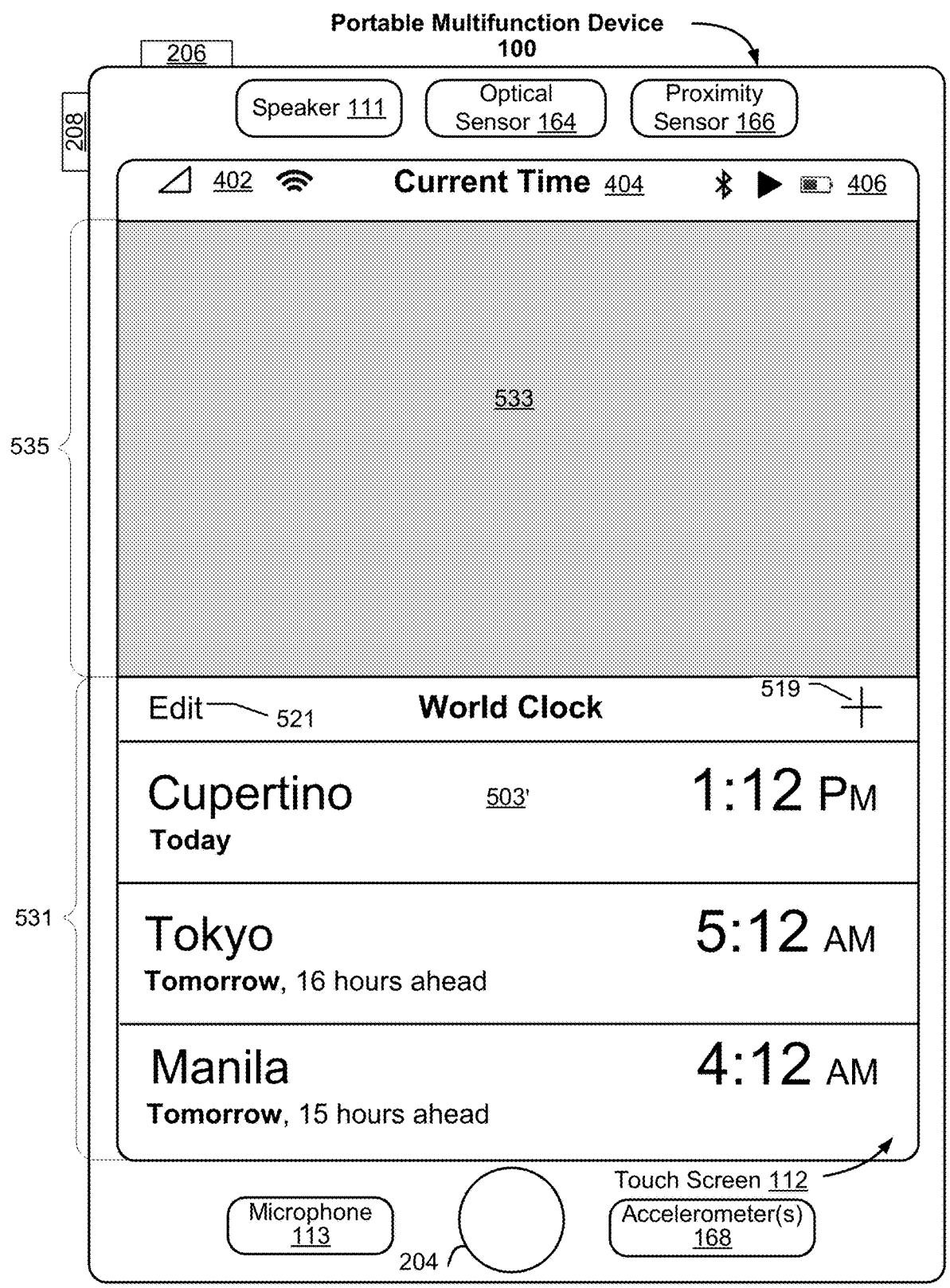
FIGS. 5E, 5F, 5G, 5H, 5I, 5J, 5K, and 5L illustrate exemplary user interfaces of an ergonomic mode of the clock application in accordance with some embodiments.

FIG. 5E illustrates an exemplary user interface of the ergonomic mode of the clock application. In some embodiments, the ergonomic mode is also referred to as a compact mode or a one-handed operation mode. Generally, in the ergonomic mode of an application, the device 100 displays the application in a bottom area of the touch screen 112 with a height (e.g., a second height) that is less than the height of the application while displayed in the full screen mode (e.g., the first height). For example, the height of the application displayed in the ergonomic mode corresponds to half the height of the touch screen 112. However, the height of the application in the ergonomic mode can be any height that is less than the height of the touch screen 112.

As shown in FIG. 5E, during the ergonomic mode the content area 503' of the world clock view of the calendar application is displayed in a bottom area 531 of the touch screen 112 and a blank screen 533 (a blank area) is displayed in a top area 535 of the touch screen 112 that is located above the content area 503'. To display the ergonomic mode of an application, the device 100 determines an application view of the application in the full screen mode that includes the content area 503 and the toolbar 501 of the application. For example, the device 100 captures the world clock view of the clock application displayed in the full screen as shown in FIG. 5A. The device 100 shifts the captured view of the application in the vertical direction until the content area 503' occupies the bottom area 531 of the touch screen 112 with the second height that corresponds to the ergonomic mode and such that the top of the content area 531 is displayed in the bottom area 531. For example, the device 100 shifts the full screen view of the world clock view downward until the bottom area 531 of the touch screen 112 is occupied with the content area 503' of the world clock view such that the top portion of the content area 503 including the add UI element 519 and edit UI element 521 is displayed in the bottom area 531. In some embodiments, instead of capturing a static image of the user interface, the device 100 offsets the canvas onto which the application is drawing, so that the application does not need to be informed that the device 100 is operating in ergonomic mode (e.g., the application can keep updating the user interface and responding to inputs from the user as normal, except that the drawing canvas and the touch canvas are offset on the display so that the top portion of the drawing canvas and the top portion of the touch canvas are shifted toward a bottom of the touchscreen).

Thus, the ergonomic mode of the application includes only the content area 503' of the application and does not include the toolbar 501 of the application in some embodiments. As shown in FIG. 5E, the ergonomic mode of the world clock view of the clock application includes only the content area 503' displayed in the bottom area 531 of the touch screen 112 without the toolbar 501. Furthermore, the ergonomic mode of the world clock view of the clock application is displayed with a height that is less than the height of the clock application displayed in the full screen mode.

Figure 5F:
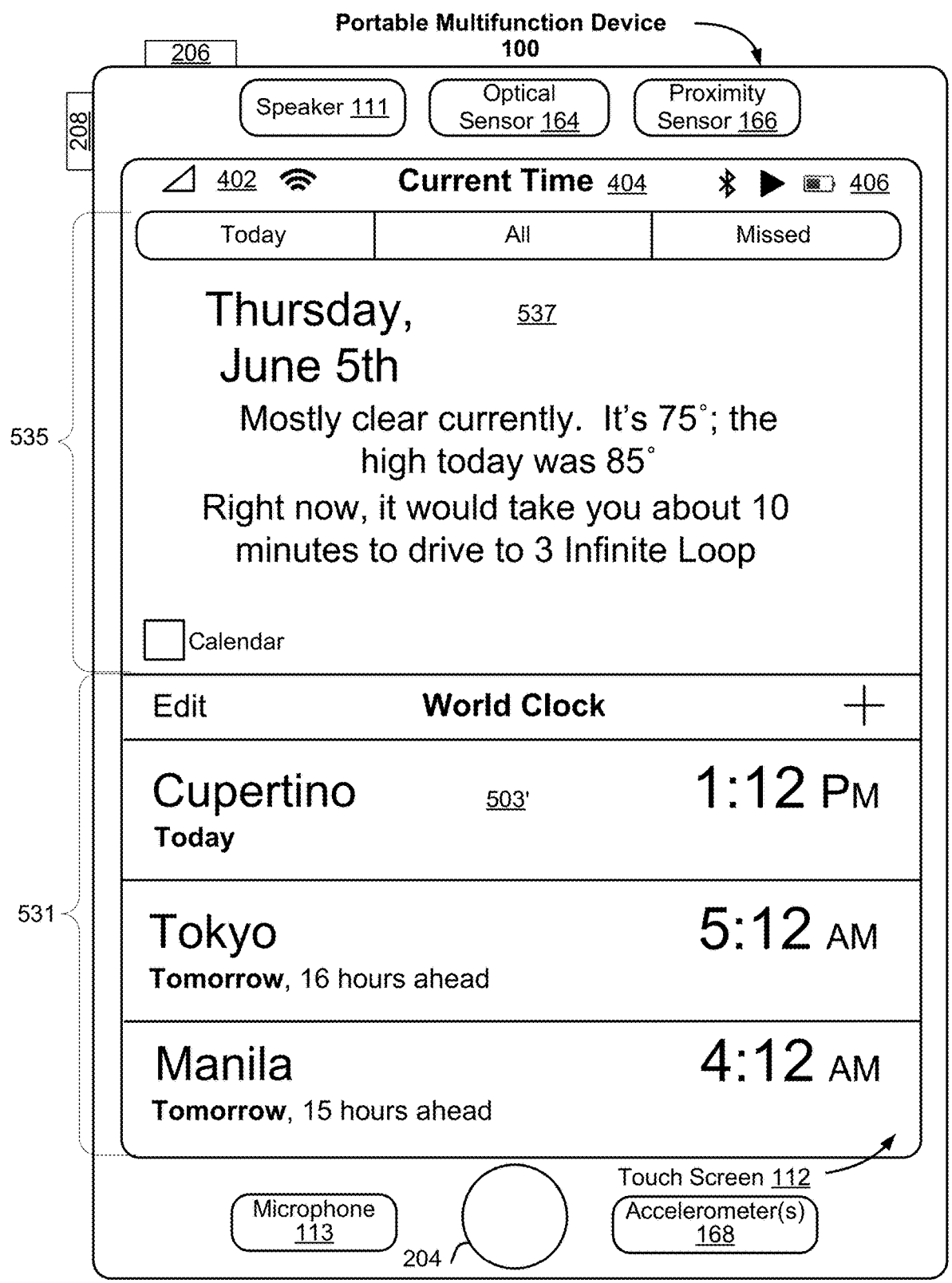

FIG. 5F illustrates another exemplary user interface of the ergonomic mode of the clock application. Rather than display the blank screen 533 in the top area 535 during the ergonomic mode of the application, the device automatically displays a notification view 537 in the top area 535 of the touch screen 112 in response to a user request to display the application in the ergonomic mode as shown in FIG. 5F. The notification view 537 includes one or more notifications for the user. Examples of the notifications included in the notification view 537 are the current date, the weather of the user's current location, and/or traffic information. Other types of notifications can be included in the notification view 537. In some embodiments, the notification view is also available to be displayed in a normal mode of operation (e.g., in response to a swipe gesture from a top edge of the touch screen), in which case the notification view is dragged over (e.g., on top of) the application user interface.

Figure 5G:
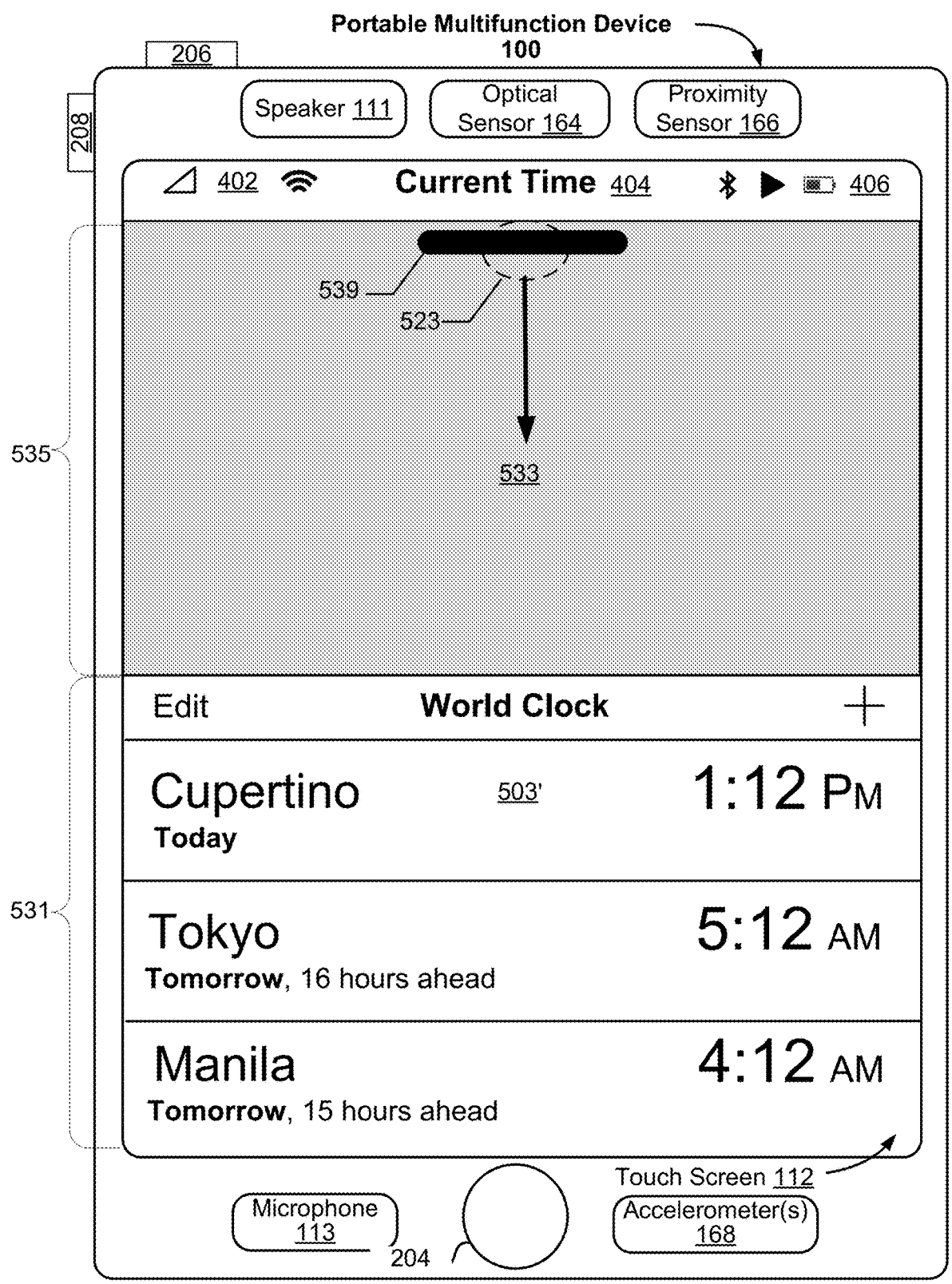

FIG. 5G illustrates another exemplary user interface of the ergonomic mode of the clock application. Similar to FIG. 5E, while in the ergonomic mode, the device 100 automatically displays the blank screen 533 is in the top area 535 of the touch screen 112. However, the embodiment of FIG. 5F includes a handle UI element 539 associated with displaying the notification view 537 described with respect to FIG. 5F. The device 100 detects a user selection of the handle UI element 539 represented by contact 523 on the handle UI element 539 shown in FIG. 5G and a continuous movement of the contact 523 moving the handle UI element 539 in a direction of the arrow shown in FIG. 5G (e.g., dragging downward).

Figure 5H:
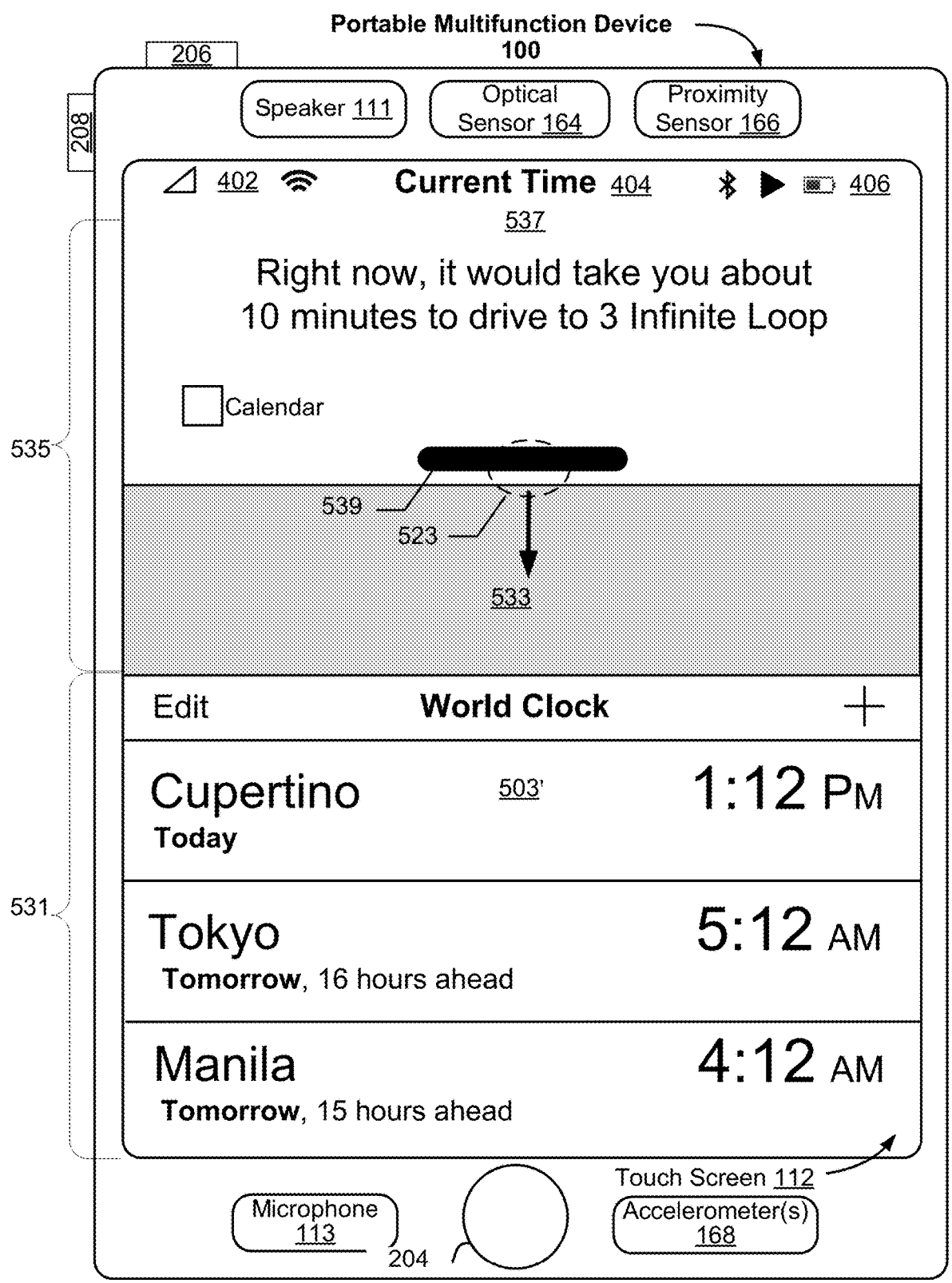
Figure 5I:
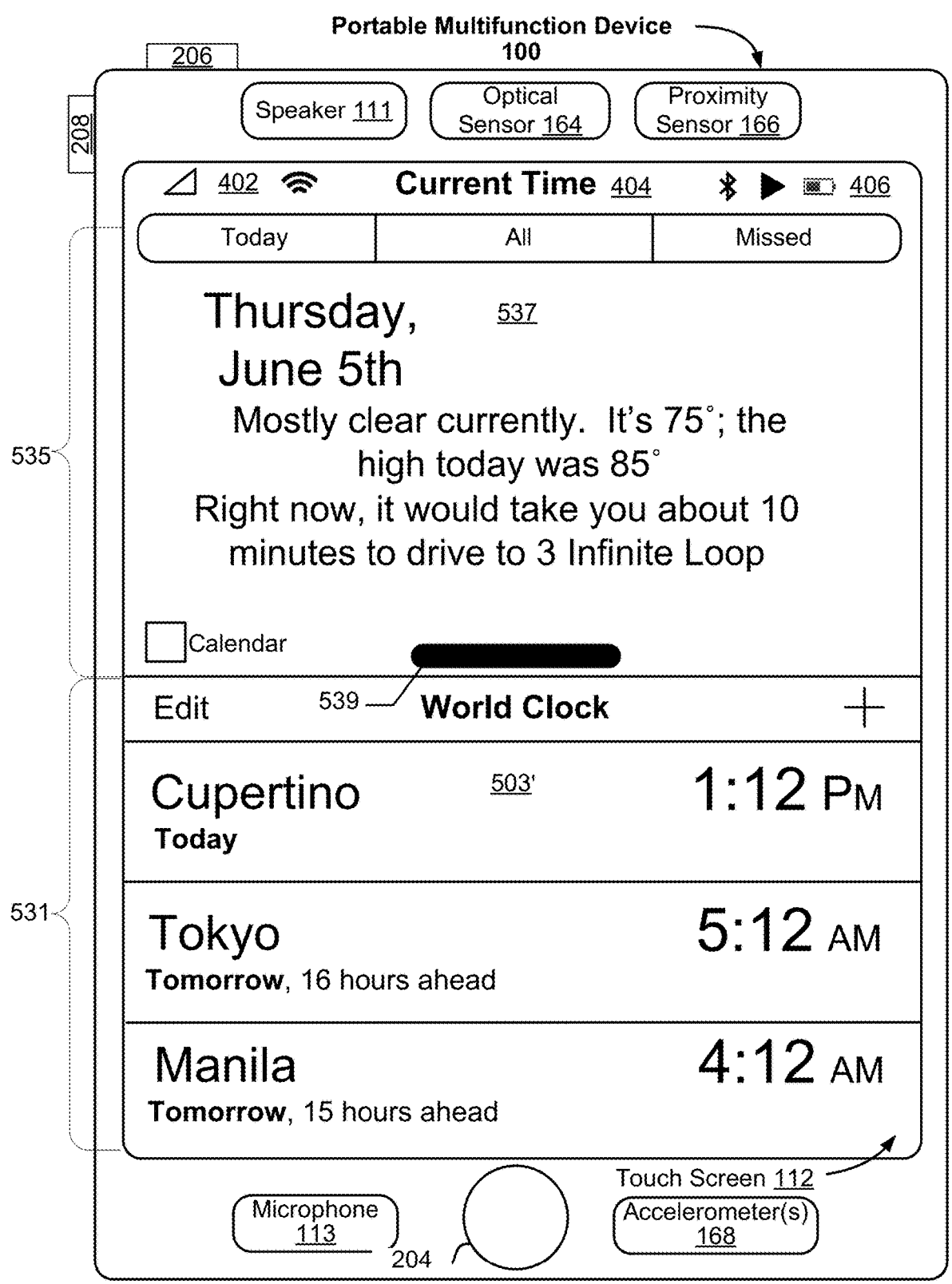

As shown in FIG. 5H, as user drags the handle UI element 539 downward in the vertical direction, the device 100 displays a portion of the notification view 537 in the top area 535 with a height that is proportional to the magnitude of movement of the handle UI element 539 in the vertical direction. The device 100 displays the blank screen 533 in the remaining portion of the top area 535 that is not occupied by the notification view 537. If the user drags the handle UI element 539 to the bottom of the top area 535, the device 100 displays the notification view 537 in its entirety such that the notification view 537 occupies the entire top area 535 of the touch screen 112 as shown in FIG. 5I. The bottom of the top area is the border between the top area 535 and the bottom area 531. In some embodiments, the notification view 537 is displayed in the full screen mode rather than only occupying the top area 535.

In some embodiments, if the handle UI element 539 is dragged downward less than a threshold distance, the device 100 displays a portion of the notification view that is proportional to the magnitude of movement of the handle UI element 539 in the vertical direction in the top area 535 as described above. The threshold distance is optionally ¾ of the height of the top area 535 relative to the top of the touch screen 112. Alternatively, the threshold distance is ⅓ of the height of the touch screen 112 relative to the top of the touch screen 112. In some embodiments, if the handle UI element 539 is dragged downward greater than the threshold distance from the top of the touch screen 112, the device 100 automatically displays the notification view 537 in its entirety in the top area 535 such that the notification view 537 occupies the entire top area 535 of the touch screen 112.

To display the notification view 537 in accordance with the threshold distance, the device 100 detects the contact 523 on the handle UI element 539 as shown in FIG. 5G. The device 100 detects a continuous movement of the contact 523 moving the handle UI element 539 in a direction of the continuous movement that has a vertical component. If the device 100 detects that the vertical component is less than a threshold distance, the device 100 determines a magnitude of the vertical component of the continuous movement and displays a portion of the notification view 537 in the top area 535 with a height that is proportional to the magnitude of the vertical component as shown in FIG. 5H. If the device 100 detects that the vertical component is greater than the threshold, the device 100 displays the notification view 537 in its entirety in the top area thereby occupying the entire top area 535 of the touch screen 112. Alternatively, the device 100 displays the notification view 537 in the full screen mode. In some embodiments, the handle UI element 539 is not displayed and the notification view 537 is displayed in response to detecting a downward gesture from a top edge of the touch screen 112.

Figure 5J:
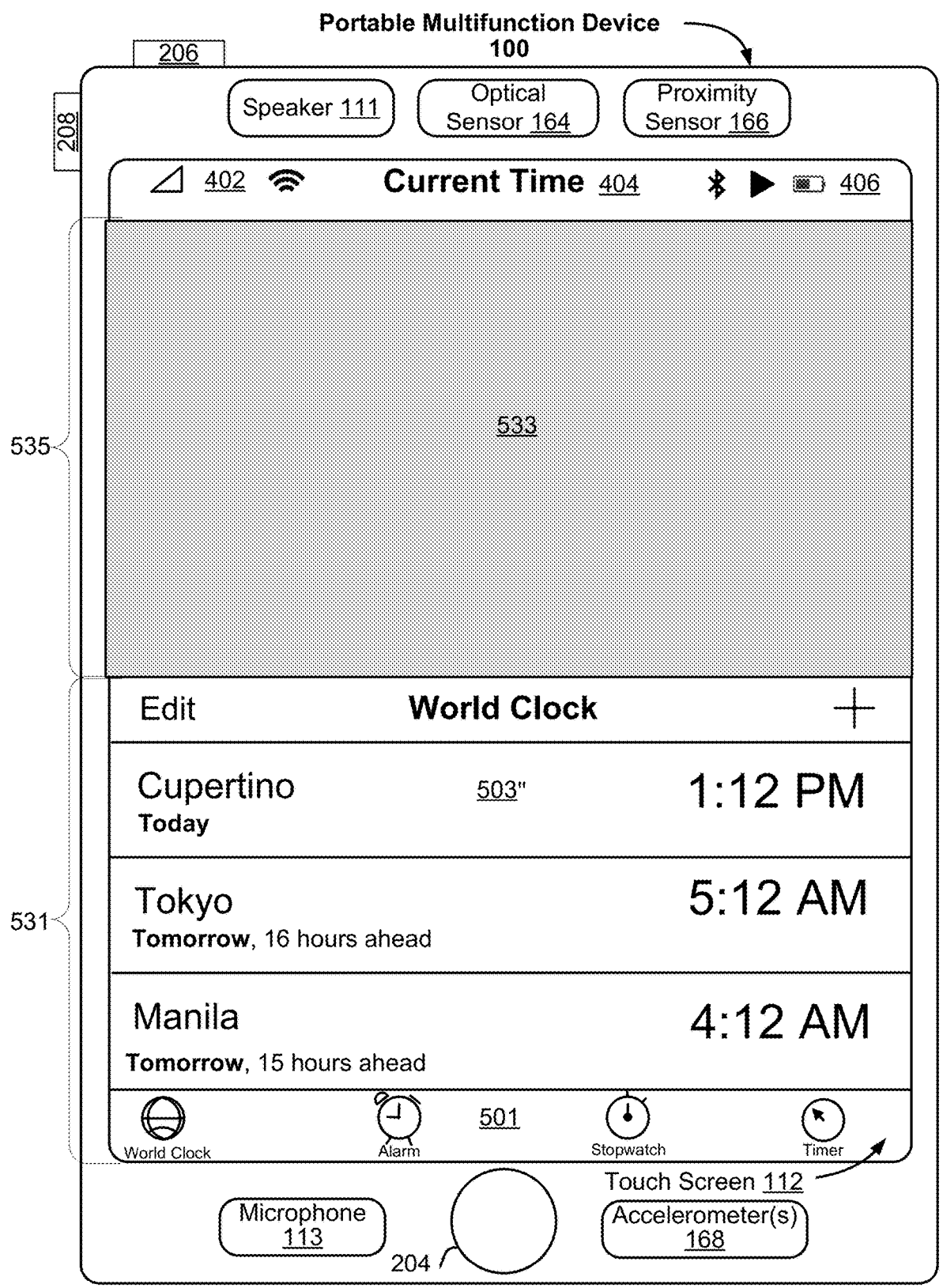

FIG. 5J illustrates another exemplary embodiment of the ergonomic mode of an application. As mentioned previously with respect to FIG. 5E, during the ergonomic mode, the device 100 displays the content area 503' of the world clock view of the calendar application in a bottom area 531 of the touch screen display 112 without the toolbar 501 and displays a blank screen 533 in a top area 535 located above the content area 503. In FIG. 5E, the world clock view of the clock application displayed in the full screen mode was merely shifted downward in the vertical direction to the bottom area 531. In contrast, in some embodiments, during the ergonomic mode the device 100 resizes the application view displayed in the full screen mode to fit into the bottom area 531 of the touch screen 112 as shown in FIG. 5J. As shown in FIG. 5J, the world clock view of the clock application is resized such that both the content area 503" of the world clock view and the toolbar 501 are displayed in the bottom portion 531 of the touch screen 112 during the ergonomic mode.

To display the resized application, the device 100 first determines an application view of the application in the full screen mode that includes both the content area 503 and the toolbar 501. That is, the device 100 creates a view of the application that includes both the content area 503 and the toolbar 501. The device 100 creates the view such that it can fit in the bottom portion 531 of the touch screen 112. The content (e.g., text, images, etc.) and toolbar of the application are resized by the device 100 according to formatting rules that ensure the content and toolbar are still readable by the user.

Figure 5K:
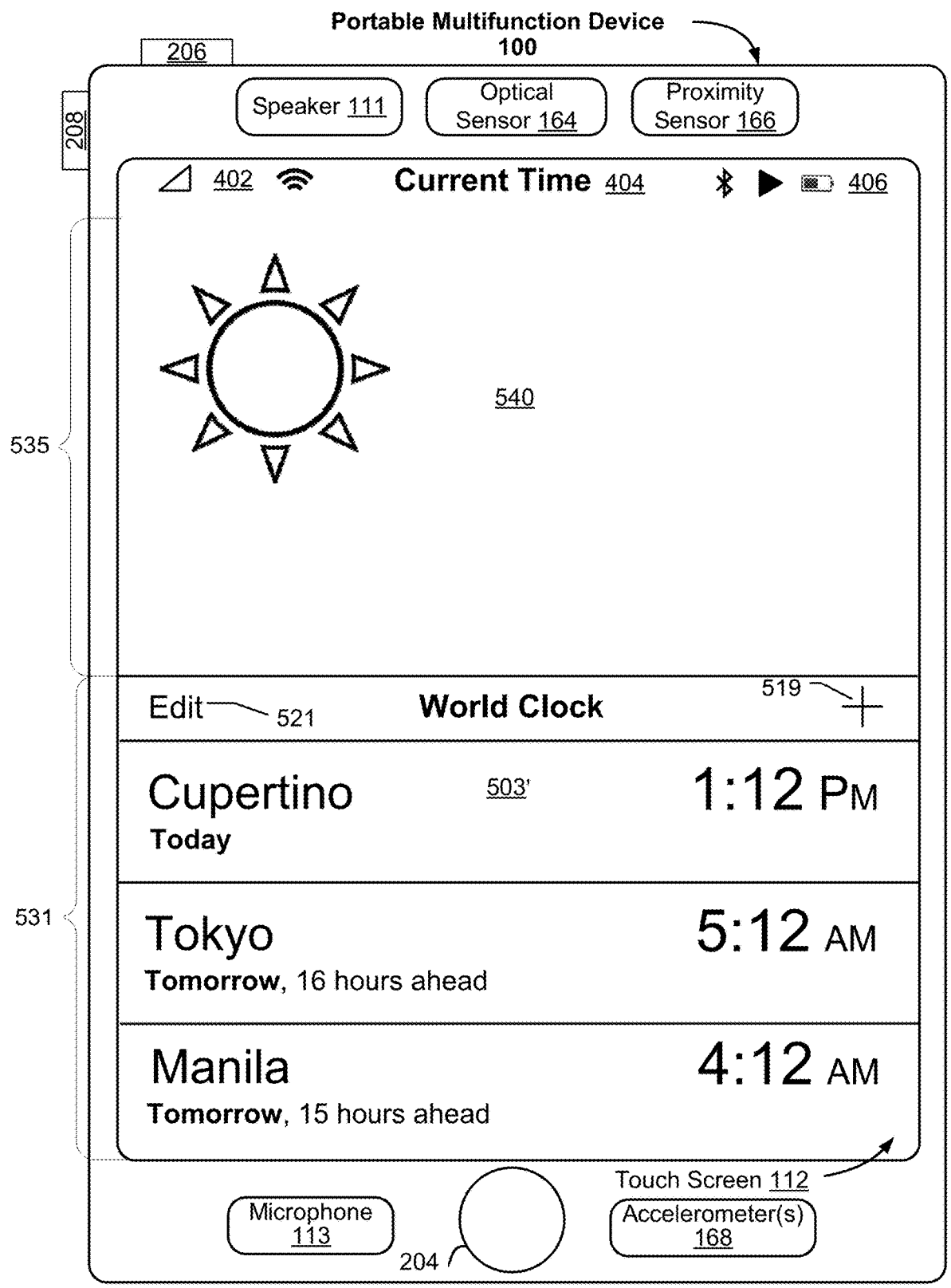

FIG. 5K illustrates another exemplary embodiment of the ergonomic mode of an application. As mentioned previously, during the ergonomic mode, the device 100 displays the content area 503' of the world clock view of the calendar application in a bottom area 531 of the touch screen display 112 with or without the toolbar 501. In contrast to the user interfaces shown in FIGS. 5E, 5F, 5G, and 5J, the device 100 optionally displays a background image 540 of the device 100 in the top area 535 of the touch screen 112. The background image 540 (otherwise known as "wallpaper") corresponds to an image displayed on the device 100 when the home screen view of the device 100 is displayed on the touch screen 112 as will be further described below.

In the example shown in FIG. 5K, the background image 540 comprises a picture of the sun. By displaying the background image 540 rather than the blank screen 533 in the top area 535, that maximizes screen real estate and improves the visual experience for the user. In some embodiments, icons and/or widgets displayed on the home screen view shift downward while the background image 540 of the home screen view remains in a fixed or relatively fixed position on the touch screen 112 when the ergonomic mode of the application is activated.

While an application is displayed in the ergonomic mode, the application is user-interactable (e.g., responsive to user inputs) based on the type of input received by device 100. In some embodiments, the device 100 is optionally allowed to receive navigation inputs while in the ergonomic mode. A navigation input includes a request to scroll through the content of the application, scroll through lists, or scroll through different views of the application. In accordance with the device 100 determining that a navigation input is received, the device 100 navigates within the application without switching back to the full screen mode of the application. For example, in any of FIGS. 5E through 5K the device 100 optionally scrolls through additional rows of cities that are not displayed in the FIGS. 5E and 5K in response to a navigation input assuming that additional cities are displayed below the current time for Manila, Philippines. In some embodiments, the device 100 detects the request to scroll through the content of the application by detecting a contact at a first position on the touch screen 112 and detects a continuous movement of the contact to a second position on the touch screen 112. The continuous movement has a lateral (e.g., horizontal) component or a horizontal component of movement without the contact breaking contact with the touch screen 112. In accordance with detecting the continuous movement, the device 100 scrolls to a different view of the application.

Figure 20B:
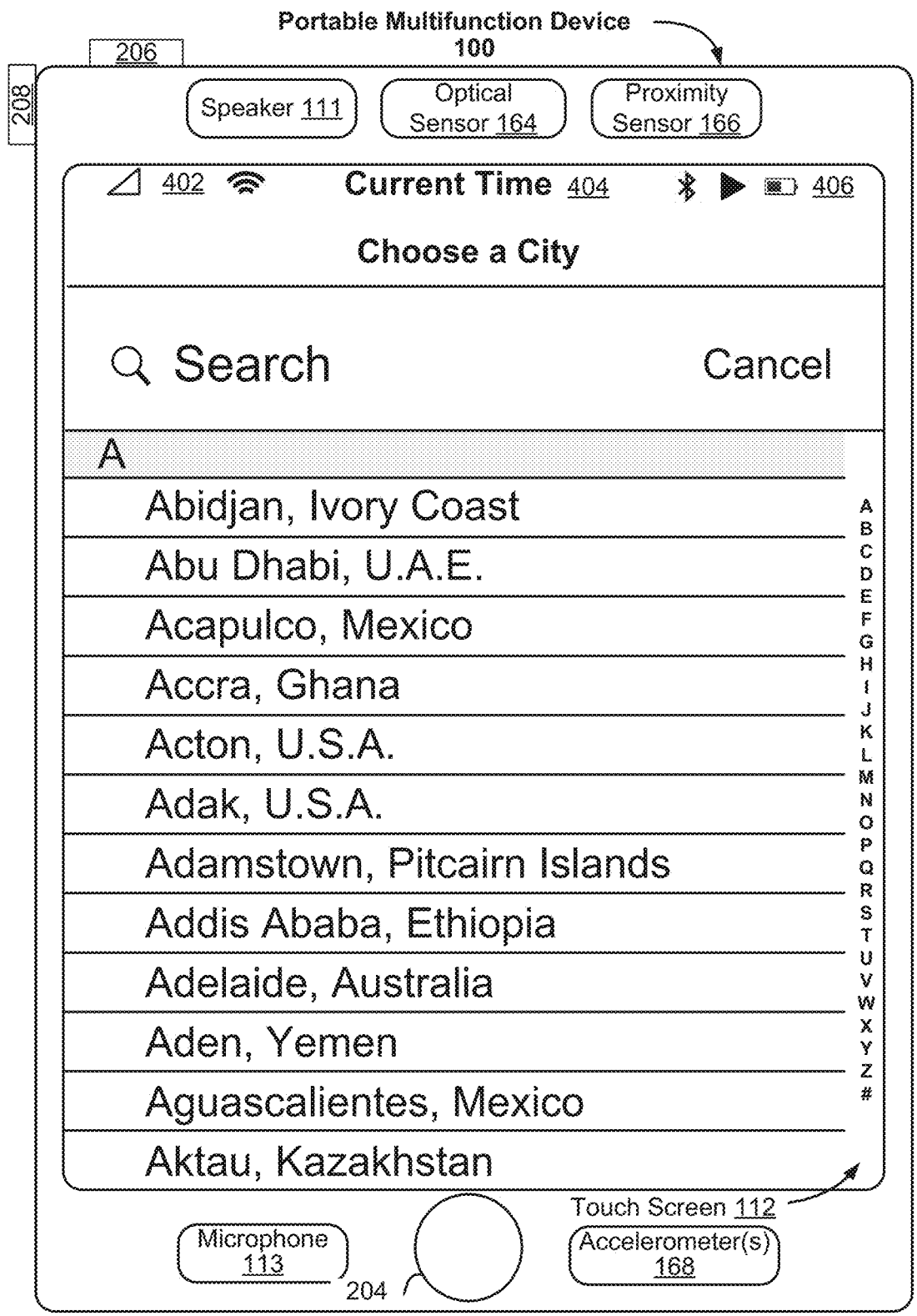

While an application can receive navigation inputs while displayed in the ergonomic mode, in some embodiments the application cannot receive object interaction inputs while the application is displayed in the ergonomic mode. In contrast to a navigation input, an object interaction input is a user input interacting with a user interface object of the application according to some embodiments. Examples of object interaction inputs are the user selecting the add UI element 519 or the edit UI element 521. If the device 100 determines an object interaction input is received while the application is displayed in the ergonomic mode, the device 100 generates a response to the object interaction input and switches from displaying the application in the ergonomic mode to displaying the application in the full screen mode. For example, if the device 100 detects a user selection of the add UI element 519 represented by contact 2002 shown in FIG. 204 the device 100 generates a view of the clock application for adding another city to the world clock view and switches from displaying the ergonomic mode of the world clock view to displaying the generated view in the full screen mode, as depicted in FIG. 20B.

In some embodiments, the device 100 automatically switches from displaying an application in the ergonomic mode back to the full screen mode based on time. The device 100 determines an amount of time since a user input to the application was last received while the application is displayed in the ergonomic mode. To determine the amount of time, the device 100 optionally executes a timer that counts the amount of time since an input to the application was last received during the ergonomic mode. If the device 100 determines that the amount of time exceeds a threshold, the device 100 automatically switches from displaying the application in the ergonomic mode to the full screen mode. However, if a user input is received prior to the amount of time exceeding the threshold, the device 100 resets the timer.

In some embodiments, after entering the ergonomic mode and prior to detecting an input while in the ergonomic mode, the device 100 first uses a first time threshold to determine whether to automatically switch back to the full screen mode of the application. Before receiving an input while in the ergonomic mode, the device uses the first time threshold for automatically determining whether to return to the full screen mode so that the device 100 switches back to the full screen mode if an input is not received within the first time threshold. After receiving an input while in the ergonomic mode prior to the first time threshold expiring, rather than reset the first time threshold in response to receiving the user input prior, the device 100 reduces the threshold to a second time threshold that is shorter than the first time threshold. In accordance with the device 100 receiving another input to the application while the amount of time since the input to the application was last received is less than the second time threshold, the device 100 increases the threshold. By receiving further inputs from the user prior to the expiration of the second time threshold, the device 100 determines that the user intends to interact with the application while the application is displayed in the ergonomic mode and thus increases the second time threshold. However, if the amount of time since the input to the application was last received exceeds the second time threshold, the device 100 automatically switches from displaying the application in the ergonomic mode back to the full screen mode.

In some embodiments, the device 100 switches from displaying an application in the ergonomic mode back to the full screen mode upon user request. In particular, if the device 100 detects a repetition of a gesture used to activate the ergonomic mode of the application while the application is displayed in the ergonomic mode, the device 100 switches from displaying the application in the ergonomic mode back to the full screen mode. For example, an edge swipe gesture detected by the device 100 causes the device 100 to activate the ergonomic mode of an application and the device 100 detects a repetition of the edge swipe gesture while the ergonomic mode of the application is displayed on the touch screen 112, the device 100 switches from displaying the application in the ergonomic mode to the full screen mode. Alternatively, if the device 100 detects any type of input that can be used to activate the ergonomic mode (e.g., corner edge swipe, flick gesture on menu button 204) while the application is already displayed in the ergonomic mode, the device 100 switches from displaying the application in the ergonomic mode to the full screen mode. In some embodiments, an input (e.g., a tap gesture, a double tap gesture, a swipe gesture) on the blank screen 533 or the background image 540 while the application is displayed in the ergonomic mode also causes the device 100 to switch from displaying the application in the ergonomic mode to the full screen mode. In some embodiments, if the reverse of the gesture used to activate the ergonomic mode of the application is received, the device 100 switches from displaying the application in the ergonomic mode back to the full screen mode.

In some embodiments, the ergonomic mode of the application is automatically locked by the device 100 until a full press of the menu button 204 is detected by the device 100. If the ergonomic mode of the application is locked, the device 100 prevents (or forgoes) the switching from the ergonomic mode back to the full screen mode of the application. Thus, the device 100 does not switch from the ergonomic mode of the application back to the full screen mode of the application in response to an interaction input. The device 100 optionally ignores any object interaction inputs received from the user while displayed in the application is displayed in the ergonomic mode. Similarly, the device 100 does not switch from the ergonomic mode of the application back to the full screen mode of the application based on time. Thus, in some embodiments, the ergonomic mode is only exited responsive to the device 100 detecting a full press of the menu button 204.

Figure 5L:
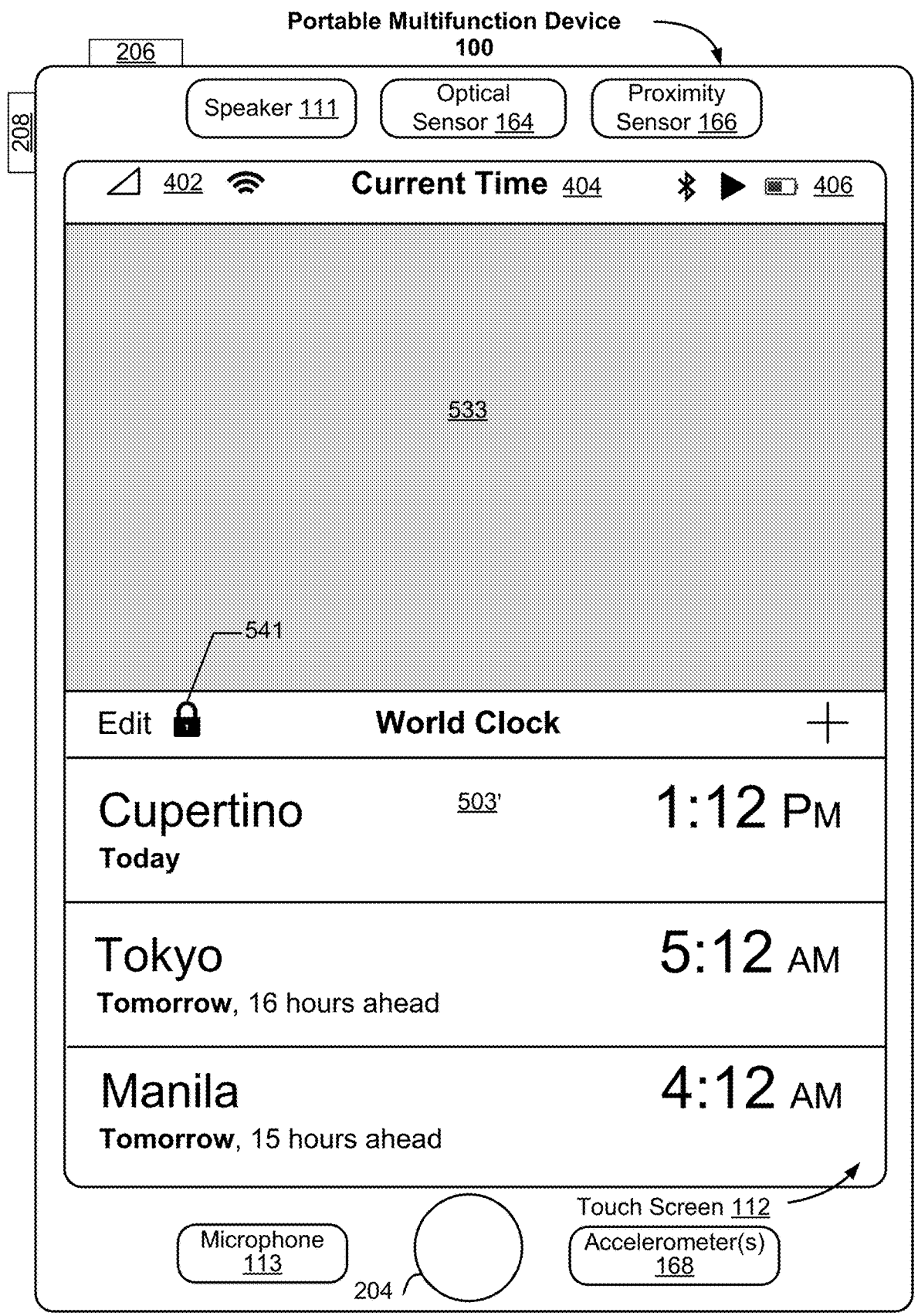

The ergonomic mode of the application is optionally locked by the device 100 upon user request. While in the ergonomic mode, the device 100 optionally displays a user interface element associated with preventing the switching from the ergonomic mode to the full screen mode. For example, FIG. 5L illustrates a lock user interface element 541 that is included in the ergonomic mode of the world clock view of the clock application. If the device 100 detects a selection of the lock user interface element 541, the device 100 locks the application in the ergonomic mode. In some embodiments, the device 100 does not automatically switch from the ergonomic mode of an application to the full screen mode of the application after a threshold amount of time from when a last input was received if the ergonomic mode is locked.

In some embodiments, the application is locked in the ergonomic mode even if the application is dismissed. For example, the device 100 receives an input from the user to dismiss the application from being displayed on the touch screen 112 while the application is locked in the ergonomic mode. At a later time, the device 100 receives an input from the user to open the application. In response, the device 100 automatically displays the application in the ergonomic mode since the ergonomic mode of the application is locked. While the application is locked in the ergonomic mode, the user may unlock the ergonomic mode by reselecting the lock user interface element 541.

In some embodiments, the ergonomic mode of an application is persistent across all applications of the device 100. While a first application is displayed in the ergonomic mode, the device 100 receives an input to close the first application and the device 100 closes the first application in accordance with the input. The device 100 then receives an input to open a second application and automatically displays the second application in the ergonomic mode rather than the full screen mode responsive to receiving the input to open the second application. Thus, the device 100 automatically displayed the second application in the ergonomic mode because the ergonomic mode was activated in the first application prior to the first application being closed.

Alternatively, the device 100 automatically deactivates the ergonomic mode of an application if the application is closed while the application is displayed in the ergonomic mode. For example, while the application is displayed in the ergonomic mode, the device 100 receives an input to close the application and closes the application in accordance with the input. The device 100 then receives an input to open the application and automatically displays the application in the full screen mode in response to the input. Thus, the ergonomic mode of the application was deactivated upon closure of the application.

In some embodiments, the ergonomic mode of an application is persistent in the application if the application is closed while displayed in the ergonomic mode. For example, while the application is displayed in the ergonomic mode, the device 100 receives an input to close the application and closes the application in accordance with the input. The device 100 then receives an input to open the application and automatically displays the application in the ergonomic mode in response to the input. Thus, the ergonomic mode of the application is persistent in the application even if the application was closed.

Figure 6A:
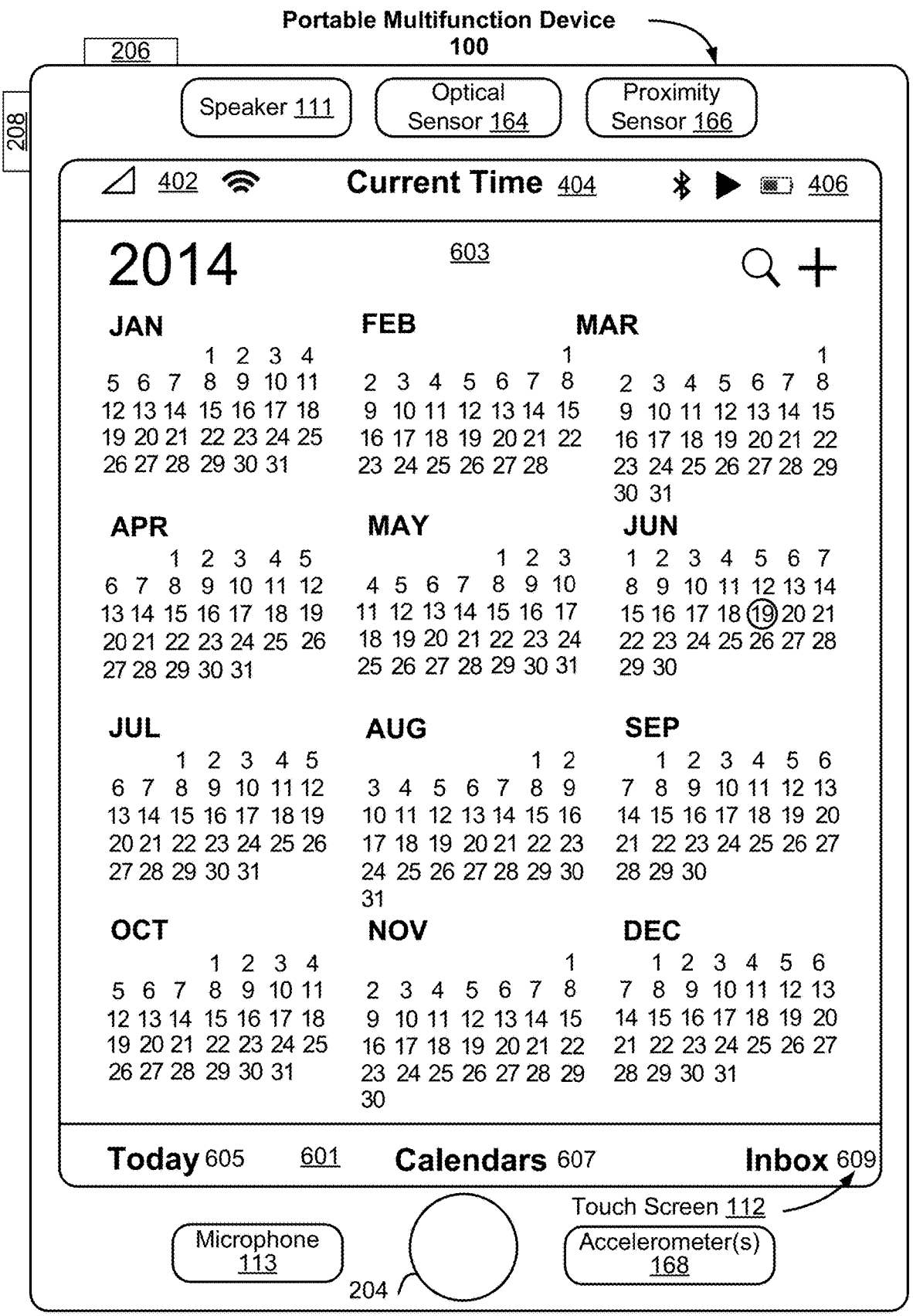
FIG. 6A illustrates an exemplary user interface of a calendar application in accordance with some embodiments.

FIG. 6A is an exemplary user interface of a calendar application. In particular, FIG. 6A illustrates an application view of the full screen mode of the calendar application. Similar to the full screen mode of the clock application described above, the full screen mode of the calendar application includes a toolbar 601 and a content area 603.

The toolbar 601 includes selectable UI elements each associated with a different functionality of the calendar application. In some embodiments, the toolbar 601 includes a today's events UI element 605 associated with events of the current day, a calendars UI element 607 associated with calendar settings, and an inbox UI element 609 associated with received calendar invites. The device 100 displays in the content area 603 an application view corresponding to a selected UI element. In the example shown in FIG. 6A, a today view is displayed in the content area 603 as a result of the selection of the today UI element 605.

In some embodiments, the today view includes a number of different calendar UI views. The calendar UI views include a year view, a month view, and a day view. In particular, FIG. 6A displays the year view of the calendar application in full screen mode. As shown in FIG. 6A, the content area 603 displays twelve months of the calendar year and the toolbar 601 includes the selectable UI elements discussed above.

Figure 6B:
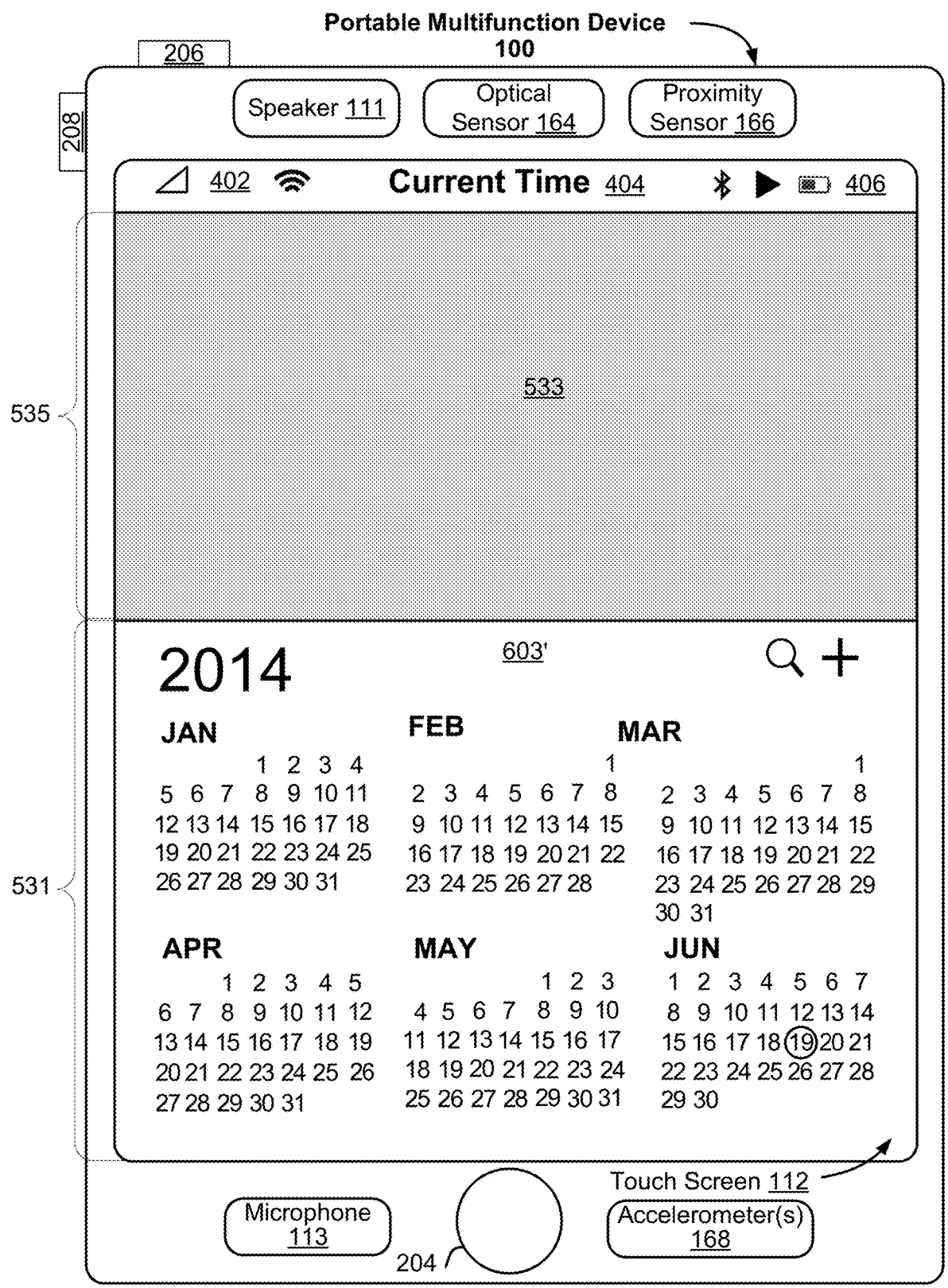
FIG. 6B illustrates an exemplary user interface of an ergonomic mode of the calendar application in accordance with some embodiments.

In response to the device 100 detecting an input to activate the calendar application in the ergonomic mode, the device 100 displays the ergonomic mode of the calendar application as shown in FIG. 6B. As mentioned previously, in the ergonomic mode of an application, the device 100 displays the application in a bottom area 531 of the touch screen 112 with a height that is less than the height of the application while displayed in the full screen mode. As shown in FIG. 6B, during the ergonomic mode the content area 603' of the year view of the calendar application is displayed in the bottom area 531 of the touch screen 112 and a blank screen 533 is displayed in the top area 535 located above the content area 603'. Alternatively, the background image 540 or the notification view is displayed in the top area 535 rather than the blank screen 533 during the ergonomic mode of the calendar application. During the ergonomic mode, the device 100 displays six months of the calendar year in the content area 603 rather than twelve months of the calendar year. In some embodiments, the toolbar 601 of the calendar application is not displayed during the ergonomic mode while in other embodiments the toolbar 601 is displayed during the ergonomic mode.

Figure 7A:
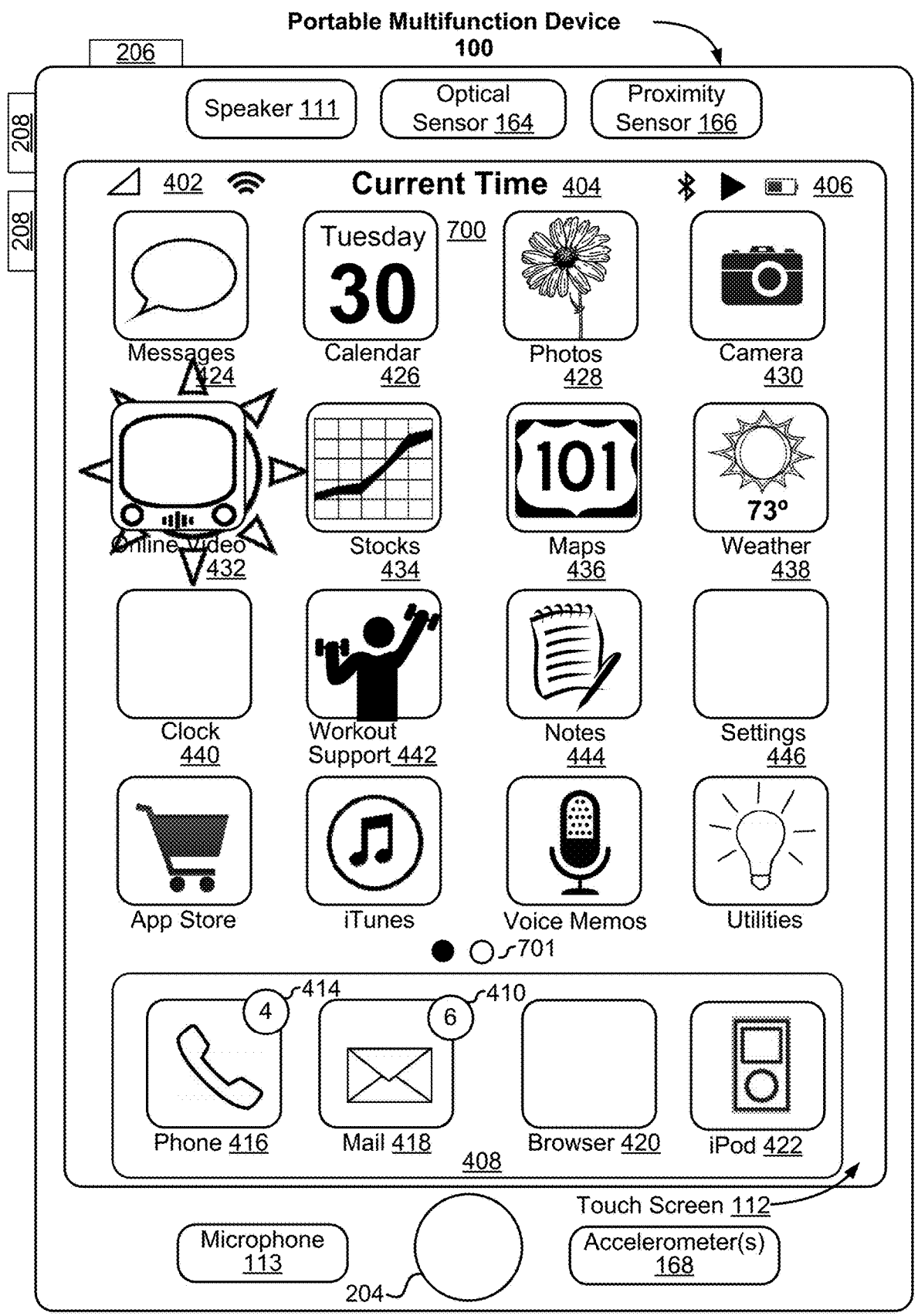
FIG. 7A illustrates an exemplary user interface of a home screen of the multifunction device in accordance with some embodiments.

FIG. 7A illustrates an exemplary user interface of a home screen view 700 of the device 100. In particular, FIG. 7A illustrates the home screen view 700 of the device 100 displayed in a full screen mode. The home screen view 700 includes multiple, application user interface (UI) elements (e.g., messages icon 424, calendar icon 426, photos icon 428) referred to as icons or application icons and the tray 408 in the foreground. In some embodiments, the tray 408 is also referred to as a dock. In some embodiments, each icon is associated with a corresponding application. The home screen view 700 optionally also includes one or more software widgets that are each associated with their own functionality. The user can select an icon from the home screen view 700 to execute a corresponding application on the device 100. In some embodiments, the home screen view 700 is a home page of the device 100 and is displayed in the content area of the touch screen 112 responsive to user selection of the menu button 204. The home screen view 700 also, optionally, displays a background image (e.g., an image of the sun) in the background of the view.

As shown in FIG. 7A, the home screen view 700 includes a page indicator 701 that indicates the number of pages of icons that are available for display on the touch screen 112. The page indicator 701 visually indicates the particular page number of the home screen view 700 currently displayed on the touch screen 112 if the home screen view includes multiple pages. In some embodiments, the page indicator 701 includes a plurality of shapes (e.g., circles) that are each associated with a particular page of the home screen view 700. In FIG. 7A, one of the shapes is filled in to visually indicate which page is currently displayed on the touch screen 112.

Figure 7B:
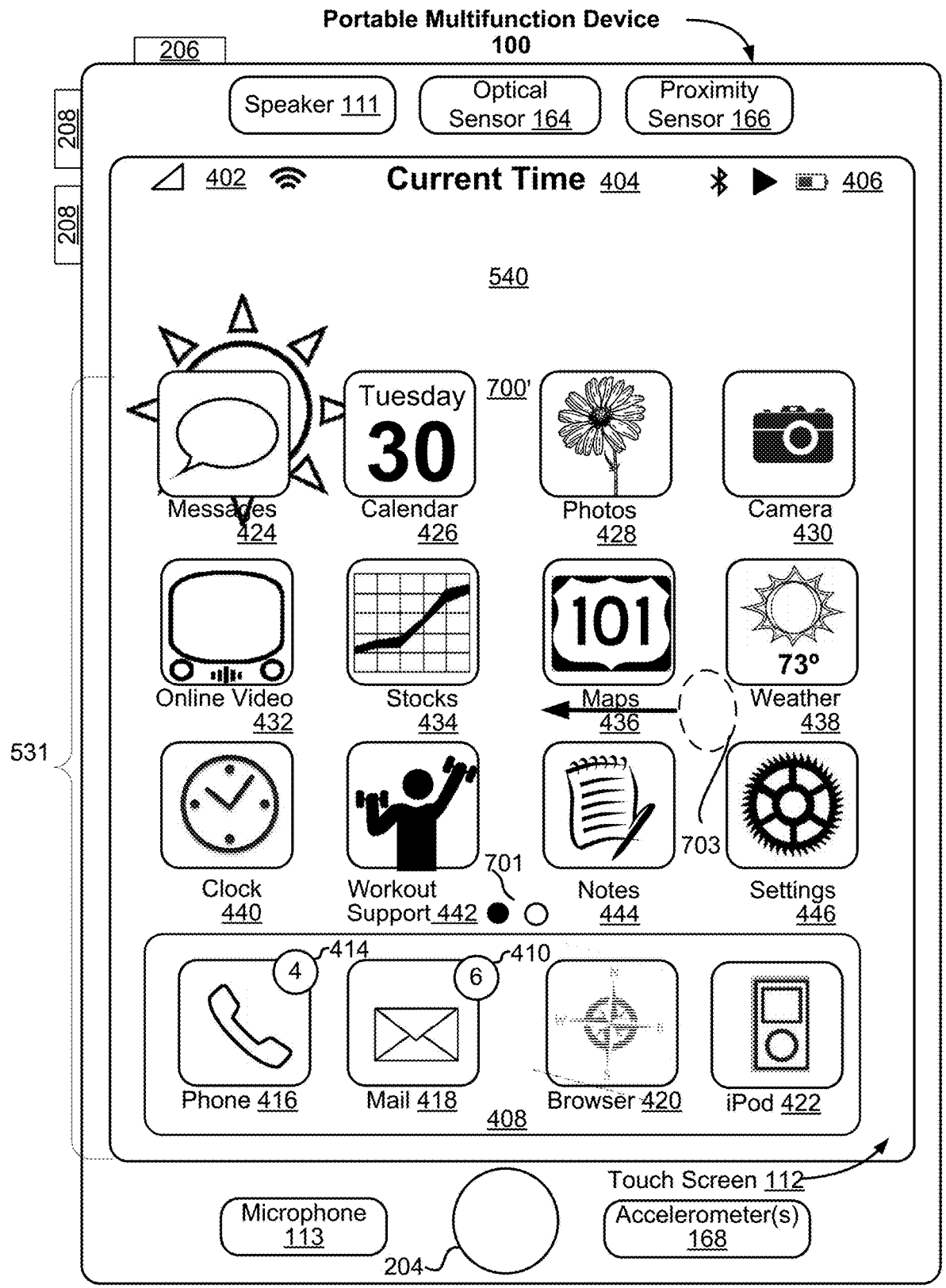
FIGS. 7B, 7C, and 7D illustrate an exemplary user interface of an ergonomic mode of the home screen of the multifunction device in accordance with some embodiments.

For example, in FIG. 7A the first circle is filled in to visually indicate that the first page of the home screen view is currently displayed on the touch screen 112. As shown in FIG. 7A, the first page of the home screen view includes four rows of different icons. In response to a user input to display the home screen 700 in the ergonomic mode, the device 100 displays the ergonomic mode of the home screen 700' as shown in FIG. 7B. In the ergonomic mode of the home screen 700' shown in FIG. 7B, the device 100 displays the home screen view 700' in a bottom area 531 of the touch screen 112 with a height that is less than the height of the home screen view while displayed in the full screen mode. Particularly, during the ergonomic mode of the home screen view 700, the content area of the home screen view 700' is displayed in a bottom area 531 of the touch screen 112 and the background image 540 is displayed. The device 100 shifts the home screen view 700' in a vertical direction downward until the home screen view is displayed in the bottom area of the touch screen 100 with the height that is less than the height of the home screen view in the full screen mode. The blank screen 533 is optionally displayed in the top area rather than the background image 540.

In some embodiments, the ergonomic mode of the home screen view includes only a portion of the rows of icons and the tray 408. For example, the ergonomic mode of the home screen view 700' includes three rows of icons as shown in FIG. 7B in contrast to the four rows of icons included in the full screen mode as shown in FIG. 7A. During the ergonomic mode, the last row of icons included in the full screen mode is not displayed.

Figure 7C:
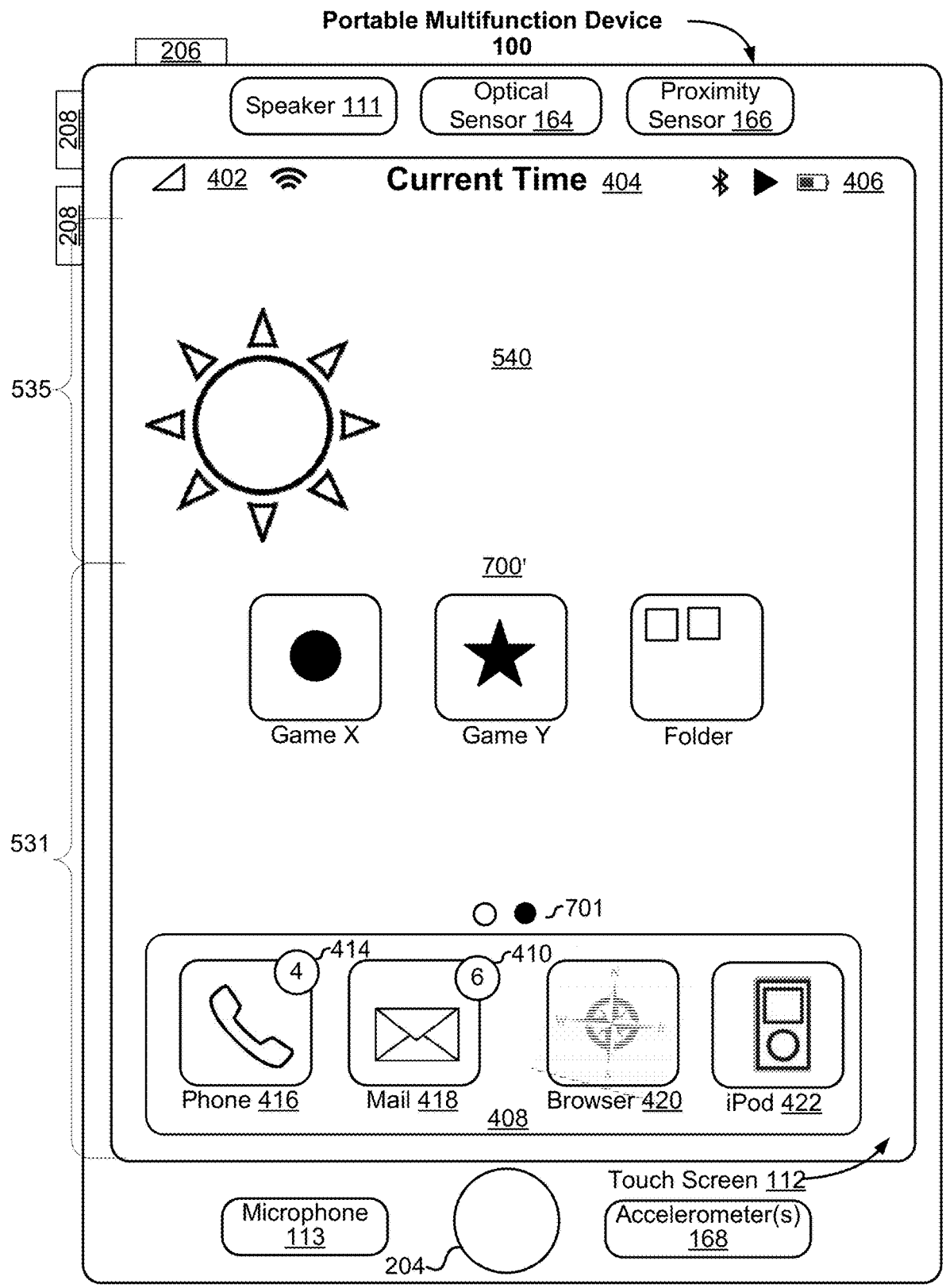

During the ergonomic mode, the user can navigate through the different pages of icons via a swipe gesture 703 as shown in FIG. 7B. In accordance with detecting the swipe gesture 703 in the direction of the arrow shown in FIG. 7B, the device 100 displays another page of icons (e.g., a second home screen view) as shown in FIG. 7C. The page indicator 701 is also updated to visually indicate the second page of icons is currently displayed by filling in the second circle and removing the filling of the first circle. In some embodiments, if the device 100 returns to the full screen mode while the second page of icons is displayed, the device 100 displays the full screen view of the second page of icons on the touch screen 112.

Figure 7D:
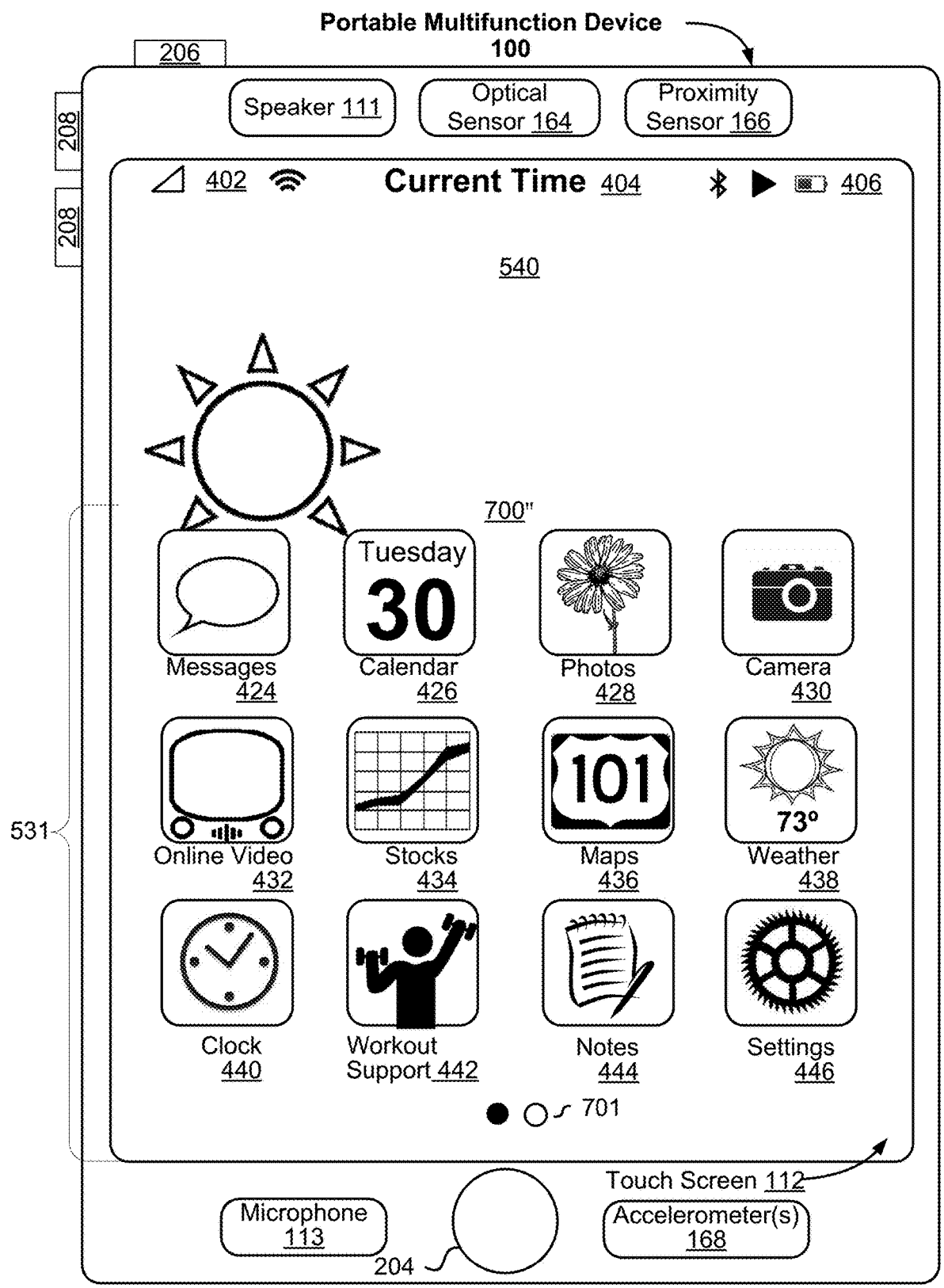

FIG. 7D illustrates an alternative embodiment of the ergonomic mode of the home screen view of the device 100. In FIG. 7D, the home screen view 700" includes the rows of icons and the page indicator 701. However, the home screen view 700" shown in FIG. 7D lacks the tray 408 shown in FIG. 7B.

In some embodiments, device 100 allows the reduction of clutter on the device's home screen view 700 by grouping icons together in a folder. The device 100 creates a folder in response to a user selecting a first icon from the home screen view 700 and dragging the first icon on top of a second icon from the home screen view. The device 100 creates a folder including the first and second icons and an icon that represents the created folder in the home screen view 700.

Figure 8A:
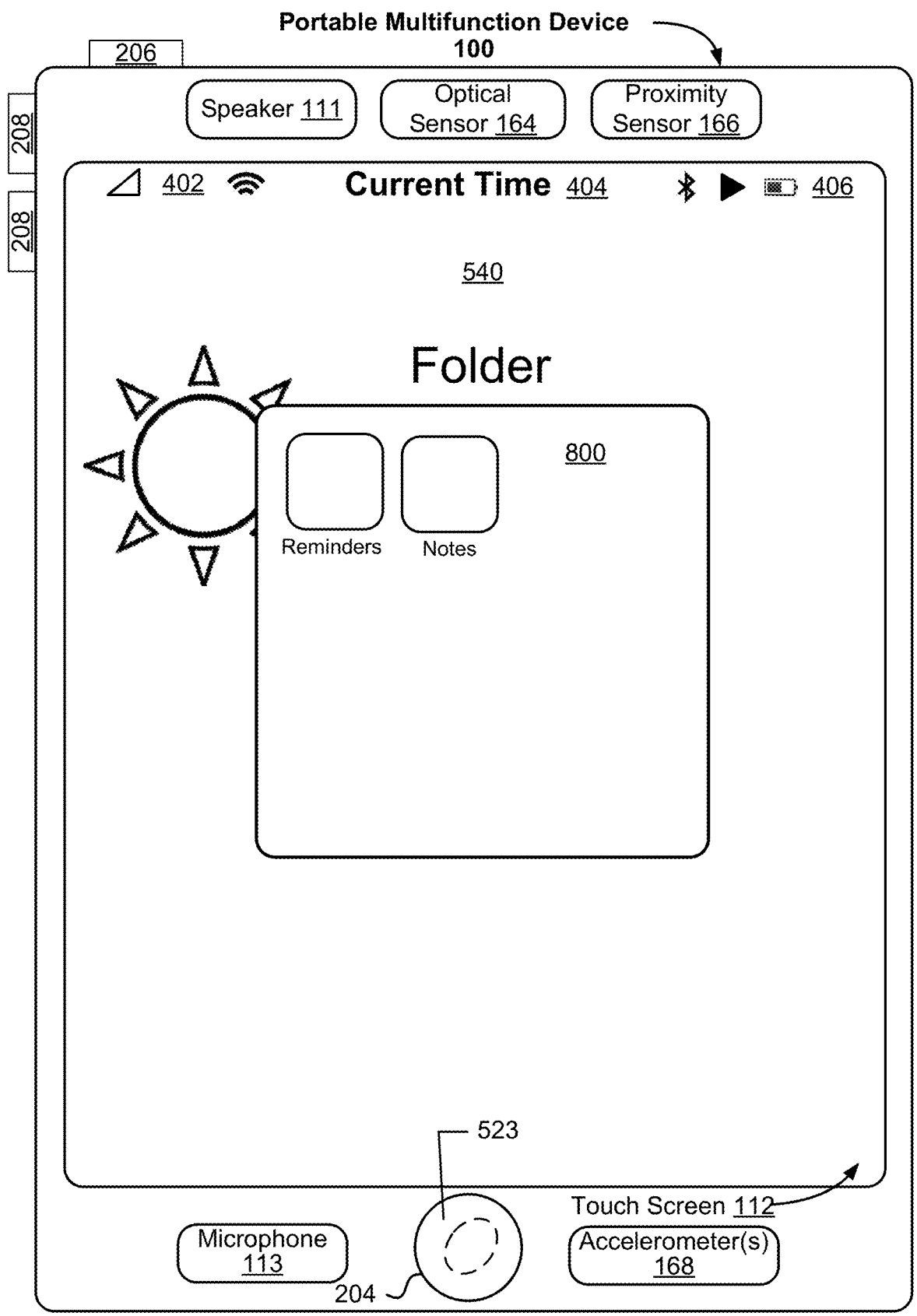
FIG. 8A illustrates an exemplary user interface of a folder in accordance with some embodiments.

FIG. 8A illustrates an exemplary user interface of a folder 800 according to some embodiments. The folder 800 is displayed on the touch screen 112 in response to selection of the icon representing the folder in the home screen view 700 shown in FIG. 7. In FIG. 8A, the folder 800 is displayed in the full screen mode. The folder 800 includes an icon for the application "Reminders" and an icon for the application "Notes." The folder 800 is optionally displayable in the ergonomic mode. In response to the device 100 receiving an input to activate the ergonomic mode of the folder 800, the device 100 switches from displaying the full screen mode of the folder 800 to the ergonomic mode of the folder 800. The input to activate the ergonomic mode is multiple sequential presses of the menu button 204 represented by contact 523. However, other inputs can be received to activate the ergonomic mode as previously described above.

Figure 8B:
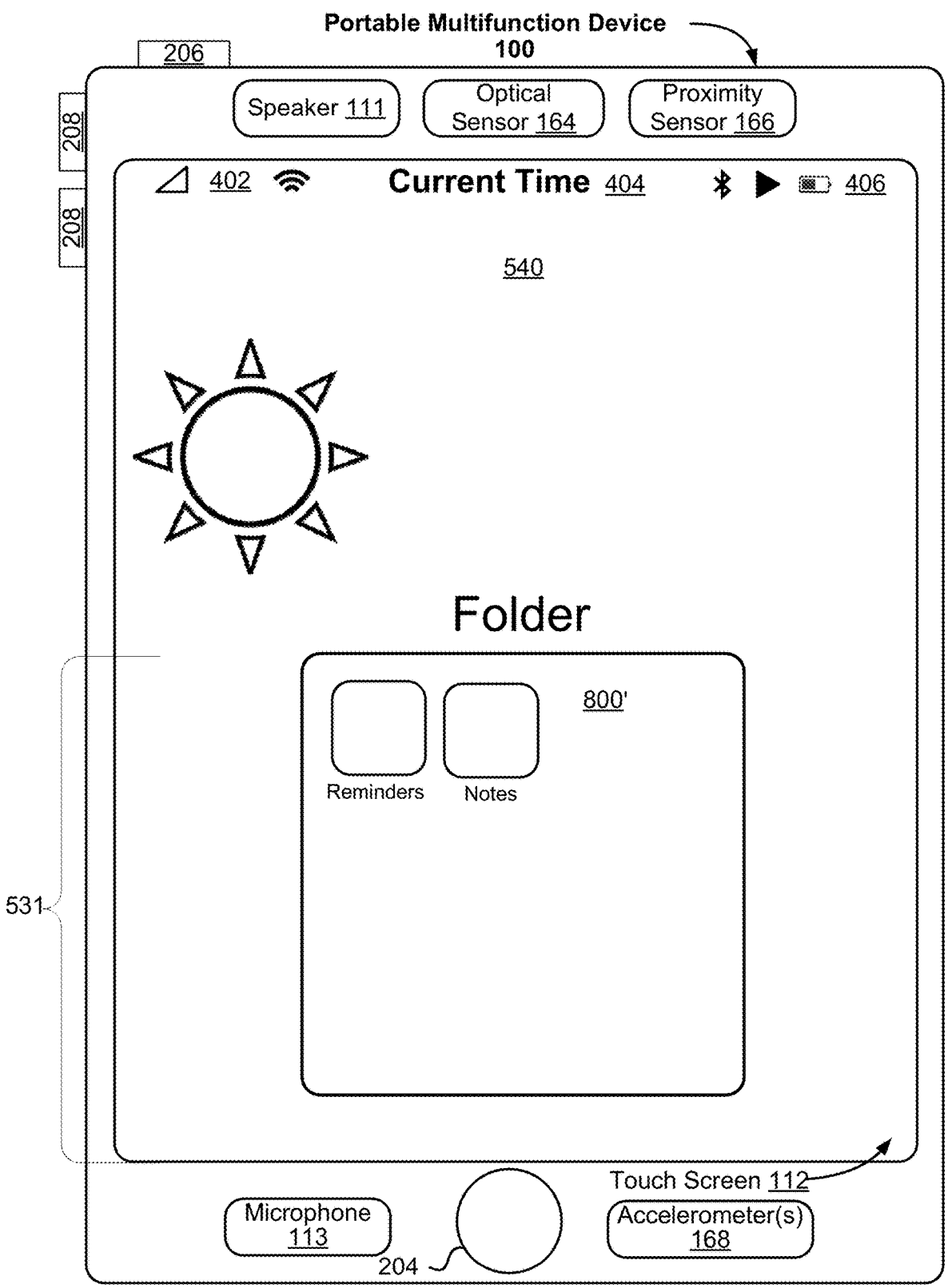
FIG. 8B illustrates an exemplary user interface of an ergonomic mode of the folder in accordance with some embodiments.

FIG. 8B illustrates an exemplary user interface of the folder 800' in the ergonomic mode. In the ergonomic mode, the device 100 displays the folder 800 in the bottom area 531 of the touch screen 112. Thus, the device 100 shifts the folder 800' downward in the vertical direction so that the icons included in the folder 800' are more easily accessible to the user's fingers without requiring the user to reposition the device 100 in the user's hand. In the ergonomic mode, the device 100 continues to display the background image 540 in the background of the touch screen 112. In alternative embodiments, the blank screen 533 or the notification view is displayed in the top area above the folder 800'.

Figure 9A:
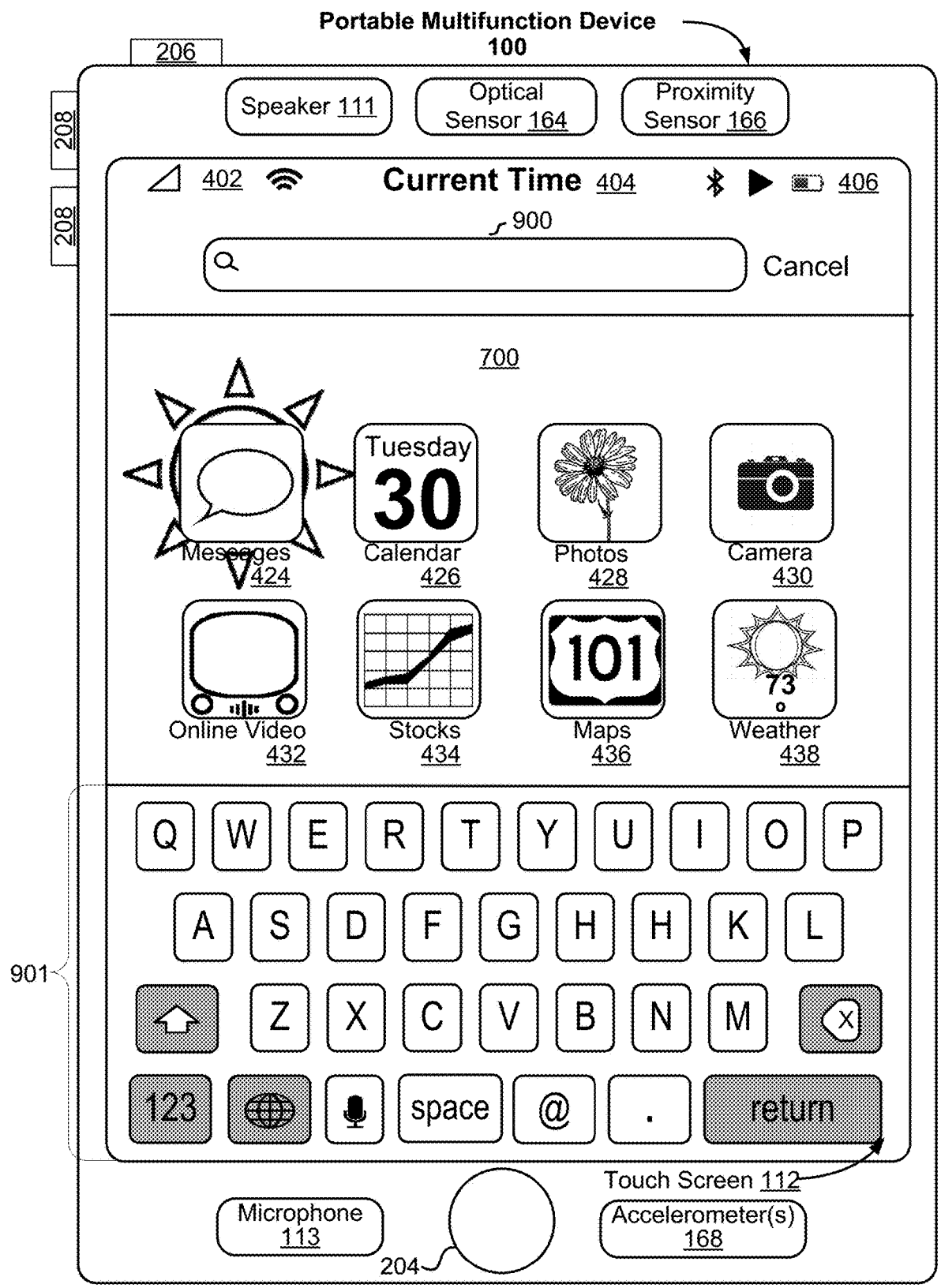
FIG. 9A illustrates an exemplary search user interface in accordance with some embodiments.

In some embodiments, the device 100 allows for searching for content on the device 100. To activate the search functionality, the user optionally inputs a gesture associated with the search functionality (e.g., a downward swipe) on the home screen view 700. Upon detecting the gesture to activate the search functionality, the device 100 displays a search UI. FIG. 9A illustrates an exemplary user interface of the search functionality according to some embodiments. Note that although the search functionality is activated in the home screen view 700, the search functionality can be activated in other applications such as the mail application, messages application, calendar application, etc.

As shown in FIG. 9A, the search functionality UI includes a search field 900 and a keyboard 901 that are displayed with the home screen view 700. The keyboard 901 is optionally displayed below the area displaying the home screen view 700 and the search field 900 is optionally displayed above the area displaying the home screen view 700. The keyboard 901 and the search field 900 can be displayed in other positions than those shown in FIG. 9A.

Figure 9B:
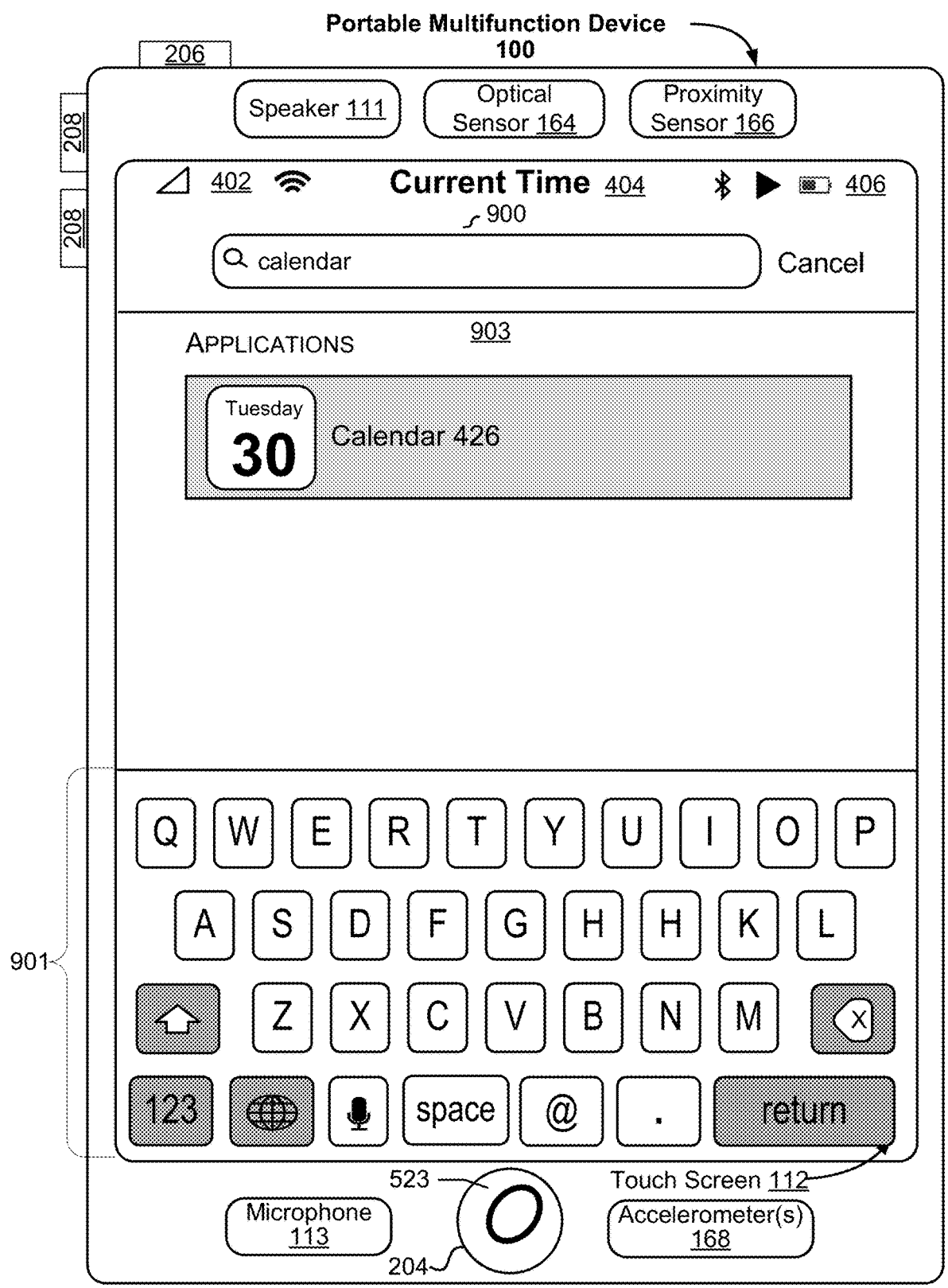
FIG. 9B illustrates an exemplary user interface of search results in accordance with some embodiments.

In some embodiments, the keyboard 901 is a soft keyboard or a virtual keyboard. The device 100 automatically displays the keyboard 901 and the search field 900 when the search functionality is activated. The search field 900 is updated to include any search queries entered by the user into the device 100 using keyboard 901. FIG. 9B illustrates a search query entered in the search field 900 and search results according to some embodiments. As shown in FIG. 9B, the search field 900 includes the query "calendar" and the device 100 replaces the home screen view 700 with search results 903. The search results include content on the device 100 that matches the search query and optionally include one or more remote search results as well (e.g., Internet search results or results retrieved from a remote server such as movie showtimes or current news). In the example shown in FIG. 9B, the query of "calendar" resulted in the device 100 identifying search results 903 that include the calendar icon 426 that activates the calendar application upon selection.

Figure 9C:
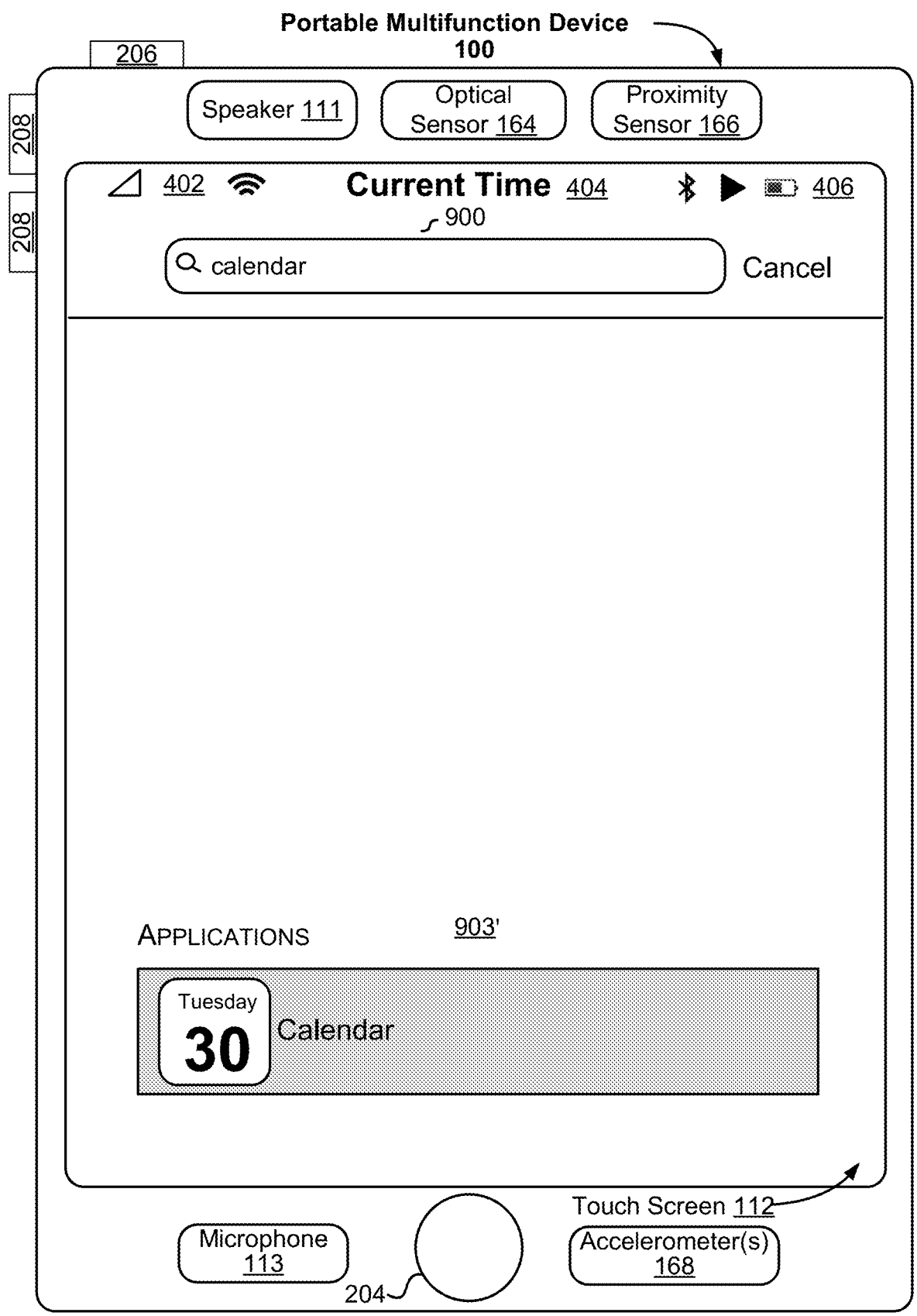
FIG. 9C illustrates an exemplary user interface of an ergonomic mode of the search results in accordance with some embodiments.

In some embodiments, the search results 903 can be displayed in the ergonomic mode. Upon detecting an input to display the ergonomic mode of the search results, the device 100 dismisses the keyboard 901 and shifts the search results 903 vertically toward the bottom area of the touch screen 112 as shown in FIG. 9C. In some embodiments, the device 100 displays an animation of the search results 903 shifting downward and as the search results 903s shift downward the keyboard 901 is moved off of the touch screen 112. As shown in FIG. 9C, the search field 900 is still displayed on the touch screen 112 while the search results 903' are displayed in the ergonomic mode. While in the ergonomic mode, the search results 903' are now more easily accessible to the user's finger without requiring the user to reposition the device 100 in the user's hand.

Figure 10A:
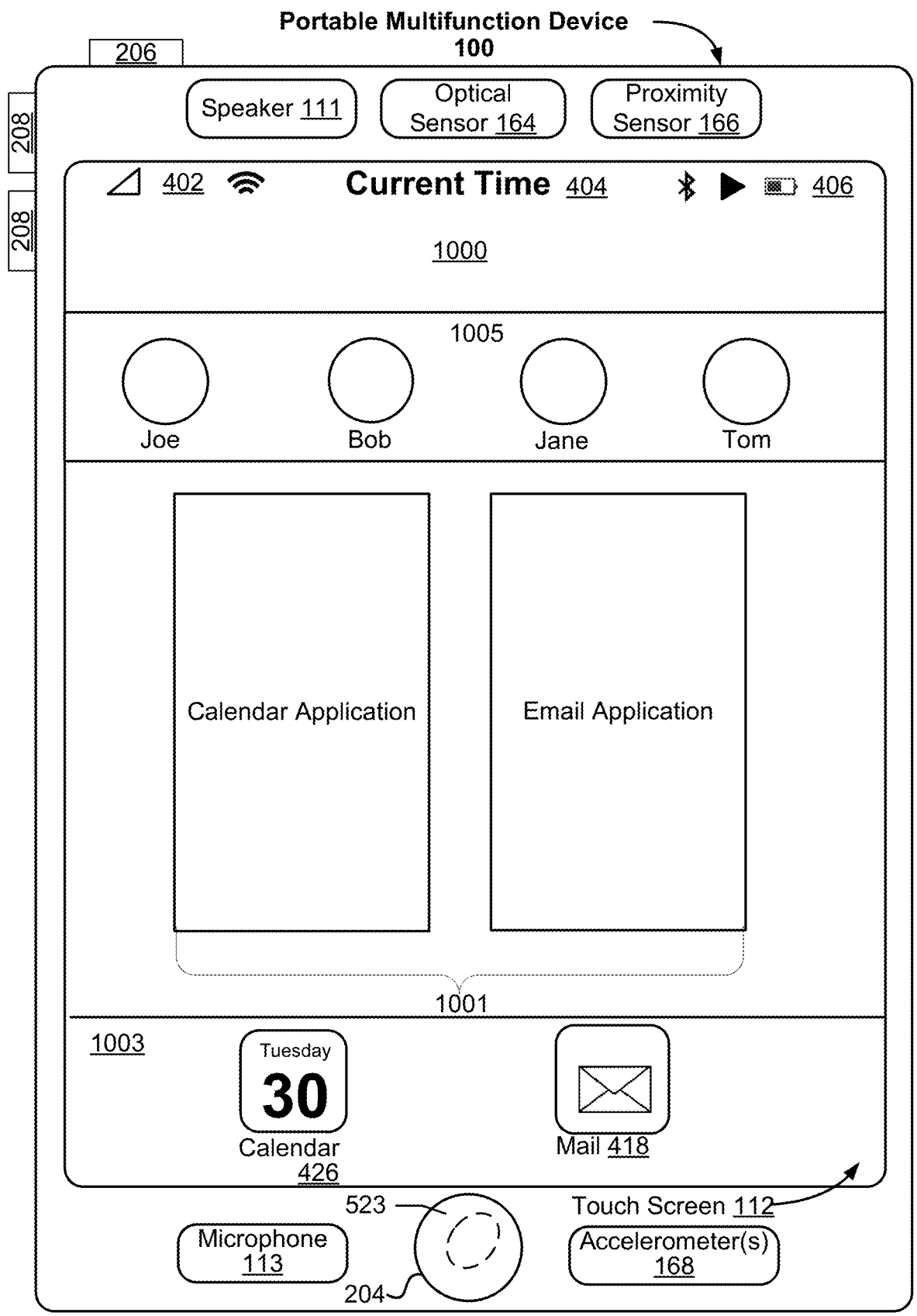
FIG. 10A illustrates an exemplary user interface of a multitasking view in accordance with some embodiments.

In some embodiments, the device 100 provides a multitasking view that displays applications running in the background of the device 100. The user of the device 100 may switch between different applications via the multitasking view. FIG. 10A illustrates an exemplary embodiment of a multitasking view 1000. The multitasking view 1000 is activated via a gesture on the touch screen and/or multiple sequential presses of the menu button 204. As shown in FIG. 10A, the multitasking view 1000 includes graphical representations 1001 of one or more applications executing in the background of the device 100 and an icon area 1003 that includes icons representing the applications. In FIG. 10A, each graphical representation of an application is displayed in a portion of the touch screen 112. For example, FIG. 10A includes graphical representations 1001 of the calendar application and the email application with their respective icons displayed below the graphical representations. The calendar application is displayed in a first portion of the touch screen 112 and the email application is displayed in a second portion of the touch screen 112. The device 100 displays one of the applications in the full screen mode responsive to user selection of either the graphical representation 1001 of the application or the icon representing the application.

In some embodiments, the multitasking view 1000 can be displayed in the ergonomic mode. Upon detecting an input to display the ergonomic mode of the multitasking view 1000, the device 100 shifts the multitasking view 1000 downward toward the bottom area of the touch screen 112, 1909 (FIG. 19). During the ergonomic mode of the multitasking view 1000, the device 100 displays an animation of the graphical representations 1001 of the applications shifting downward and as the graphical representations 1001 of the applications shift downward the icon area 1003 is moved off of the touch screen 112. In some embodiments, the multitasking view 1000 includes a plurality of contact icons 1005, 1911 (FIG. 19) that correspond to recent or favorite contacts displayed above the representations 1001 of applications, and the ergonomic mode enables the user to reach the contact icons without shifting the user's grip (e.g., the contact icons are moved within the reachable area).

Figure 10B:
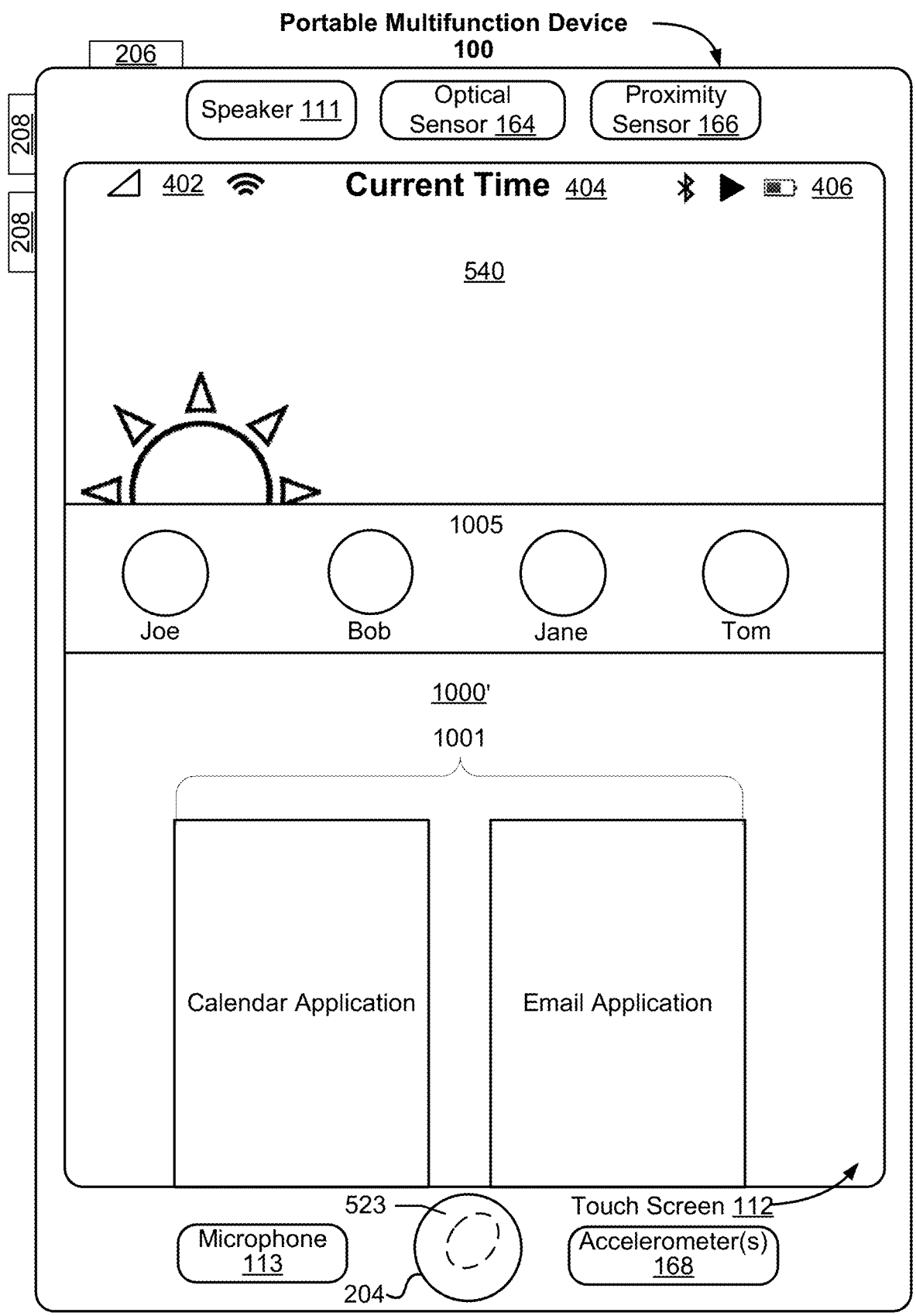
FIG. 10B illustrates an exemplary user interface of an ergonomic mode of the multitasking view in accordance with some embodiments.

FIG. 10B illustrates an exemplary embodiment of the ergonomic mode of the multitasking view 1000'. As shown in FIG. 10B, the multitasking view 1000' is shown in the bottom area of the touch screen 112 and includes only the graphical representations of the applications 1001. In FIG. 10B, the icon area 1003 is no longer displayed on the touch screen 112. Furthermore, the background image 540 of the home screen view 700 is displayed in the area above the multitasking view 1000'. While in the ergonomic mode, the graphical representations 1001 of the applications are now more easily accessible to the user's finger without requiring the user to reposition the device 100 in the user's hand, as shown in FIG. 10B.

In some embodiments, the view of the ergonomic mode of an application displayed on device 100 is dependent on the size of the touch screen 112. Thus, the ergonomic mode of an application can be visually different on devices of different sizes. For example, FIG. 10C and FIG. 10D illustrate the ergonomic mode of the multitasking view as displayed on devices of different size in accordance with some embodiments. In particular, the device 100 shown in FIG. 10C is larger than the device 100 shown in FIG. 10D The reachability area of each device is represented by dashed line 1007 in FIG. 10C and dashed line 1009 in FIG. 10D. Dashed line 1007 and dashed line 1009 are respectively based on the physiological movement range of a use's thumb when holding the device of FIG. 10C and the device of FIG. 10D in one hand in accordance with some embodiments. The reachable areas of the devices represented in FIG. 10C and FIG. 10D are based on the predefined reachability metric for each device as previously described above. Due to the larger touch screen 112 of device 100 in FIG. 10C, the reachable area of the device in FIG. 10C during single handed operation is smaller than the reachable area of the smaller device in FIG. 10D during single handed operation. Due to the smaller reachable area of the touch screen 112 in FIG. 10C, the device displays the multitasking view 1000" further down in the bottom area of the touch screen 112 in the ergonomic mode compared to the embodiment shown in FIG. 10D to allow the user to comfortably interact with the ergonomic mode of the multitasking view 1000" using single handed operation.

In FIG. 10D, the reachable area defined by dashed line 1009 is larger than the reachable area in FIG. 10C so the device displays the ergonomic mode of the multitasking view 1000' higher up in the bottom area of the touch screen 112 compared to the ergonomic mode of the multitasking view 1000" shown in FIG. 10C. Thus, the device does not need to shift the ergonomic mode of the multitasking view further down in the touch screen 112 due to the larger reachable area of the touch screen 112 in FIG. 10D while still allowing for the user to comfortably interact with the ergonomic mode of the multitasking view 1000' using single handed operation.

Figure 11A:
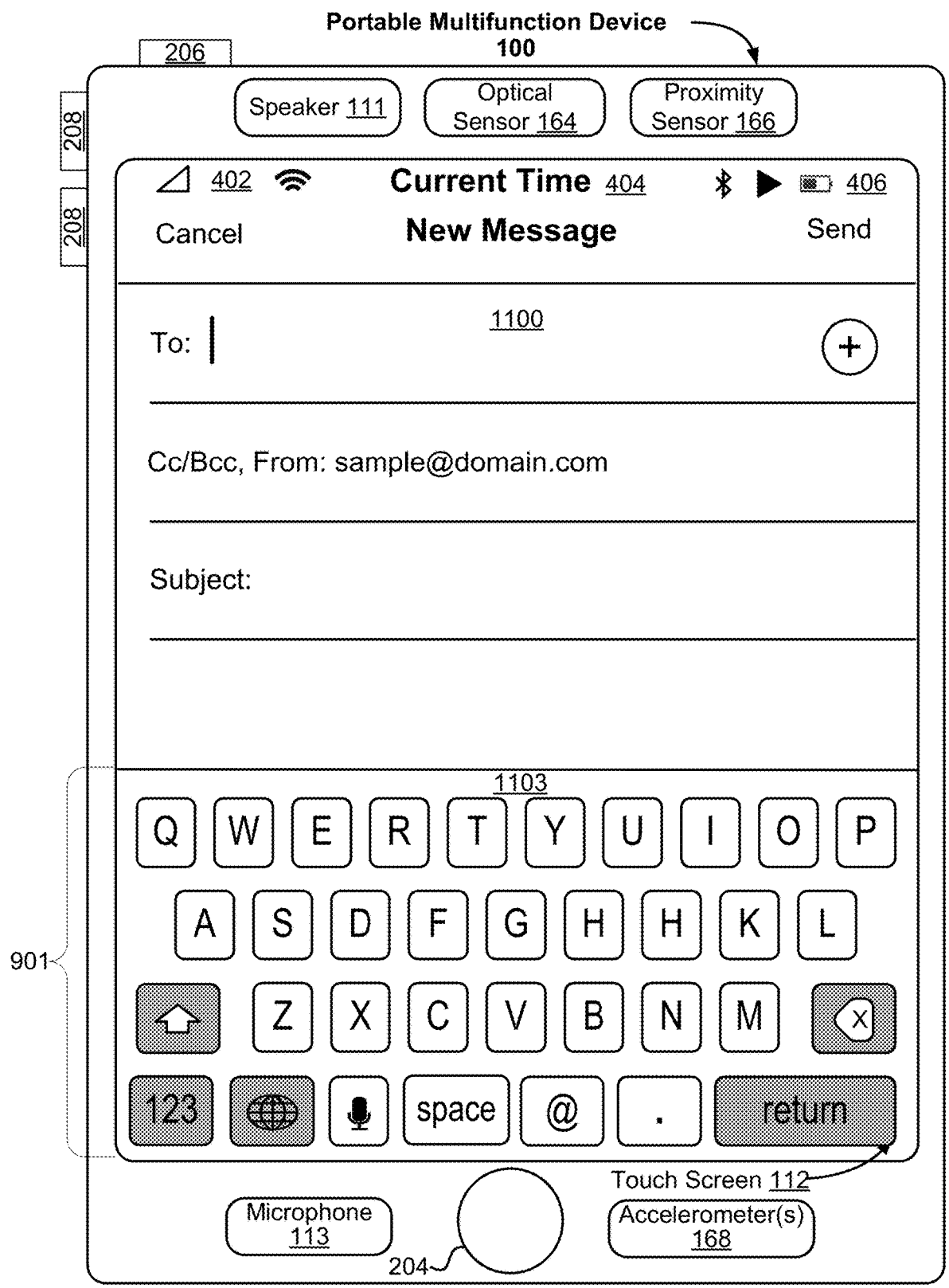
FIG. 11A illustrates an exemplary user interface of an email application and a keyboard in accordance with some embodiments.

As mentioned previously, the embodiments herein also include an ergonomic mode of a keyboard displayed on the display screen of the device 100. The ergonomic mode of the keyboard improves single-handed operation of device 100. FIGS. 11A-11H are used to describe the ergonomic mode of the keyboard. In particular, FIG. 11A illustrates an exemplary keyboard of an email application and a keyboard 901 in the full screen mode while the device is oriented in a portrait mode. While the description herein is described with respect to use of a keyboard with an email application, the embodiments herein can be applied to any application that utilizes a keyboard to enter information into the device 100. In some embodiments, the full screen mode of the application includes the keyboard overlaid the application.

As shown in FIG. 11A, the content area 1100 includes various information fields for an email. For example, the information fields include the "To" field in which the recipient of the email is entered, the carbon copy/blind carbon copy field indicating other recipients of the email, the "from" field indicating the sender of the email, and the "subject" field indicating the title of the email.

The keyboard 901 is optionally displayed below the content area 1100 of the email application. The device 100 automatically displays the keyboard 901 with the content area 1100 of the application when the application is opened or the device 100 displays the keyboard upon request by the user. While the keyboard 901 is displayed in the full screen mode, the keyboard 901 includes a set of primary keys 1103 that are substantially centered (e.g., a first or initial position) along the width of the touch screen 112. The device 100 displays the primary keys by default during the full screen mode. In some embodiments, the primary keys 1103 include the letters A through Z, a space bar, and a delete key.

During one-handed operation of device 100, the user may have difficulty reaching certain primary keys without switching from one-handed to two handed operation of the device 100 or repositioning the device 100 in the user's hand. For example, if the user's right hand is being used to operate the device 100, the user may have difficulty reaching keys positioned close to the left edge of the touch screen 112 such as the "Q" or "W" keys. In another example, if the user's left hand is being used to operate the device, the user may have difficulty reaching keys positioned close to the right edge of the touch screen 112 such as the "P" or L" keys. Thus, during the full screen mode of the keyboard it includes a key that is outside of a reachable area of the display. In other words, the key is displayed at a position that is greater than a predefined reach metric. The predefined reach metric may be the same as the predefined reach metric previously described above or is a different reach metric. The predefined reachability metric for the keyboard describes a distance that is comfortable for one-handed typing and is based on the width of the touch screen 112. Rather than the user shifting the device 100 in the user's hand or switching to two-handed operation of the device 100, the user may activate an ergonomic mode of the keyboard 901. During the ergonomic mode, the keys of the keyboard 901 are shifted to a second position such that the key is within the reachable area of the touch screen 112 as will be further described below.

Figure 11B:
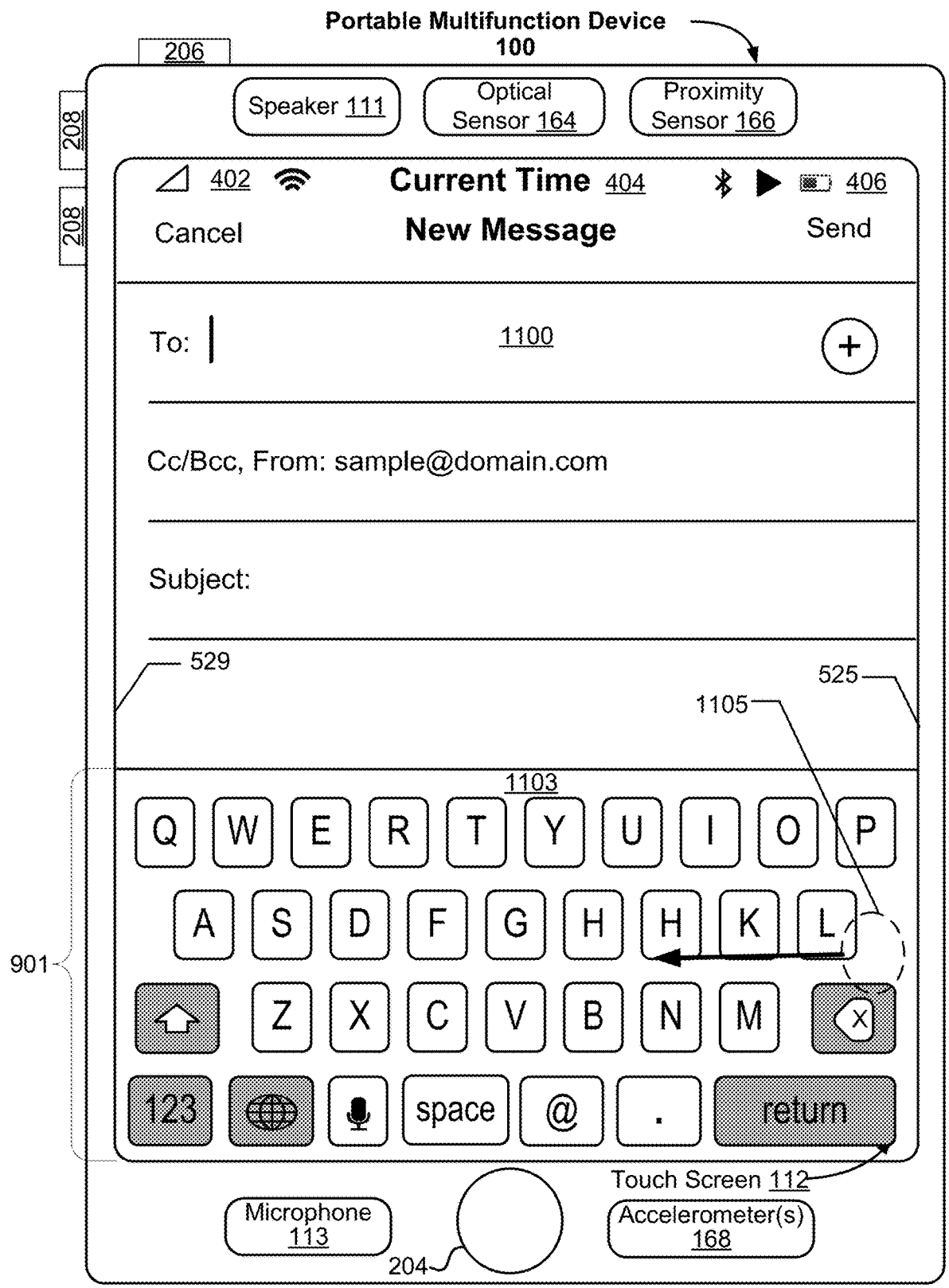
FIGS. 11B and 11F illustrate gestures to invoke an ergonomic mode of the keyboard in accordance with some embodiments.

In some embodiments, the user provides an edge swipe gesture on the keyboard 901 to activate the ergonomic mode of the keyboard 901. FIG. 11B illustrates an edge swipe gesture using the user's left hand to activate the ergonomic mode of the keyboard 901. To perform the edge swipe gesture, the user may need to reposition the user's hand on the device 100 to complete the gesture. This prevents the user from unintentionally requesting the display of the keyboard 901 in the ergonomic mode.

The device 100 determines the input of the edge swipe gesture by detecting whether the gesture is over a portion of the application or over a portion of the keyboard 901. In accordance with a determination that the edge swipe gesture is over the application, the device 100 performs an operation related to content of the application such as navigating or scrolling through the application, navigating backward or forward (e.g., between webpages in a web browser history) or any other operation defined by the application as being triggered in response to a swipe gesture starting from an edge of the touch screen 112. The operation is optionally performed without adjusting an appearance of the keyboard. If the device 100, determines that the swipe gesture is over the keyboard 901, the device 100 displays the ergonomic mode of the keyboard 901.

To detect the swipe gesture over the keyboard, the device 100 detects a contact 1105 over a portion of the keyboard 901 at a first position adjacent to the right vertical edge 525 of the touch screen 112. In some embodiments, the device 100 detects the swipe gesture that moves onto the keyboard from an edge of the touch screen 112. The device 100 then detects a continuous movement of the contact 1105 in a direction towards a second position that is closer to the left vertical edge 529 of the touch screen 112 compared to the initial contact of the touch screen 112. The continuous movement of the contact 1105 includes a lateral component of movement without the contact 1105 breaking contact with the touch screen 112. Lastly, the device 100 detects the completion of the edge swipe gesture in response to detecting a finger up at the second position and the device 100 displays the ergonomic mode of the keyboard 901 as will be further described below.

During the edge swipe gesture, the device 100 determines a direction of the gesture. That is, the device 100 determines if a lateral component of the edge swipe gesture is towards the left or towards the right. The direction of the edge swipe gesture dictates the direction in which the device 100 resizes and shifts the primary keys 1103 of the keyboard in the ergonomic mode. FIG. 11B illustrates a left direction edge swipe gesture as indicated by the direction of the arrow of contact 1105 in the left direction. In some embodiments, an edge-to-edge swipe gesture is used to activate the ergonomic mode rather than the edge swipe gesture. The device 100 determines the input of the edge-to-edge swipe gesture by detecting a contact on the keyboard 901 at a first position adjacent to the right vertical edge 525 of the touch screen 112 and a continuous movement of the contact in a direction towards a second position that is adjacent to the left vertical edge 529 of the touch screen 112.

Figure 11C:
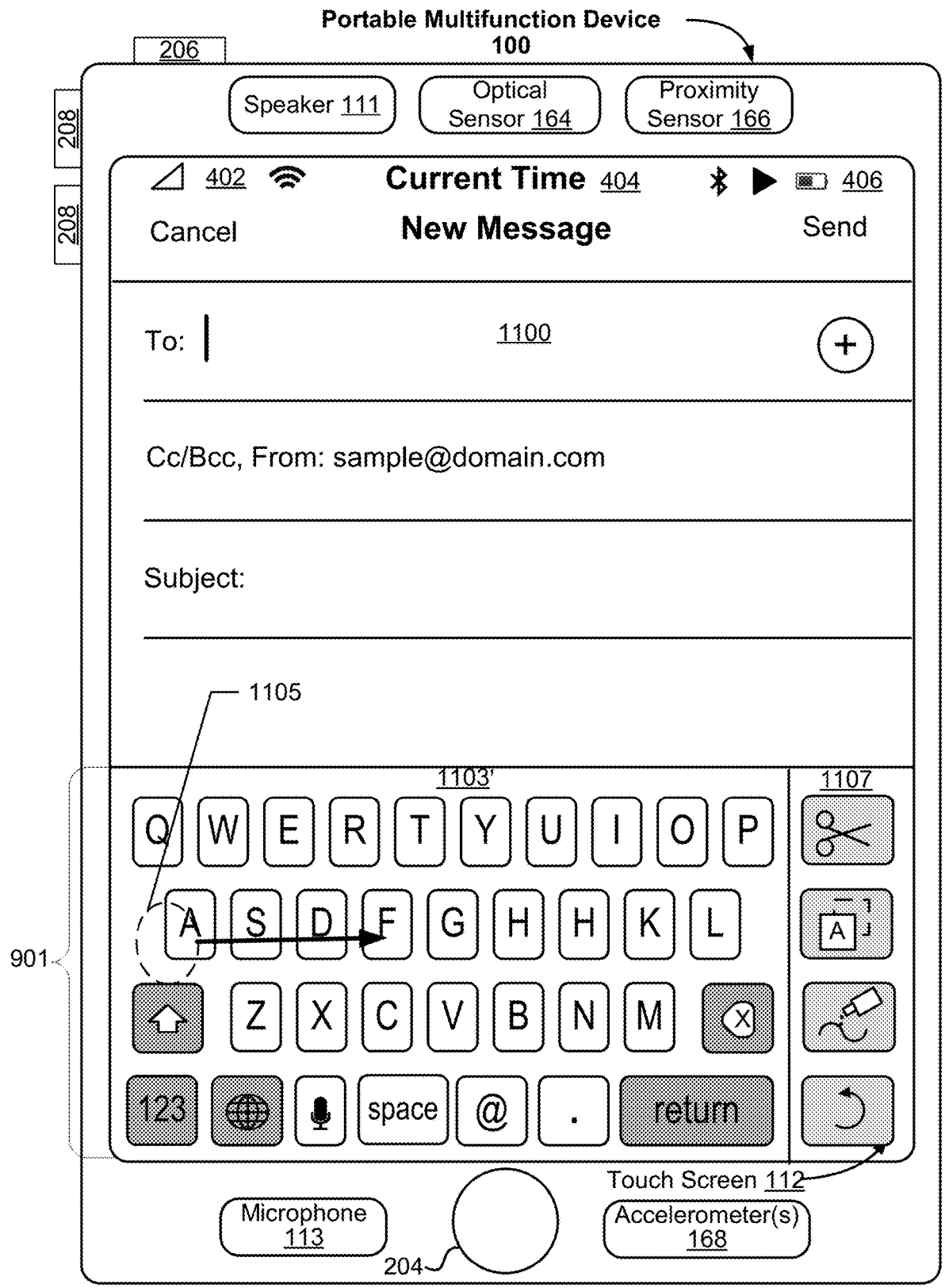
FIGS. 11C, 11G, and 11H illustrate exemplary user interfaces of an ergonomic mode of the keyboard in accordance with some embodiments.

FIG. 11C illustrates an exemplary user interface of the ergonomic mode of the keyboard 901 in response to the edge swipe gesture towards the left direction. As shown in FIG. 11C, in accordance with the determination the device 100 that the edge swipe gesture is to the left, the device 100 resizes the primary keys 1103' and shifts the keys in a horizontal direction from their initial position to a second position. In some embodiments, during the resizing and shifting of the keyboard 901, the application does not move (e.g., the application does not move in response to the edge swipe gesture). In the ergonomic mode, the device 100 resizes the primary keys 1103' in the horizontal direction while maintaining the same height as displayed in the full screen mode. In some embodiments, the device 100 resizes the keyboard in the horizontal direction while maintain the same height as displayed in the full screen mode. By shifting the primary keys 1103' to the left, the keys that the user was unable to reach during single-handed operation of the device 100 using the user's left hand are now more within reach to the user's left hand.

Furthermore, since the primary keys 1103' are resized and shifted, a portion of the touch screen 112 that previously displayed a portion of the primary keys 1103' is no longer occupied by the portion of the primary keys 1103. During the ergonomic mode of the keyboard 901, the device 100 displays a set of auxiliary keys 1107 in the portion of the touch screen 112 that previously displayed the portion of the primary keys 1103'. The set of auxiliary keys 1107 supplement the primary keys 1103' displayed in the keyboard 901 and prevent wasted space of the touch screen 112. As shown in FIG. 11C, the auxiliary keys 1107 are displayed to the right of the primary keys 1103' in a single column. In some embodiments, the device 100 displays the auxiliary keys 1107 in a visually distinguished manner from the primary keys 1103'. For example, the device 100 displays the auxiliary keys 1107 in at least one of a different color, brightness, hue, contrast, saturation, line width, etc. from the primary keys 1103'. In some embodiments, the auxiliary keys 1107 are visually distinguished from some keys in the primary keys 1103' and have a similar visual appearance to one or more secondary keys in the primary keys 1103' such as the delete key and a keyboard switching key.

The auxiliary keys 1107 shown by default in FIG. 11C include a cut key for cutting text, a copy key for copying text, a paste key for pasting text, and an undo key for undoing an input on the device 100. Other auxiliary keys 1107 may be shown by default such as punctuation keys or a foreign language key. As shown in FIG. 11C, the functionality of each key is visually represented by a graphical image on the key. For example, the cut key includes an image of a scissor, the copy key includes an image of an object with a copy of the object behind it, the paste key includes an image of a paste bottle adding paste to a document, and an undo key has an image of an arrow pointing backwards. Alternatively, one or more of the auxiliary keys optionally includes text of the functionality rather than a graphical image representing the functionality of the key.

In some embodiments, the device 100 switches from displaying the ergonomic mode of the keyboard 901 back to the full screen mode of the keyboard 901 in response to receiving a gesture on the keyboard 901. The gesture is optionally the swipe gesture in the direction opposite to the direction of the gesture used to activate the ergonomic mode of the keyboard 901. For example, the left direction swipe gesture was used to activate the ergonomic mode of the keyboard 901 in FIG. 11B. In FIG. 11C, a right direction swipe gesture on the keyboard 901 as represented by contact 1105 is detected by the device 100 and causes the device 100 to switch from the ergonomic mode of the keyboard 901 back to the full screen mode of the keyboard 901. Thus, the second gesture used to dismiss the ergonomic mode of the keyboard 901 is detected starting from a second edge of the touch screen 112 that is different from (e.g., opposite to) the first edge of the touch screen 112 from which the gesture used to activate the ergonomic mode was received.

Figure 11D:
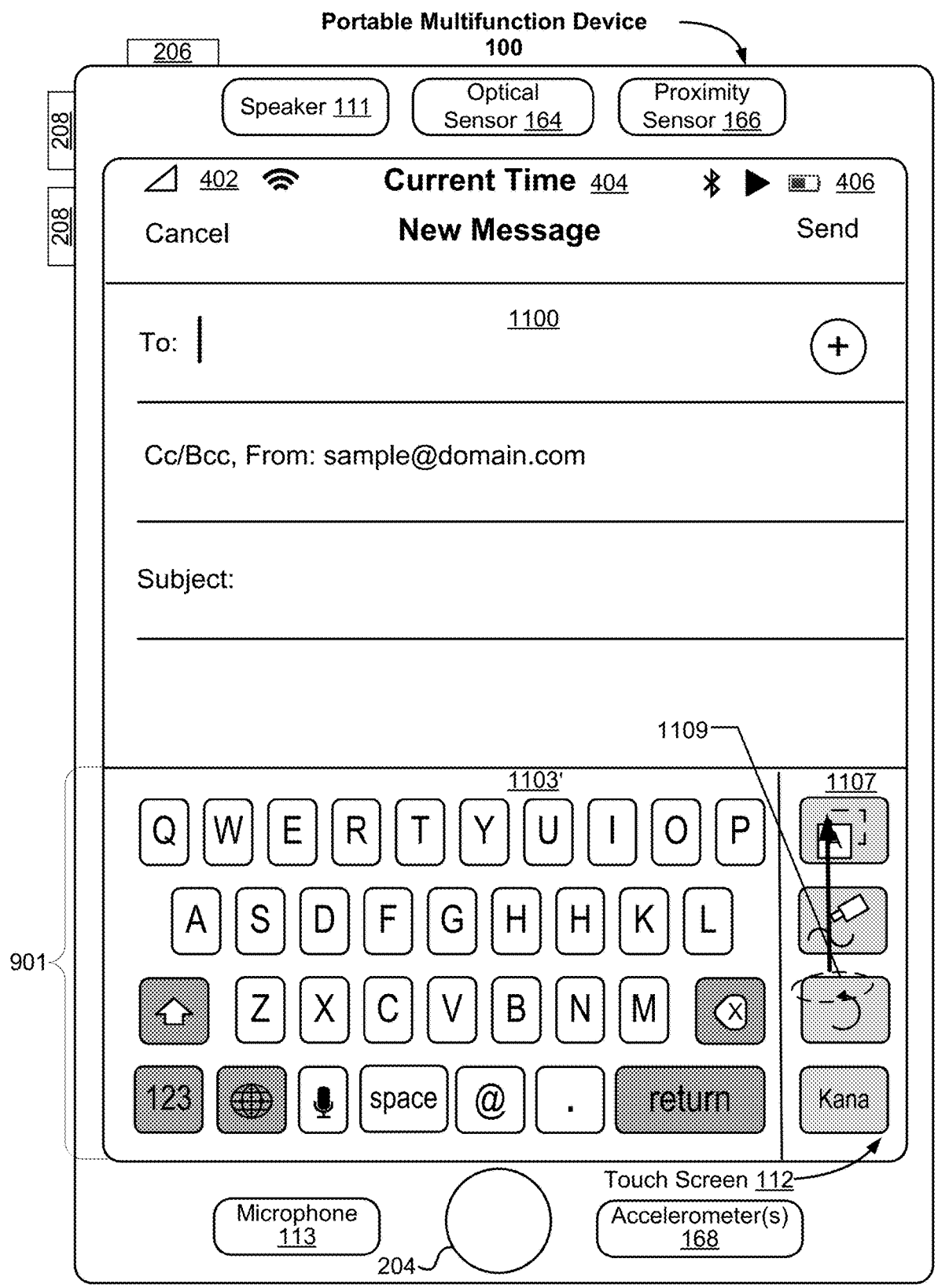
FIG. 11D illustrates a gesture on the user interface of the ergonomic mode of the keyboard to scroll through auxiliary keys of the keyboard in accordance with some embodiments.

In some embodiments, the auxiliary keys 1103 are scrollable to display additional auxiliary keys. In FIG. 11C, the last two default auxiliary keys are the paste key and undo key. To scroll through the auxiliary keys 1107, the user inputs a gesture on the auxiliary keys 1107. The gesture is optionally a swipe up or swipe down gesture. FIG. 11D illustrates a vertical swipe gesture on the auxiliary keys 1107 to scroll through the auxiliary keys. The vertical swipe gesture includes the device 100 detecting a contact 1109 at a portion of the touch screen 112 displaying the auxiliary keys 1107 and a vertical movement of the contact 1109 in either the upward or downward direction. FIG. 11D illustrates the vertical swipe gesture in the upward direction. As the device 100 detects the vertical movement of the contact 1109, the device 100 removes one or more of the default auxiliary keys and replaces the removed keys with one or more additional auxiliary keys 1107. For example, the device 100 optionally displays an animation of the auxiliary keys 1107 sliding upward to expose additional auxiliary keys and remove some of the default auxiliary keys. In some embodiments, the device 100 optionally displays an indication that there are additional auxiliary keys for display. The number of additional auxiliary keys 1107 that the device 100 displays is based on the magnitude of the vertical component of the of the vertical swipe gesture. In FIG. 11D, the additional auxiliary keys 1107 displayed in response to the swipe gesture include a "Kana" key. The Kana key is associated with a Kana foreign language keyboard that is displayed in response to the device 100 detecting selection of the Kana key. In particular, the device 100 replaces the primary keys 1103 with Kana keys which are syllabic Japanese scripts responsive to the selection of the Kana key.

In some embodiments, the auxiliary keys 1107 include multiple foreign language keyboard keys by default. Each foreign language keyboard key is associated with displaying a corresponding foreign language keyboard. The foreign language keyboard keys are selected based on a currently displayed keyboard. For example, the auxiliary keys for the Chinese handwriting and Pinyin keyboards are displayed when the current keyboard is a Chinese stroke keyboard, or auxiliary keys for the Japanese Kana keyboard and the emoji keyboard are displayed when the Japanese Romanji keyboard is the current keyboard.

Figure 11E:
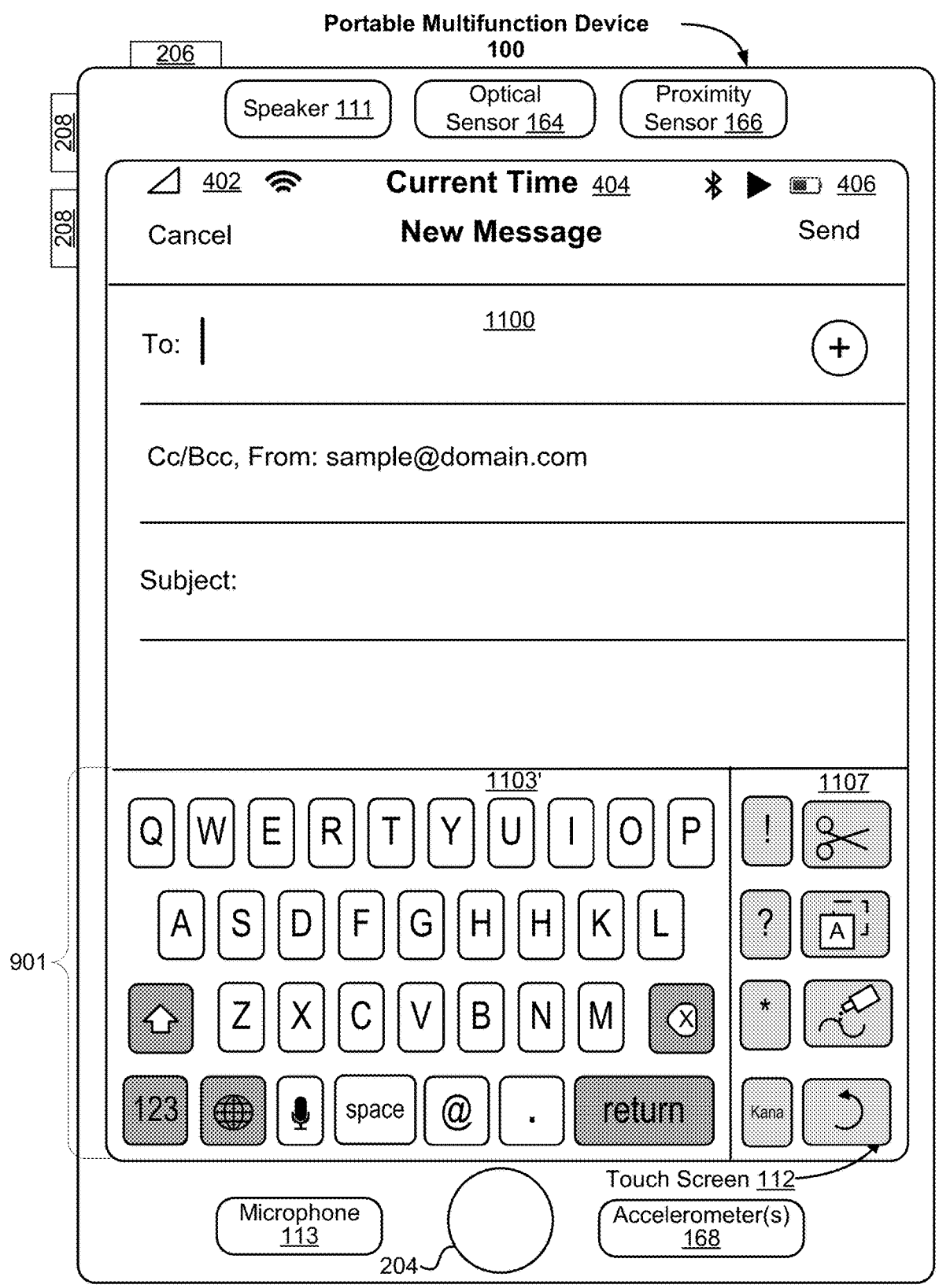
FIG. 11E illustrates displaying auxiliary keys of the keyboard in multiple columns in accordance with some embodiments.

FIG. 11E illustrates another embodiment of the auxiliary keys 1107. Rather than displaying a single column of auxiliary keys 1107 in response to a request to display the ergonomic mode of the keyboard 901, the device 100 displays the auxiliary keys 1107 in multiple columns to the right of the primary keys 1103 as shown in FIG. 11E. In FIG. 11E, the auxiliary keys are arranged in two columns to allow the display of more default auxiliary keys compared to the embodiment shown in FIG. 11C.

Figure 11F:
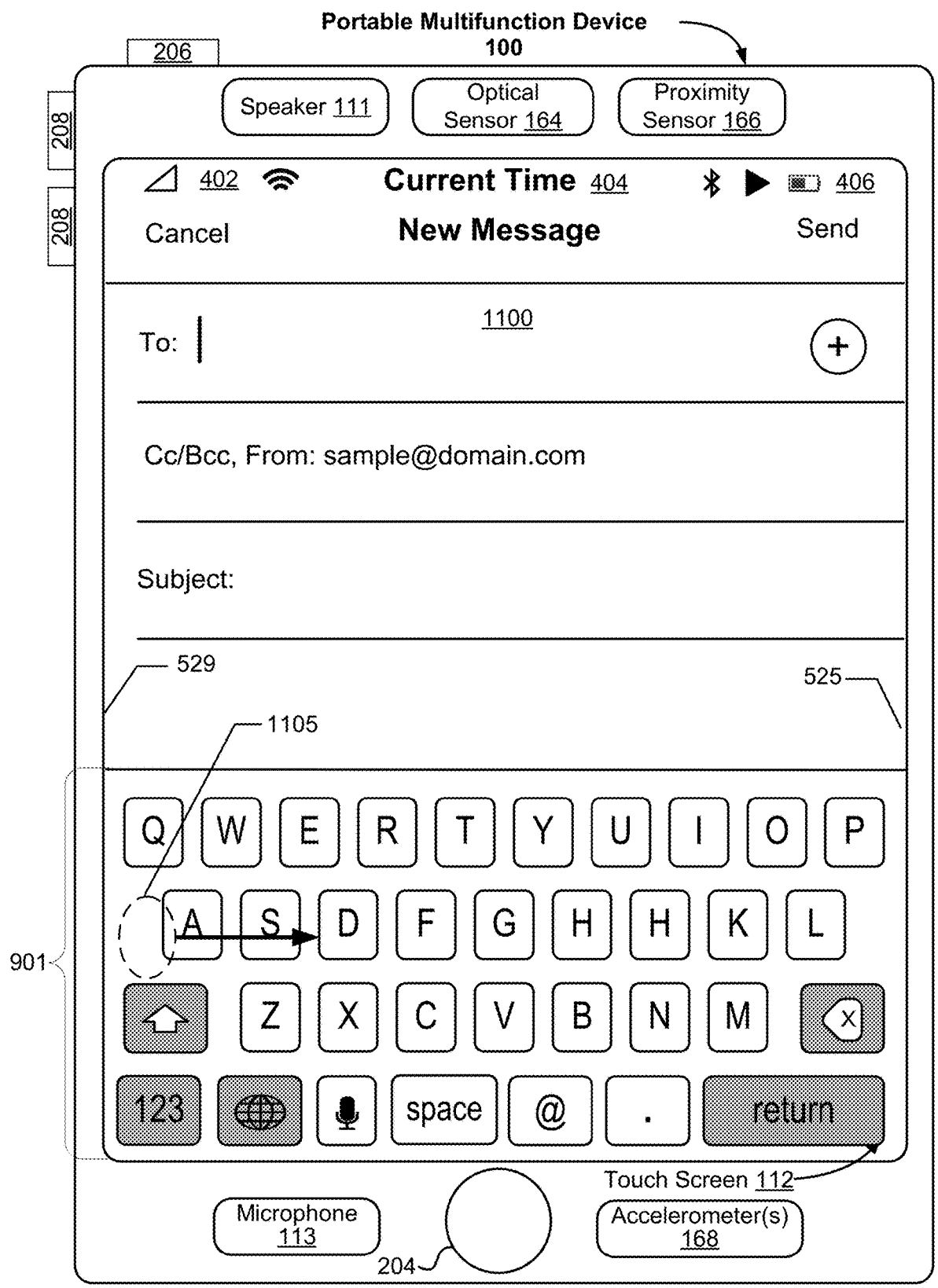

FIG. 11F illustrates an edge swipe gesture using the user's right hand to activate the ergonomic mode of the keyboard 901. The device 100 determines the input of the edge swipe gesture by detecting a contact 1105 on the keyboard 901 at a first position adjacent to the left vertical edge 529 of the touch screen 112. The device 100 then detects a continuous movement of the contact 1105 in a direction towards a second position closer to the vertical edge 525 of the touch screen 112. The continuous movement of the contact 1105 includes a lateral component of movement without the contact 1105 breaking contact with the touch screen 112. Lastly, the device 100 detects the completion of the edge swipe gesture in response to detecting a finger up at the second position and the device 100 displays the ergonomic mode of the keyboard 901 as shown in FIG. 11G.

Figure 11G:
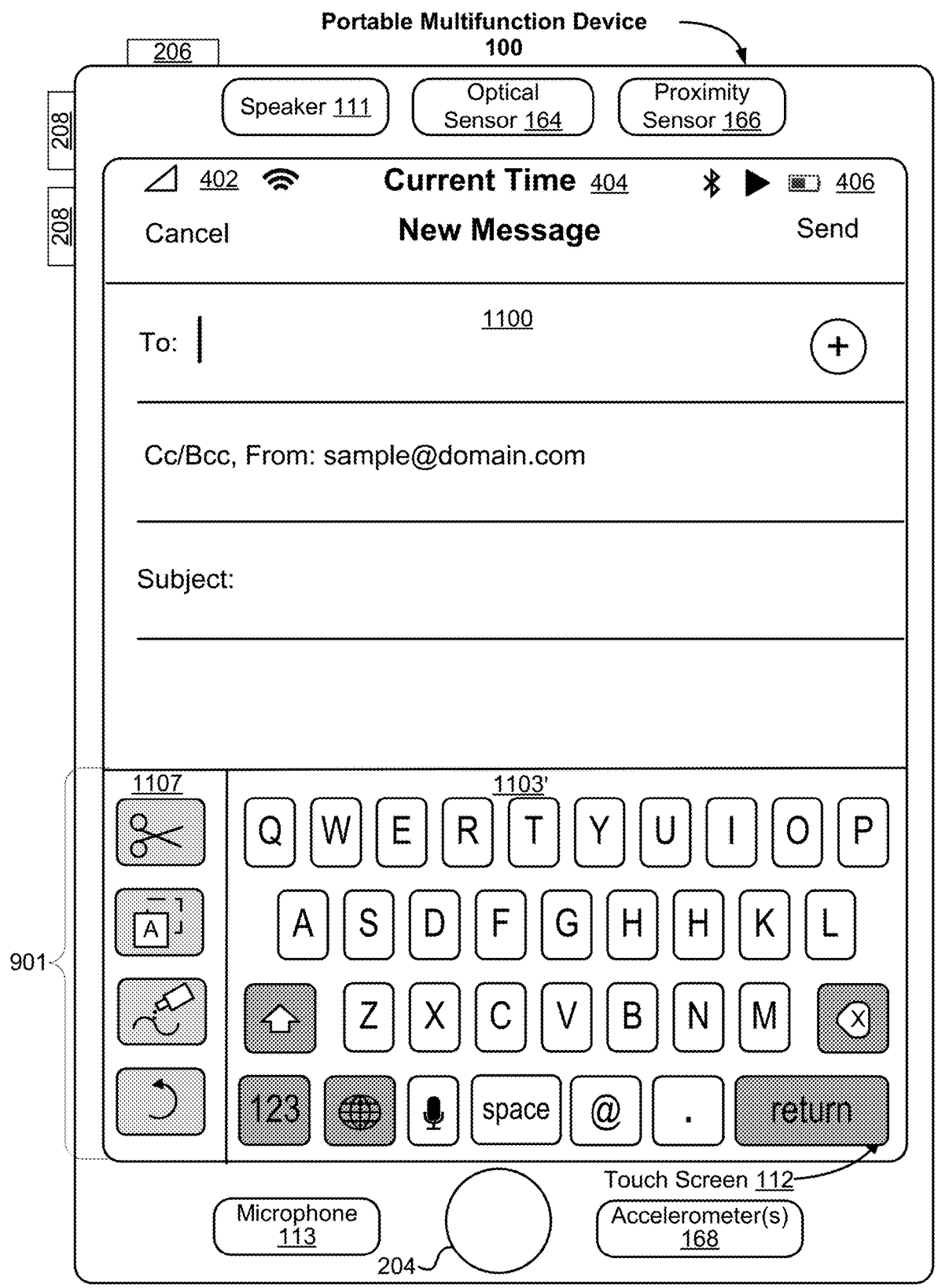

As shown in FIG. 11G, in accordance with the determination the device 100 that the edge swipe gesture is to the right, the device 100 resizes the primary keys 1103' and shifts the keys in the right direction without shifting the content area 1100 of the application. By shifting the primary keys to the right, the primary keys that the user was unable to reach during single-handed operation of the device 100 using the user's right hand are now more within reach to the user's right hand.

Furthermore, since the primary keys 1103' are resized and shifted to the right, a portion of the touch screen 112 that previously displayed a portion of the primary keys 1103 is no longer occupied by the portion of the primary keys 1103. In some embodiments, the device 100 displays a set of auxiliary keys 1107 in the portion of the touch screen 112 that previously displayed the portion of the primary keys 1103 such as to the left of the primary keys 1103' in a single column as shown in FIG. 11G. The device 100 also displays the auxiliary keys 1107 in a visually distinguished manner from the primary keys 1103' such as in a different color. In some embodiments, the device 100 displays the same auxiliary keys 1107 regardless of the direction of the edge swipe gesture. For example, the auxiliary keys 1107 shown in FIG. 11G are the same auxiliary keys shown in FIG. 11C. Alternatively, different auxiliary keys 1107 are displayed dependent on the direction of the edge swipe gesture. For example, if the keyboard 901 is shifted to the right, auxiliary keys 1107 include the cut, copy, and paste buttons whereas if the keyboard 901 is shifted to the left, the auxiliary keys 1107 include the bold, underline, and italic keys.

Figure 11H:
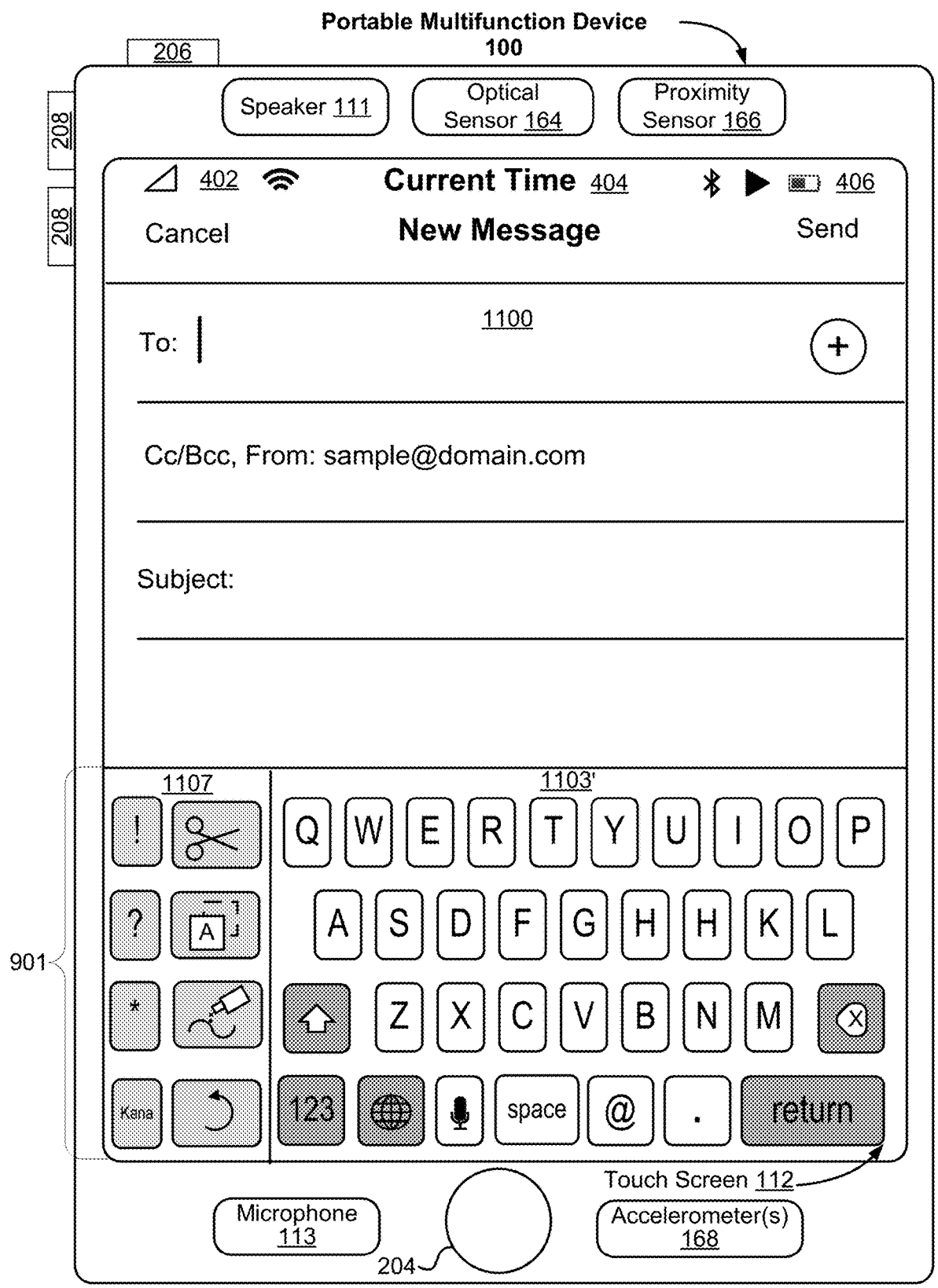

FIG. 11H illustrates another embodiment of the auxiliary keys 1007. Rather than displaying a single column of auxiliary keys 1107 in response to a request to display the ergonomic mode of the keyboard, the device 100 displays the auxiliary keys in multiple columns as shown in FIG. 11H. In FIG. 11H, the auxiliary keys are arranged in two columns to the left of the primary keys 1103 to allow the display of more auxiliary keys compared to the embodiment shown in FIG. 11G.

In some embodiments, the device 100 automatically switches from displaying the keyboard 901 in the ergonomic mode back to the full screen mode based on time. The device 100 determines an amount of time since a user input to the keyboard 901 was last received while the keyboard 901 is displayed in the ergonomic mode. To determine the amount of time, the device 100 optionally executes a timer that counts the amount of time since an input to the keyboard 901 was last received. If the device 100 determines that the amount of time exceeds a threshold, the device 100 automatically switches from displaying the keyboard 901 in the ergonomic mode back to the full screen mode. To switch back to the full screen mode of the keyboard 901, the device 100 simultaneously shifts the primary keys 1103 back to the center position and resizes the primary keys 1103 back to their initial size prior to the primary keys 1103 being resized an shifted during the ergonomic mode. However, if a user input is received prior to the amount of time exceeding the threshold, the device 100 resets the timer.

In some embodiments, the ergonomic mode of the keyboard 901 is persistent across all applications of the device 100. While the keyboard 901 is displayed in the ergonomic mode in a first application, the device 100 receives an input to close the first application and closes the first application in accordance with the input. The device 100 receives an input to open a second application that includes the keyboard 901 and automatically displays the ergonomic mode of the keyboard 901 in the second application rather than the full screen mode of the keyboard 901 responsive to receiving the input to open the second application. Accordingly, the primary keys 1103 are automatically resized and shifted as previously displayed prior to the first application being closed. Thus, the device 100 automatically displayed the ergonomic mode of the keyboard 901 in the second application because the ergonomic mode of the keyboard 901 was activated in the first application prior to the first application being closed. Alternatively, the ergonomic mode of the keyboard is not automatically displayed in the second application. Rather, while displaying the second application, the device 100 receives a request to display the keyboard 901 such as detecting a selection of a text entry region in the second application. In response to receiving the request to display the keyboard, the device 100 displays the keyboard with the primary keys 1103 resized and shifted. The primary keys 1103 is optionally displayed based on a default size or based on a custom resizing and shifting specified by the user.

Alternatively, the device 100 automatically deactivates the ergonomic mode of the keyboard 901 if the application displayed with the keyboard 901 is closed while the keyboard 901 is displayed in the ergonomic mode. For example, while the keyboard 901 is displayed in the ergonomic mode, the device 100 receives an input to close the application displayed with the keyboard 901 and closes the application in accordance with the input. The device 100 receives an input to open the application and automatically displays the application and the keyboard in the full screen mode in response to the input. Alternatively, the device 100 receives an input to open a second application and automatically displays the second application and the keyboard in the full screen mode in response to the input. Thus, the ergonomic mode of the keyboard 901 was deactivated upon closure of the application.

In some embodiments, the ergonomic mode of the keyboard 901 is persistent even if the application displayed with the ergonomic mode of the keyboard 901 is closed. For example, while the ergonomic mode of the keyboard 901 is displayed with a first application, the device 100 receives an input to close the first application and closes the first application in accordance with the input. The device 100 receives an input to open a second application and displays the second application and the keyboard 901 in the full screen mode where the primary keys 903 are displayed in the center position along the width of the touch screen 112. If the device detects an input to close the second application, the device 100 closes the second application. If the device 100 detects an input to open the first application, the device 100 automatically displays the keyboard 100 in the first application in the ergonomic mode in response to the input. Thus, in some embodiments, the ergonomic mode of the keyboard 901 is persistent in the first application even if the first application was closed.

Figure 12A:
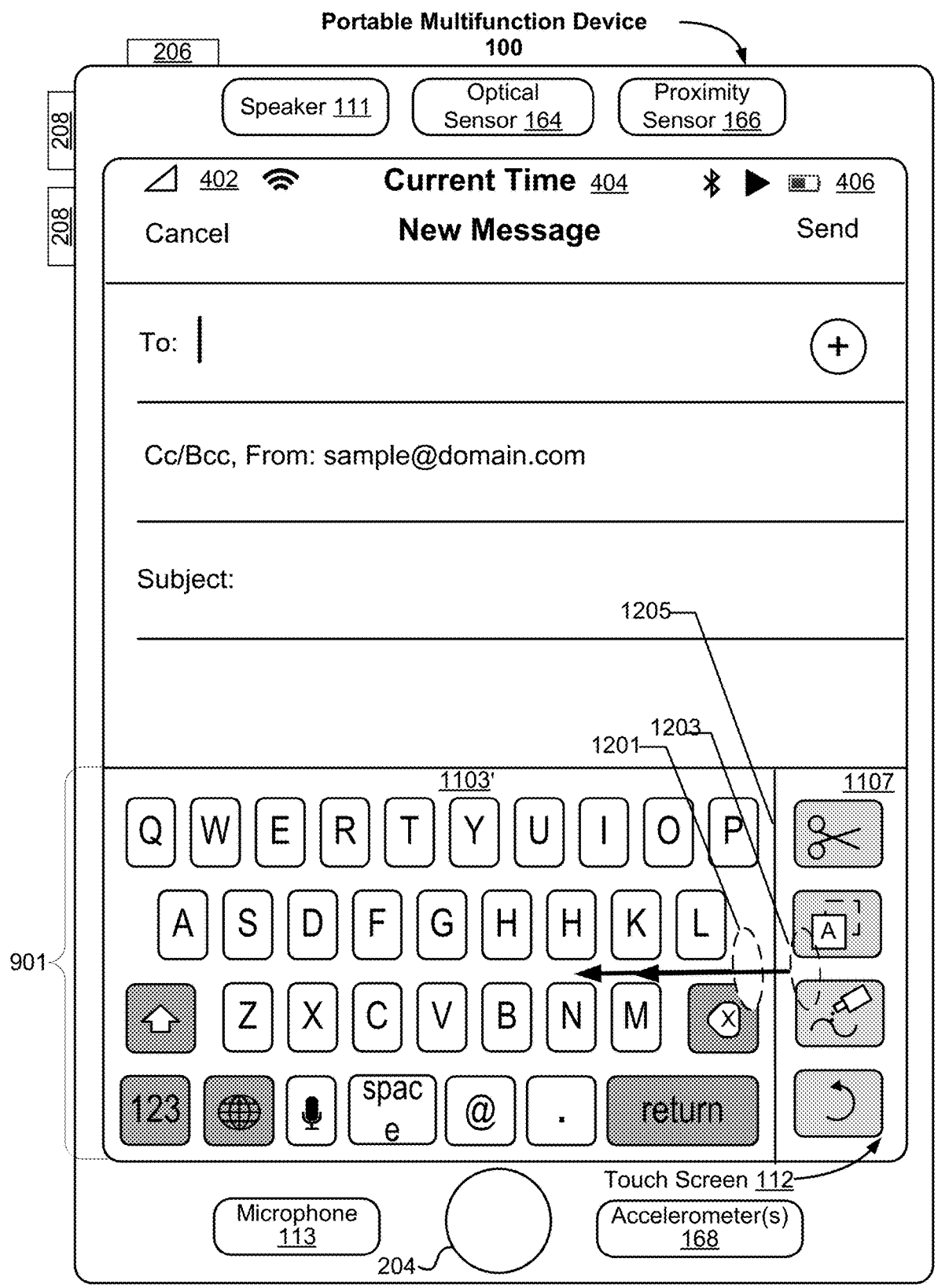
FIG. 12A illustrates a gesture to resize the keyboard while in the ergonomic mode in accordance with some embodiments.

In some embodiments, the width of the portion of the touch screen 112 that displays the auxiliary keys 1107 and the width of the portion on the touch screen 112 that displays the primary keys 1103 during the ergonomic mode of the keyboard 901 are resizable. That is, the keyboard 901 is resizable. Thus, the user can resize the width of the auxiliary keys 1107 and the primary keys 1103 displayed in the keyboard 901. The device 100 detects a gesture provided by the user that is indicative of a user request to resize e.g., change the width of the primary keys 1103 and the auxiliary keys 1107. FIG. 12A illustrates a resize gesture to increase the width of the auxiliary keys 1107 and reduce the width of primary keys 1103.

The resize gesture includes the user initially making concurrent contact with two fingers on the touch screen 112 with the first finger contacting a portion of the touch screen 112 displaying the primary keys 1103 and the second finger contacting a portion of the touch screen 112 displaying the auxiliary keys 1107 otherwise known as a two finger straddle. As shown in FIG. 12A, contact 1201 on the primary keys 1103 represents the user's first finger contacting the touch screen 112 and contact 1203 on the auxiliary keys 1107 represents the user's second finger contacting the touch screen 112. In particular contact 1201 is left of dividing line 1205 and contact 1203 is right of the dividing line 1205. The dividing line 1205 represents the boundary between the primary keys 1103 and the auxiliary keys 1107 displayed in the ergonomic mode of the keyboard 801.

In the example shown in FIG. 12A, the resize gesture indicates a request to increase the width of the portion of the touch screen 112 displaying the auxiliary keys 1107 and decrease the width of the portion of the touch screen 112 displaying the primary keys 1103 as indicated by the direction of the gesture to the left (e.g., a first direction). The resize gesture further includes the user continuously moving both fingers that are in contact with the touch screen 112 to the left. As the user's fingers move, the computing device 100 detects a lateral component of movement of contact 1201 and contact 1203 to determine the direction of the movement and the magnitude in which to resize the primary keys 1103 and the auxiliary keys 1107. As both contact 1201 and contact 1203 move across the touch screen 112 to the left, the dividing line 1203 moves in accordance with the movement of contact 1201 and contact 1203 and the width of the portion of the touch screen 112 displaying the auxiliary keys 1107' increases and the width of the portion of the touch screen 112 displaying the primary keys 1103" decreases as shown in FIG. 12B in accordance with the magnitude of the lateral component of movement.

Figure 12B:
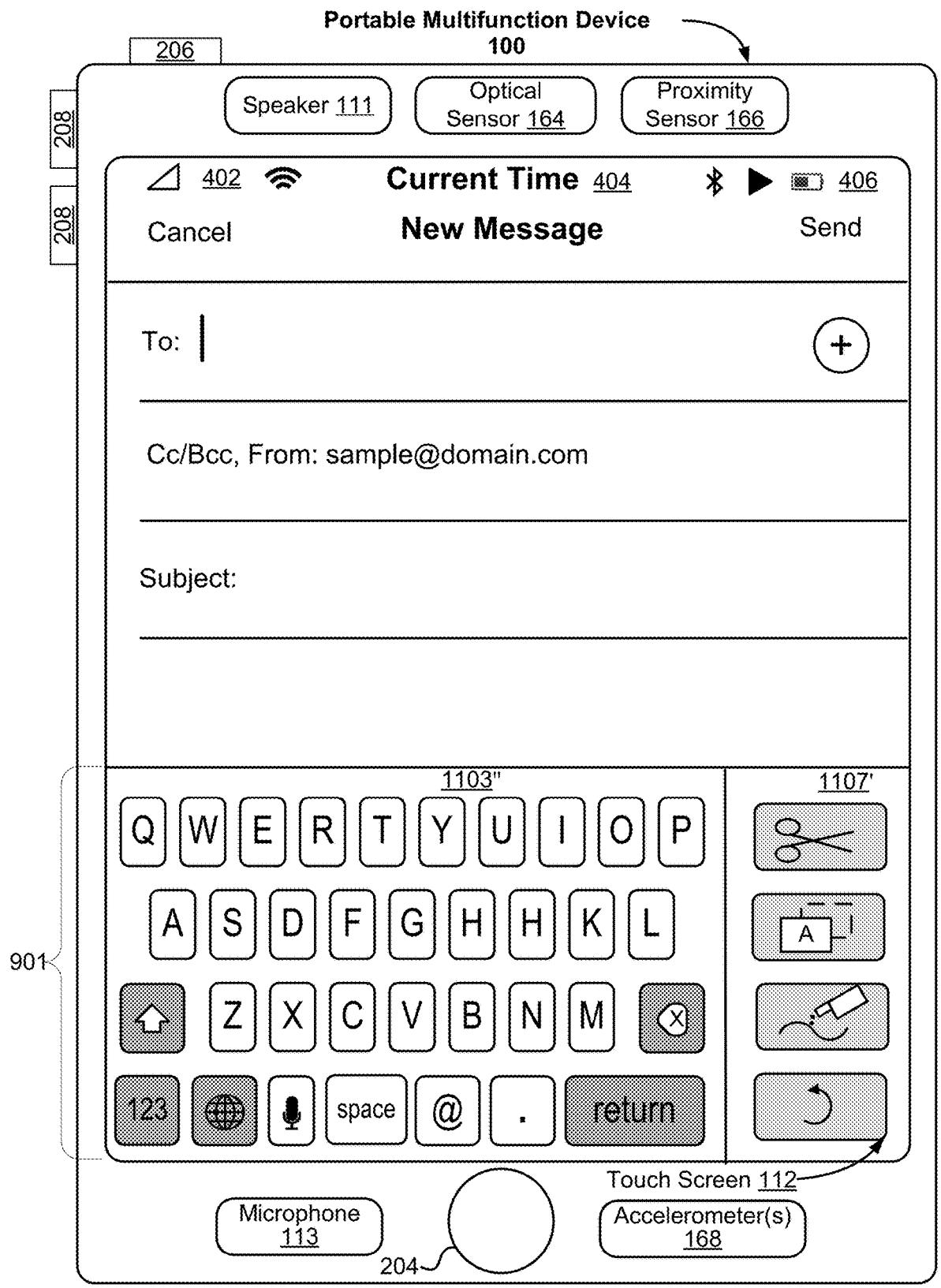
FIG. 12B illustrates an exemplary user interface of resized keyboard in accordance with some embodiments.

In FIG. 12B, the primary keys" are horizontally resized to have a smaller width than prior to the device 100 receiving the resize gesture and the primary keys 1103" are shifted to the left. Similarly, the auxiliary keys 1107' are horizontally resized to have a larger width than prior to the device 100 receiving the resize gesture and are also shifted to the left. The resize gesture is completed once the user lifts both fingers so as to no longer contact the touch screen 112. To decrease the width of the portion of the touch screen 112 displaying the auxiliary keys 1107 and increase the width of the portion of the touch screen 112 displaying the primary keys 1103, the user provides the resize gesture to the device 100 to right (e.g., a second direction) rather than to the left as described above.

In some embodiments, the keyboard size can be adjusted based on a magnitude of the lateral component of movement of the contact of the resize gesture while performing the gesture that causes the keyboard to be shifted and resized for display in the ergonomic mode. Thus, the keyboard 901 is resized and shifted in response to detecting a first portion of the resize gesture, and then the user can further decrease the size and shift the keyboard in the same direction by continuing to move in the same direction or can increase the size of the keyboard and shift it in the other direction by starting to move the contact back in the opposite direction.

In some embodiment, the customized width of the keyboard displayed in the ergonomic mode is persistent in an application even if the application is closed. The device 100 optionally closes the application while the primary keys 1103 are auxiliary keys 1107 are displayed with the resized width. If the application is reopened, the keyboard is displayed at in the full screen mode at the first position. Responsive to detecting an edge swipe gesture on the keyboard to activate the ergonomic mode, the device 100 determines the resized width of the primary set of keys prior to the application being closed and resizes and shifts the primary set of keys 1103 in the direction of the edge swipe gesture without shifting the view of the application. Thus, in some embodiments when a custom size and position for the shifted keys is specified by a user, subsequent requests to shift and resize a keyboard will shift and resize the keyboard based on the custom size and position specified by the user when the user next requests to shift and resize the keyboard without requiring the user to specify the custom size and position again.

In some embodiment, the customized width of the keyboard displayed in the ergonomic mode is not persistent in an application when the application is closed. For example, the device 100 closes the application while the primary keys 1103 are auxiliary keys 1107 are displayed with the customized width and subsequently reopens the application. The keyboard 901 is displayed in the full screen mode at the first position. Responsive to detecting an edge swipe gesture on the keyboard to activate the ergonomic mode, the device 100 resets the resized width of the primary set of keys and shifts the resized primary keys in the direction of the gesture to the second position without shifting the view of the first application. Thus, in some embodiments when a custom size and position for the shifted keys is specified by a user, subsequent requests to shift and resize a keyboard will shift and resize the keyboard based on the default size and position when the user next requests to shift and resize the keyboard without reference to the custom size and position.

In some embodiments, the custom size and position for the shifted keys is persistent for a predetermined time period. In some embodiments, the custom size and position for the shifted keys is persistent for one application, but does not apply to other applications (e.g., other applications can use different custom sizes or the default custom size).

FIG. 13A illustrates an exemplary view of the email application displayed in the landscape view of the device 100. In some embodiments, the device 100 automatically displays the auxiliary keys in accordance with detecting that the device 100 is oriented in a landscape view otherwise known as a landscape mode. That is, in some embodiments, the landscape mode of the keyboard includes a second portion of the second set of keys displayed to a second side of the first set of keys. Thus, the auxiliary keys that are optionally displayed in the portrait mode of a keyboard (e.g., in response to a user swipe gesture that causes the keyboard to be shifted and resized) are displayed by default (e.g., without regard to whether or not the user has requested that the auxiliary keys be displayed) in the landscape mode of the keyboard because the landscape mode of the keyboard has more room to display additional keys. Thus, the device automatically displays the ergonomic mode of the keyboard including the auxiliary keys responsive to the device 100 being oriented from the portrait view to the landscape view.

Prior to being oriented in the landscape view, the full screen mode of the keyboard is displayed in the portrait mode of the device 100.

As shown in FIG. 13A, the primary keys 1103 are displayed substantially centered along the width of the keyboard while the device 100 is oriented in the landscape position. The device 100 displays a first set of auxiliary keys 1301A at a first side (e.g., to the left) of the primary keys 1103 and a second set of auxiliary keys 1301B is displayed at a second side (e.g., a right side) of the primary keys 1103.

Figure 13B:
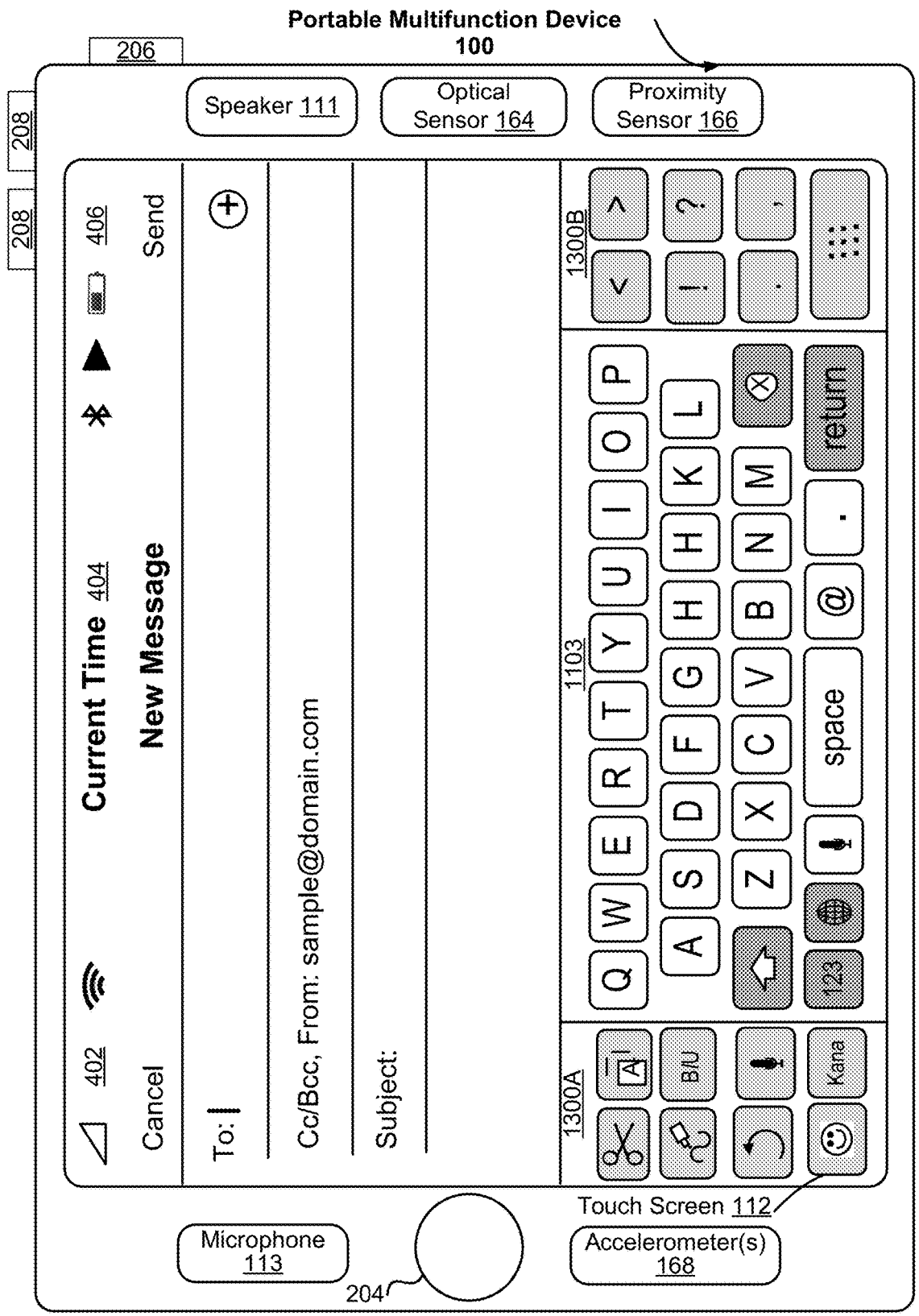

As shown in FIG. 13A, the first set of auxiliary keys 1300A is displayed in a single column to the left of the primary keys and the second set of auxiliary keys 1300B is displayed in a single column to the right of the primary keys. Alternatively, as shown in FIG. 13B, the first set of auxiliary keys 1300A is displayed in multiple columns to the left of the primary keys and the second set of auxiliary keys 1300B is also displayed in multiple columns to the right of the primary keys.

In some embodiments, while in the landscape view of the keyboard, the device 100 automatically includes a foreign language key in the auxiliary keys 1301 if a foreign language keyboard is activated in the device 100. As shown in FIG. 13B, a Kana key is included in the first set of auxiliary keys 1301A. In accordance with the device 100 detecting a selection of the Kana key, the device 100 replaces the English language keyboard with the Kana language keyboard as shown in FIG. 13C. As shown in FIG. 13C, the Kana keyboard includes primary Kana keys 1300A and 1300B, auxiliary keys 1301, and suggested candidates 1303. The suggested candidates 1303 display one or more candidate characters responsive to user selection of one or more primary Kana keys 1300A. In some embodiments, the auxiliary keys 1301 are positioned between the primary Kana keys 1300A and the suggested candidates 1303.

Figure 13D:
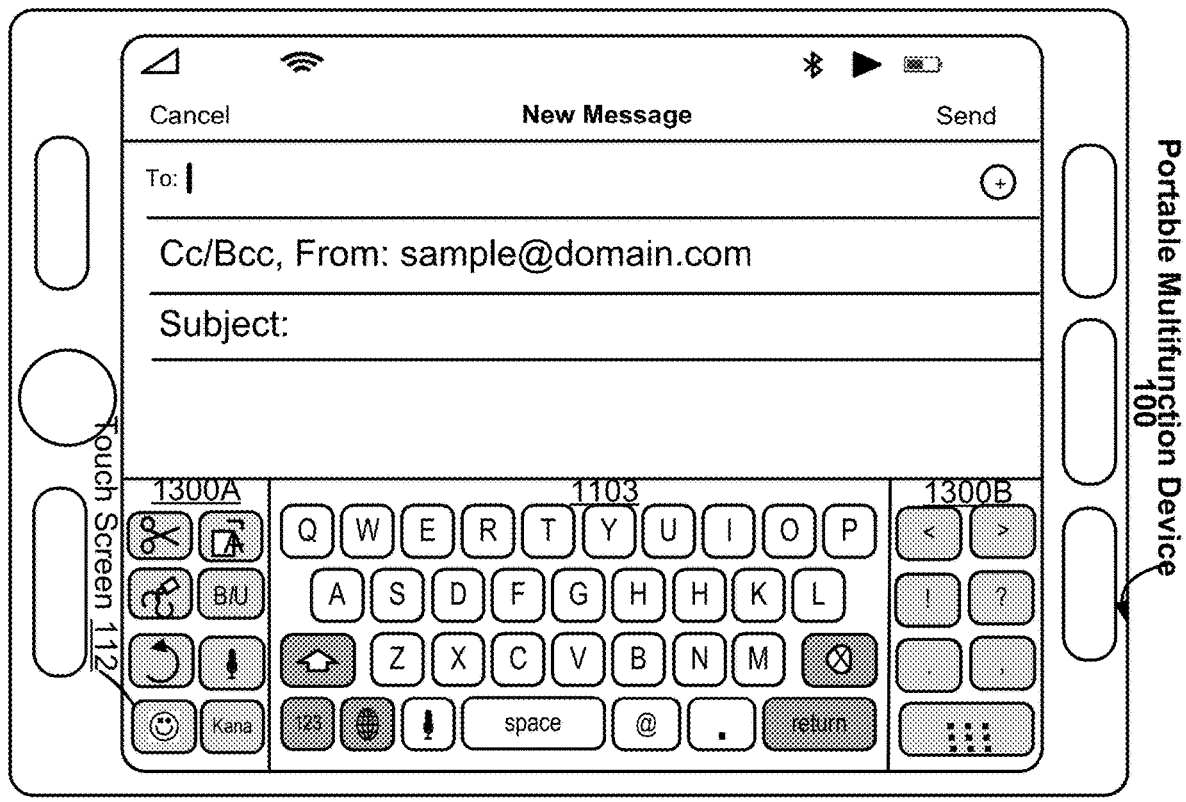
FIGS. 13D and 13E illustrate exemplary user interfaces of the keyboard in a landscape view displayed on exemplary multifunction devices of different sizes in accordance with some embodiments.
Figure 13E:
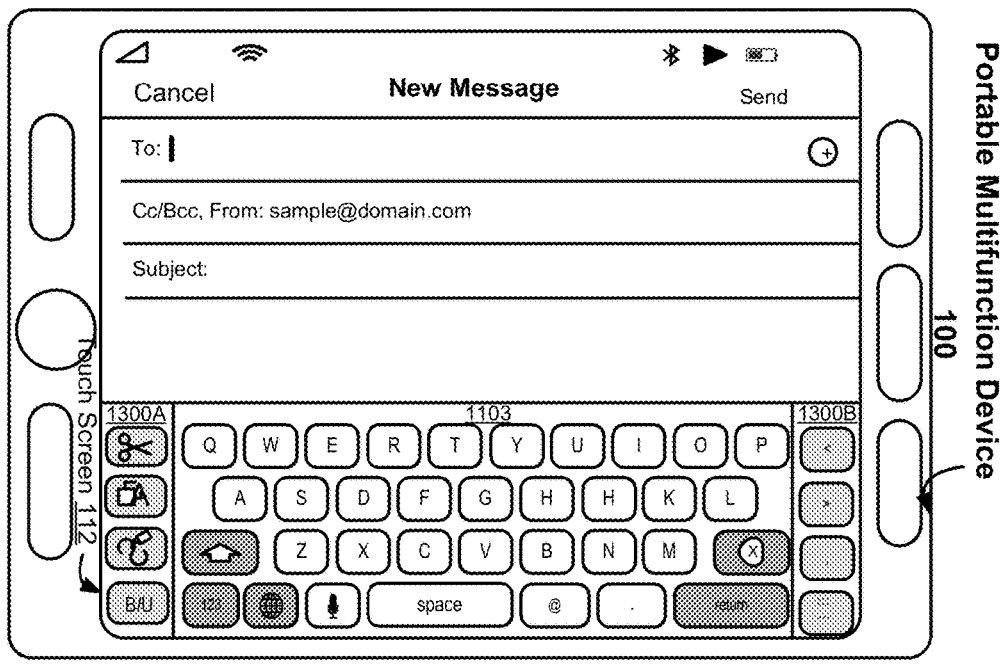

In some embodiments, the number of auxiliary keys that are displayed while the device 100 is oriented in the landscape mode depends on the size of the touch screen 112 of the device. That is, more auxiliary keys are displayed on a device with a larger touch screen compared to a device with a smaller touch screen. For example, FIG. 13D and FIG. 13E illustrate an exemplary view of the email application with the keyboard displayed in the landscape view on devices of different size in accordance with some embodiments. In particular, device 100 shown in FIG. 13D has a larger touch screen 112 than the touch screen 112 of device 100 shown in FIG. 13E.

In FIG. 13D, the device 100 automatically displays the first set of auxiliary keys 1300A in multiple columns to the left of the primary keys 1103 and the second set of auxiliary keys 1300B is also displayed in multiple columns to the right of the primary keys 1103 while device 100 is in the landscape orientation. A total of 15 auxiliary keys are displayed in the embodiment shown in FIG. 13D. In contrast, in FIG. 13E the device 100 displays the first set of auxiliary keys 1300A displayed in a single column to the left of the primary keys 1103 and the second set of auxiliary keys 1300B is displayed in a single column to the right of the primary keys while device 100 is in the landscape orientation. A total of 8 auxiliary keys are displayed in the embodiment shown in FIG. 13E. Thus, due to the smaller size of the touch screen 112 of the device 100 shown in FIG. 13E, the device 100 displays fewer auxiliary keys compared to the device 100 shown in FIG. 13D with the larger touch screen 112.

Figure 14A:
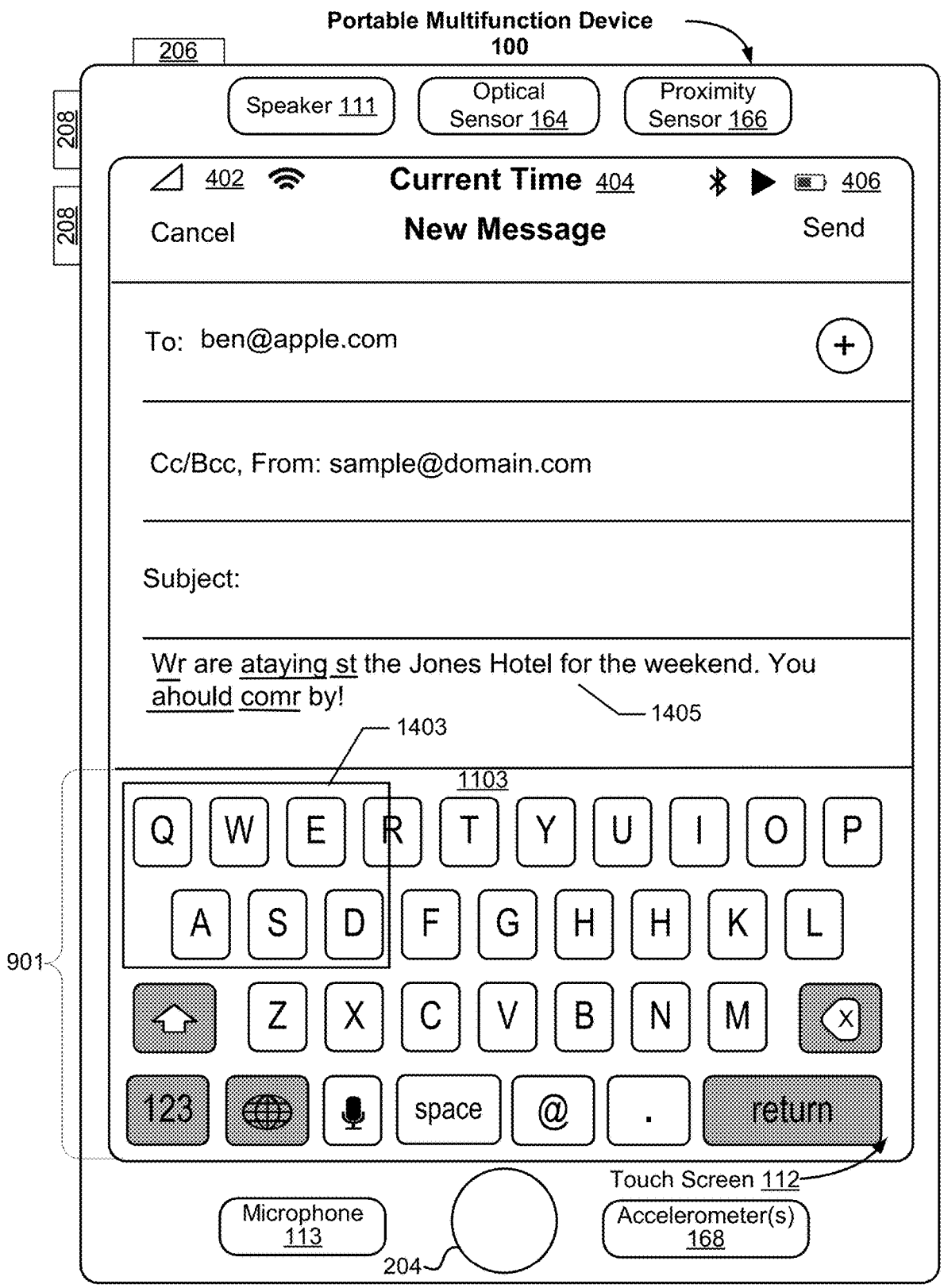
FIGS. 14A, 14B, and 14C illustrate exemplary user interfaces of the keyboard for improving key selection accuracy in accordance with some embodiments.

In some embodiments, the device 100 automatically activates the ergonomic mode of the keyboard 901 to improve the accuracy of primary key selection. The device 100 monitors accuracy of primary key selection by detecting a plurality of incorrect selections of one or more keys from the primary keys. In some embodiments, the device 100 determines the ratio of correct primary key selections to a total number of primary key selections. If the ratio is below a threshold, the device 100 determines whether the incorrect selection of primary keys is isolated to a particular portion of the keyboard 801. For example, FIG. 14A illustrates the body 1405 of an email which includes a number of misspelled words due to incorrect user selection of multiple primary keys. The device 100 determines that the inputted text "Wr," "ataying," "st," "ahould," and "comr" should respectively be "We," "staying," "at," "should," and "come." The device 100 determines that the incorrectly selected primary keys are all located in the portion 1403 of the keyboard 901.

Figure 14B:
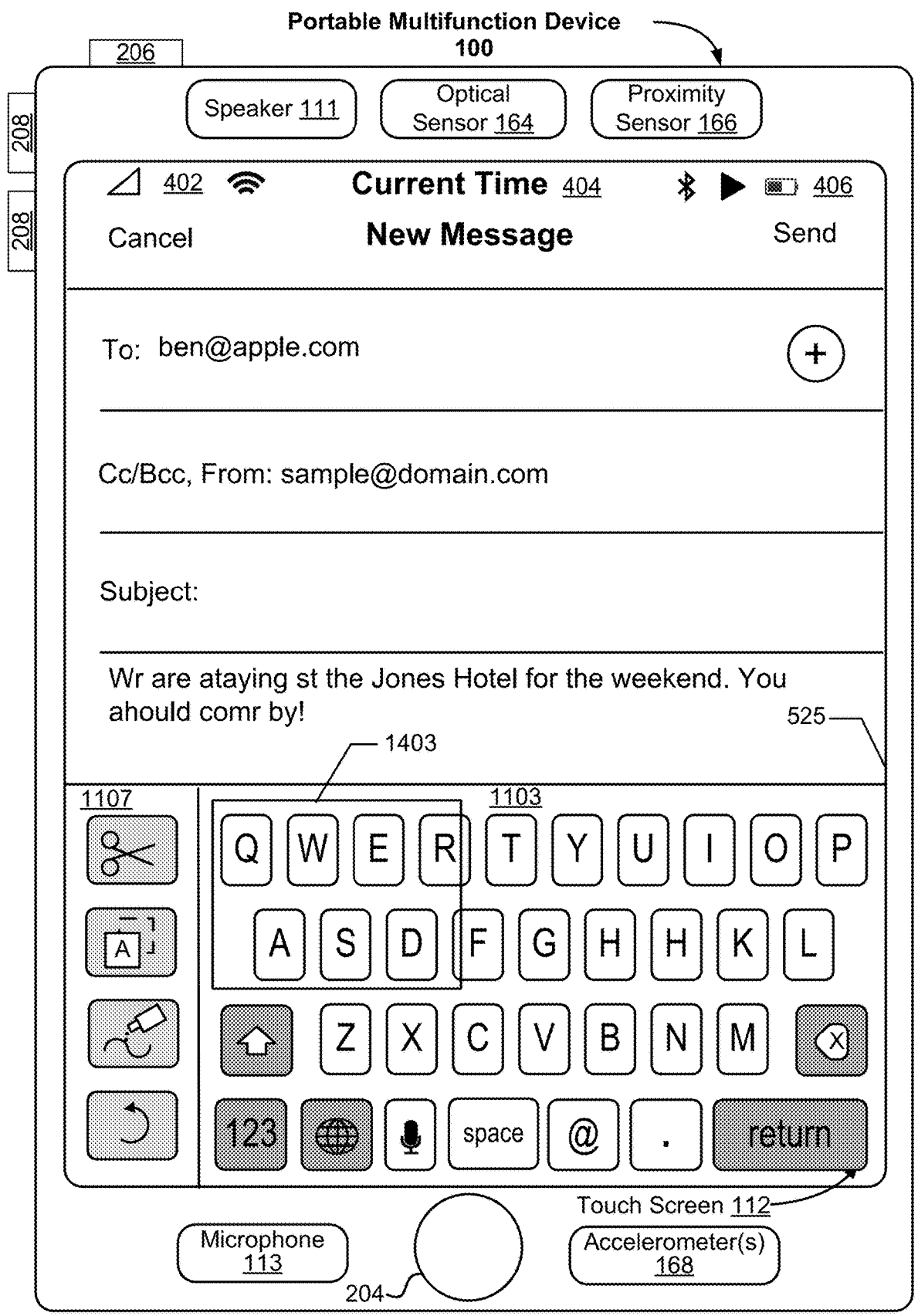

In some embodiments, the device 100 then determines the vertical edge of the keyboard 901 furthest away in the horizontal direction from the portion 1403 that includes the incorrectly selected primary keys and automatically shifts and resizes the primary keys 1103 in the direction of the vertical edge. For example, in FIG. 14B the device 100 determines vertical edge 525 is furthest away in the horizontal direction from the incorrectly selected primary keys in portion 1403 and resizes and shifts the primary keys 1103 in the direction towards the vertical edge 525. Accordingly, the device shifts the keys in a first direction when user's errors are biased toward inputs that are too far in the first direction, and shifting the keys in the first direction thereby making the primary keys in portion 1403 are now closer to the user's hand and will improve accuracy of primary key selection.

Figure 14C:
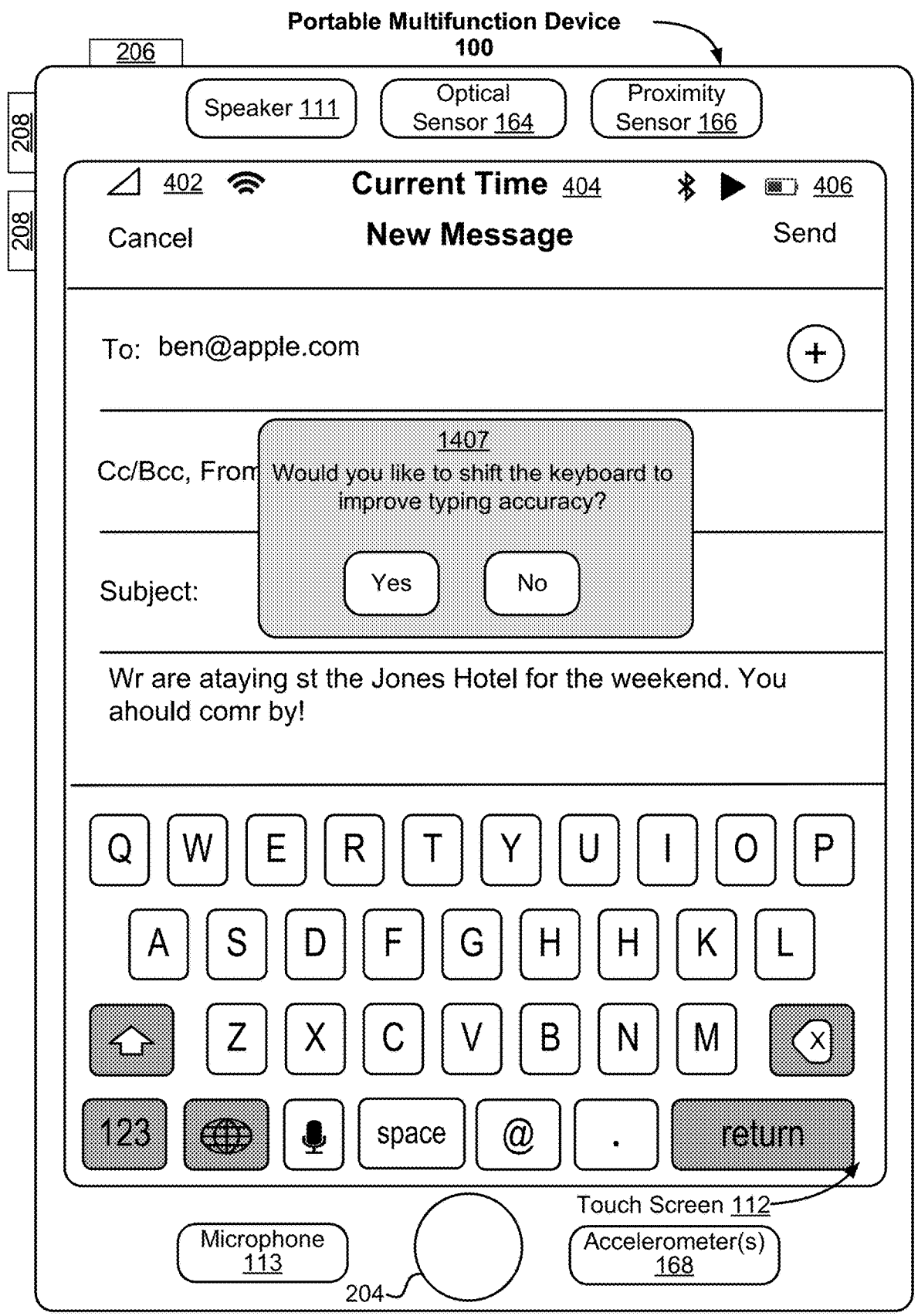

In some embodiments, rather than automatically resizing and shifting the keyboard, the device 100 displays a prompt 1407 as shown in FIG. 14C that asks for user's permission to shift and resize the keyboard responsive to determining that the incorrectly selected primary keys are isolated to a particular location on the keyboard. Responsive to the device 100 receiving permission to shift and resize the keyboard (e.g., selection of "Yes" from the prompt 1407), the device 100 resizes and shifts the keyboard as described above.

Figure 15:
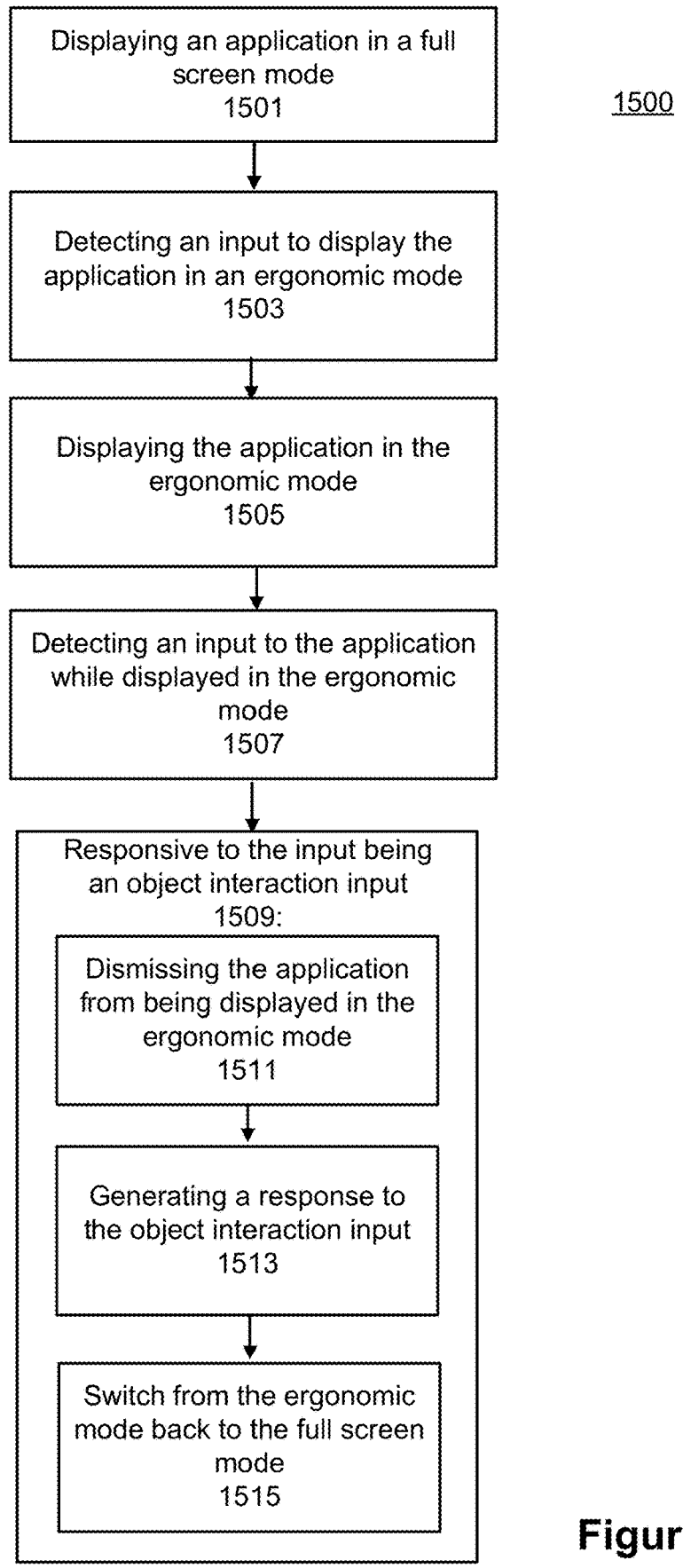
FIG. 15 is a method flow diagram for activating an ergonomic mode of an application in accordance with some embodiments.

FIG. 15 is an exemplary method flow diagram of a method 1500 for displaying an ergonomic mode of an application. Note that in other embodiments, different steps may be performed other than those shown in FIG. 15.

The device 100 displays 1501 an application in a full screen mode on the touch screen 112 of the device 100 as shown for example in FIG. 5A. In the full screen mode, a GUI of the application is displayed with a height that occupies the entirety of the touch screen 112 of the device 100 excluding any regions allowed for a status bar of the device and/or control regions of the device. Furthermore, the application is displayed with a width that corresponds to a width of the touch screen 112 while in the full screen mode. During the full screen mode of the application, the application includes a toolbar (e.g., toolbar 51) displayed in the bottom area of the touch screen 112. The toolbar includes a plurality of user interface elements (e.g., World Clock 505, Alarm 507, Stopwatch 509, and Timer 511) each associated with a functionality of the application.

While in the full screen mode, the application includes a user interface object that is outside of a reachable area of the touch screen display such as the edit UI element 521 and/or the add UI element 519. That is, the user interface object is located at a position greater than a predefined reach metric indicative that the user interface object is unreachable by a user's finger unless the electronic device is repositioned in the user's hand. The device 100 detects 1503 an input to display the application in an ergonomic mode while the application is displayed in the full screen mode. The inputs to display the ergonomic mode of the application include multiple sequential presses of the menu button 204 (as shown for example in FIG. 5A), a half press of the menu button 204, a corner edge swipe gesture at a bottom corner of the touch screen 112 (as shown for example in FIGS. 5B and 5C), or a flick gesture on the menu button 204 (as shown for example in FIG. 5D).

Responsive to detecting the input, the device 100 displays 1505 the application in the ergonomic mode. In the ergonomic mode, the user interface object is within the reachable area of the touch screen display. That is the user interface object is located at a position less than the predefined reach metric indicative that the user interface object is reachable by the user's finger without the device 100 being repositioned in the user's hand. During the ergonomic mode of the application, the device 100 display the application in a bottom area of the touch screen 112 with a height that is less than the height of the application while displayed in the full screen mode. By displaying the application in the bottom area of the touch screen 112, the user can more easily interact with any UI objects of the application that were previously unreachable without switching to two handed operation of the device or repositioning the electronic device in the user's hand.

To display the application in the ergonomic mode, the device 100 optionally determines a view of the application displayed in the full screen mode. The determined view includes a first portion displaying content of the application and a second portion displaying the toolbar of the application. The device 100 shifts the view of the application in a vertical direction until the view is displayed in the bottom area of the touch screen 112 with the height that is less than the height of the application while displayed in the full screen mode. The shifted view includes the first portion displaying the content of the application and does not include the second portion displaying the toolbar.

In some embodiments, the ergonomic mode of the application includes the toolbar. To display the application in the ergonomic mode with the toolbar, the device 100 determines a first view of the application displayed in the full screen mode. The first view includes a first portion displaying content of the application and a second portion displaying the toolbar of the application. The device 100 determines a second view of the application associated with the application in the second mode. The second view includes the first portion displaying content of the application resized in accordance with the second height and the second portion displaying the toolbar of the application resized in accordance with the second height.

In some embodiments, the device 100 switches from displaying the ergonomic mode to the full screen mode of the application based on time. While the application is displayed in the ergonomic mode, the device 100 determines an amount of time since an input to the application was last received. In accordance with determining that the amount of time exceeds a threshold, the device 100 automatically switches from the ergonomic mode back to the full screen mode.

In some embodiments, after entering the ergonomic mode and prior to detecting an input while in the ergonomic mode, the device 100 uses a first time threshold to determine whether to automatically switch back to the full screen mode. After detecting the second input, the device 100 uses a second time threshold, different from the first time threshold to determine whether to automatically switch back to the full screen mode. That is, while the application is displayed in the ergonomic mode, the device 100 determines an amount of time since an input to the application was last received. In accordance with receiving an input to the application while the amount of time is less than a threshold, the device 100 reduces the threshold. In accordance with a determination that an amount of time since the input to the application was last received exceeds the reduced threshold, the device 100 automatically switches from the ergonomic mode back to the full screen mode. In accordance with receiving another input to the application while the amount of time since the input to the application was last received is less than the reduced threshold, the device 100 increases the threshold.

In some embodiments, while displaying the application in the ergonomic mode the device 100 automatically displays a notification view in a top area of the touch screen that is above the bottom area that displays the application as shown for example in FIG. 5F. The notification view includes one or more notifications for the user. Alternatively, an image of a home screen view of the device 100 is automatically displayed in the top area of the touch screen 112 above the bottom area displaying the application as shown for example in FIG. 5K. In some other embodiments, a blank area is automatically displayed in the top area of the touch screen 112 above the bottom area displaying the application as shown for example in FIG. 5E. If the device detects an input in the blank area, the device switches from ergonomic mode back to the full screen mode as shown for example in FIG. 5A.

In some embodiments, the blank area includes a user interface element (e.g., handle UI element 539) associated with displaying the notification view as shown for example in FIG. 5G. The device 100 detects a contact on the user interface element and a continuous movement of the contact moving the user interface element in a direction of the continuous movement having a vertical component. In accordance with detecting the vertical component is less than a threshold distance, the device 100 determines a magnitude of the vertical component of the continuous movement and displays a portion of the notification view in the top area of the touch screen above the bottom area displaying the application in the ergonomic mode. The height of the portion of the notification view is proportional to the determined magnitude of the vertical component. In accordance with the device 100 detecting the vertical component is greater than the threshold distance, the device 100 displays the notification view in its entirety.

While the application is displayed in the ergonomic mode, the device 100 detects 1507 an input to the application at a location on the touch screen that corresponds to the application. Responsive to detecting the input, the device 100 determines whether the input is a navigation input or an object interaction input. The navigation input includes a request to scroll through the content of the application, scroll through lists, or scroll through different views of the application. In contrast, an object interaction input is a user input interacting with a user interface object of the application or a request to switch between different views of the application according to some embodiments. Responsive 1509 to the input being a object interaction input, the device 100 generates 1513 a response to the input and switches 1515 from the ergonomic mode to the full screen mode. In contrast, responsive to the input being a navigation input, the device 100 navigates within the application without switching back to the full screen mode.

In some embodiments, the ergonomic mode of the application can be locked. The device 100 optionally receives a request to prevent switching from the ergonomic mode back to the first mode and locks the application in the ergonomic mode. While the application is locked in the second mode, the device 100 receives an input to dismiss the application and dismisses the application in accordance with the input to dismiss the application. The device 100 receives an input to open the application and displays the application in the ergonomic mode.

In some embodiments, the ergonomic mode of the application is dismissed once the application is closed. While the application is displayed in the ergonomic mode, the device 100 receives an input to close the application and the device 100 closes the application in accordance with the input. The device 100 receives an input to reopen the application and automatically displays the application in the full screen mode in accordance with the input to reopen the application.

In some embodiments, the ergonomic mode of the application is maintained even though the application is closed. While the application is displayed in the ergonomic mode, the device 100 receives an input to close the application and closes the application in accordance with the input. After closing the application, the device 100 receives an input to open the application. In response to receiving the input to open the application, the device 100 displays the application in the ergonomic mode in accordance with the input to open the application.

While the application is displayed in the full screen mode or in the ergonomic mode, the device 100 detects a single press of the home button 204 of the device indicating a request to display the home screen view. In responsive to the detection, the device 100 switches from displaying either the full screen mode or the ergonomic mode of the application to displaying the home screen view of the device 100 in the full screen mode as shown for example in FIG. 7A. The home screen view includes rows of icons and favorites icons below the rows of icons.

In some embodiments, the home screen view can be displayed in the ergonomic mode. While the home screen view is displayed, the device 100 detects an input to display the home screen view in the ergonomic mode. In accordance with the input to display the home screen view in the ergonomic mode, the device 100 displays the home screen view in the ergonomic mode as shown for example in FIG. 7B. The ergonomic mode of the home screen view is displayed in the bottom area of the touch screen with a height that is less than the height of the full screen mode of the home screen view. The home screen view displayed in the ergonomic mode includes a portion of the rows of icons included in the home screen view while displayed in the full screen mode and the plurality of favorite icons below the portion of rows.

While the home screen view is displayed in the ergonomic mode, the user optionally can navigate through pages of the home screen view. While the home screen view is displayed in the ergonomic mode, the device 100 receives an input to view a second view of the home screen view. In accordance with the input to view the second home screen view, the device 100 switches from displaying the home screen view in the ergonomic mode to displaying the second home screen view in the ergonomic mode as shown for example in FIG. 7C. The second home screen view includes a portion of a second plurality of rows of icons that is included in the second home screen view while the second home screen view is displayed in the full screen mode and the plurality of favorites icons below the portion of the second plurality of rows.

While the home screen view is displayed in the ergonomic mode, the device 100 receives a selection of an icon from the rows of icons indicating a request input to open a second application. In some embodiments, the device 100 automatically displays the second application in the ergonomic mode in accordance with the selection.

While the application is displayed in either the full screen mode or the ergonomic mode, the device 100 detects multiple sequential presses of a button of the device 100. In response to detecting the sequential presses, the device 100 concurrently displays the application in a first portion of the touch screen 112 and another application in a second portion of the touch screen 112.

It should be understood that the particular order in which the operations in FIG. 15 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 1600) are also applicable in an analogous manner to method 1500 described above with respect to FIG. 15. For example, the inputs, applications, gestures, and user interface objects described above with reference to method 1500 optionally have one or more of the characteristics of the inputs, applications, gestures, and user interface objects described herein with reference to other methods described herein (e.g., method 1600). For brevity, these details are not repeated here.

Figure 17:
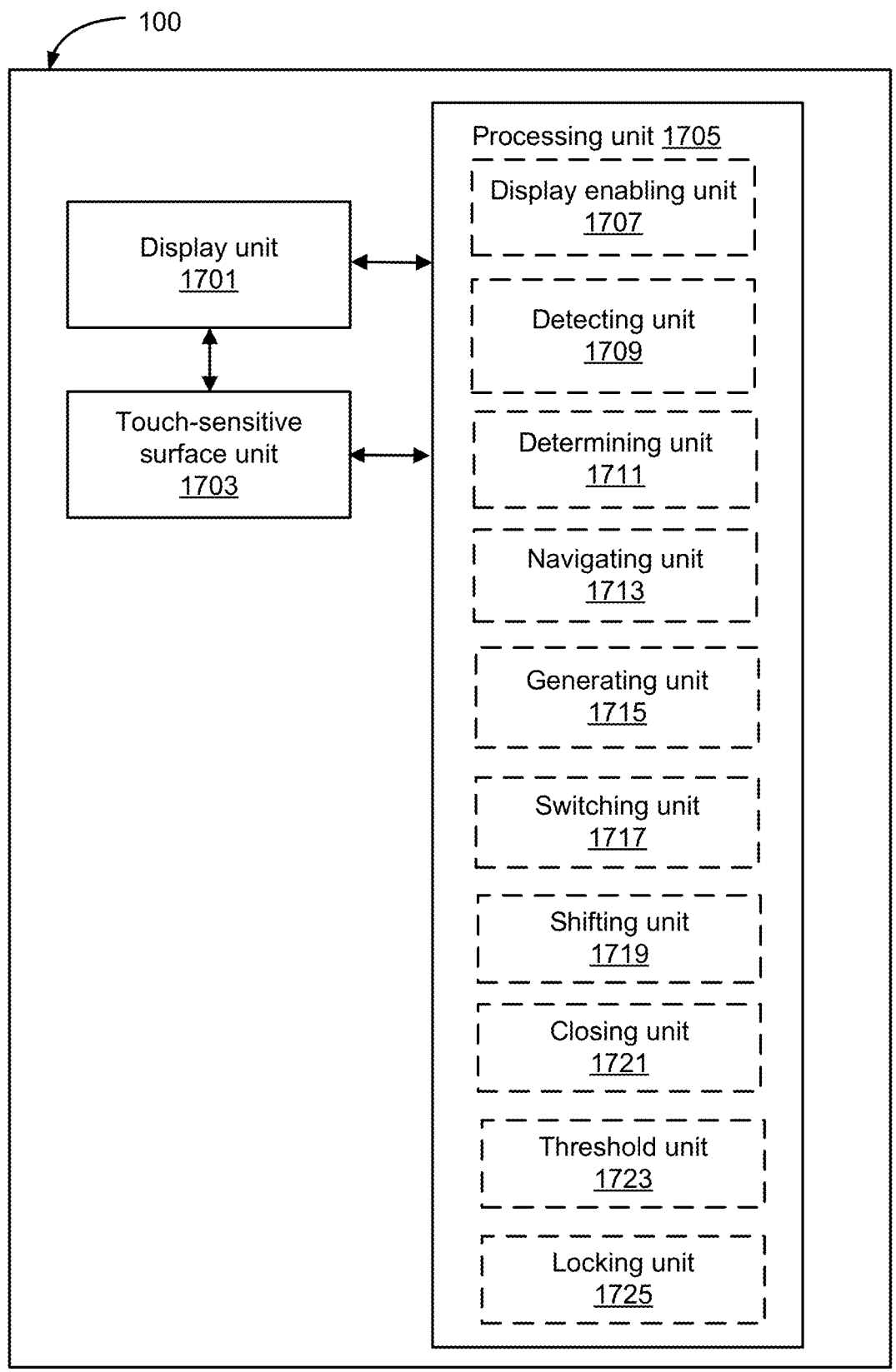
FIGS. 17-18 are functional block diagrams of electronic devices in accordance with some embodiments.

The operations described above with reference to FIG. 15 are, optionally, implemented by components depicted in FIGS. 1A-1B, and FIG. 17. For example, detection operations 1503, 1507, and displaying operations 1501, 1505 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 17.

As mentioned above, the operations described with reference to FIG. 15 are optionally implemented by components depicted in FIG. 17. In accordance with some embodiments, FIG. 17 shows a functional block diagram of device 100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, the device 100 includes a display unit 1701 configured to display an application, a touch-sensitive surface unit 1703 configured to receive user contacts, and a processing unit 1705 coupled to the display unit 1701 and the touch-sensitive surface unit 1703. In some embodiments, the processing unit 1705 includes a display enabling unit 1707, a detecting unit 1709, a determining unit 1711, a navigating unit 1713, a generating unit 1715, a switching unit 1717, a shifting unit 1719, and a closing unit 1721.

The processing unit 1705 is configured to display an application in a first mode (e.g., with the display enabling unit 1707), the application displayed with a first height while in the first mode. While the application is displayed in the first mode, the processing unit 1705 is also configured to detect a first input that corresponds to a request to display the application in a second mode (e.g., with the detecting unit 1709). Responsive to detecting the first input, the processing unit 1705 is also configured to display the application in the second mode (e.g., with the display enabling unit 1707), wherein in the second mode the application is displayed in a bottom area of the display unit 1701, the application displayed in the second mode with a second height that is less than the first height. While the application is displayed in the second mode, the processing unit 1705 is also configured to detect a second input at a location on the touch-sensitive surface unit 1703 that corresponds to the application (e.g., with the detecting unit 1709). Responsive to detecting the second input, the processing unit 1705 is also configured to determine whether the second input is a navigation input or an interaction input (e.g., using the determining unit 1711) and in accordance with a determination that the second input is a navigation input, the processing unit 1705 is configured to navigate within the application without switching back to the first mode (e.g., using the navigating unit 1713). In accordance with a determination that the second input is an interaction input, the processing unit 1705 is further configured to generate a response to the interaction input (e.g., using the generating unit 1715) and switch from the second mode back to the first mode (e.g., using the switching unit 1717).

In some embodiments, in the first mode, the application includes a user interface object that is outside of a reachable area of the display unit 1701 and in the second mode, the user interface object is within the reachable area of the display unit 1701.

In some embodiments, wherein in the first mode the application includes a user interface object located at a position greater than a predefined reach metric indicative that the user interface object is unreachable by a user's finger unless the device 100 is repositioned in the user's hand, and wherein in the second mode the user interface object is located at a position less than the predefined reach metric indicative that the user interface object is reachable by the user's finger without the device 100 being repositioned in the user's hand.

In some embodiments, wherein the first mode comprises a full screen mode where the application occupies an entirety of the display unit 1701 excluding a region for a status bar of the electronic device and the application is displayed with the first height corresponding to a height of the display unit 1701 and a first width corresponding to a width of the display unit 1701 while in the full screen mode.

In some embodiments, wherein in the second mode the application is displayed with the first width and the second height that is less than the height of the display unit 1701 while in the second mode (e.g., using the display enabling unit 1707).

In some embodiments, the navigation input comprises a request to scroll a displayed screen of the application.

In some embodiments, the interaction input comprises at least one of a selection of a user interface object of the application or a request to switch between different views of the application.

In some embodiments, the processing unit 1705 is configured to detect the first input by detecting a plurality of sequential inputs of a button of the device 100 (e.g., using the detecting unit 1709), wherein a single press of the button is associated with displaying a first home screen view including a first plurality of user interface elements that are associated with corresponding applications (e.g., using the display enabling unit 1707).

In some embodiments, the processing unit 1705 is configured to detect the first input by detecting a press of a button of the device less 100 than a threshold amount (e.g., using the detecting unit 1709), wherein a press of the button by more than the threshold amount is associated with performing a different function.

In some embodiments, the processing unit 1705 is configured to detect the first input by detecting a contact on the touch-sensitive surface unit 1703 at a first position adjacent to a vertical edge of the display unit 1701 (e.g., using the detecting unit 1709) and detect a continuous movement of the contact to a second position adjacent to a horizontal edge of the touch-sensitive surface unit 1703 that intersects the vertical edge without the contact breaking contact with the display unit 1701 (e.g., using the detecting unit 1709).

In some embodiments, the processing unit 1705 is configured to detect the first input by detecting a gesture on a button of the device 100 that corresponds to a request to display the application in the second mode (e.g., using the detecting unit 1709), wherein a single press of the button is associated with performing a different function.

In some embodiments, while the application is displayed in either the first mode or the second mode, the processing unit 1705 is also configured to detect a single press of the home button of the device indicating a request to display the first home screen view (e.g., using the detecting unit 1709) and in response to the detection, the processing unit 1705 is further configured to switch from displaying either the first mode or the second mode of the application to displaying the first home screen view of the device 100 in the first mode (e.g., using the switching unit 1717), the first home screen view including the first plurality of rows of icons and a plurality of favorite icons below the plurality of rows of icons.

In some embodiments, while the first home screen view is displayed, the processing unit 1705 is also configured to detect an input to display the first home screen view in the second mode (e.g., using the detecting unit 1709) and in accordance with the input to display the first home screen view in the second mode, the processing unit 1705 is also configured to display the first home screen view in the second mode (e.g., using the display enabling unit 1707), wherein in the second mode the first home screen view is displayed in the bottom area of the display unit 1701 with the second height and the first home screen view includes a portion of the first plurality of rows of icons included in the first home screen view while displayed in the first mode and the plurality of favorite icons below the portion of the plurality of rows.

In some embodiments, the processing unit 1705 is configured to detect the first input by detecting a gesture on a button of the device that corresponds to a request to display the application in the second mode (e.g., using the detecting unit 1709), wherein a single press of the button is associated with performing a different function.

In some embodiments, while the application is displayed in either the first mode or the second mode, the processing unit 1705 is also configured to detect a single press of the home button of the electronic device indicating a request to display the first home screen view (e.g., using the detecting unit 1709) and in response to the detection, the processing unit 1705 is also configured to switch from displaying either the first mode or the second mode of the application to displaying the first home screen view of the device in the first mode (e.g., using the switching unit 1717), the first home screen view including the first plurality of rows of icons and a plurality of favorite icons below the plurality of rows of icons.

In some embodiments, while the first home screen view is displayed, the processing unit 1705 is also configured to detect an input to display the first home screen view in the second mode (e.g., using the detecting unit 1709) and in accordance with the input to display the first home screen view in the second mode, the processing unit 1705 is also configured to display the first home screen view in the second mode (e.g., using the display enabling unit 1707), wherein in the second mode the first home screen view is displayed in the bottom area of the display unit 1701 with the second height and the first home screen view includes a portion of the first plurality of rows of icons included in the first home screen view while displayed in the first mode and the plurality of favorite icons below the portion of the plurality of rows.

In some embodiments, the processing unit 1705 is configured to display the first home screen view in the second mode by shifting the first home screen view in a vertical direction until the first home screen view is displayed in the bottom area of the display unit 1701 with the second height (e.g., using the shifting unit 1719), the shifted view including the portion of the first plurality of rows of icons and the plurality of favorites icons below the portion of the first plurality of rows.

In some embodiments, while the first home screen view is displayed in the second mode, the processing unit 1705 is also configured to receive an input to view a second home screen view and in accordance with the input to view the second home screen view (e.g., using the touch-sensitive surface unit 1703), the processing unit 1705 is configured to switch from displaying the first home screen view in the second mode to displaying the second home screen view in the second mode (e.g., using the switching unit 1717), the second home screen view including a portion of a second plurality of rows of icons that is included in the second home screen view while the second home screen view is displayed in the first mode and the plurality of favorites icons below the portion of the second plurality of rows.

In some embodiments, while the application is displayed in either the first mode or the second mode, the processing unit 1705 is also configured to detect a plurality of sequential presses of a button of the device (e.g., using the detecting unit 1709) and in response to detecting the plurality of sequential presses, the processing unit 1705 is also configured to concurrently display the application in a first portion of the display unit 1701 and another application in a second portion of the display unit 1701 (e.g., using the display enabling unit 1707).

In some embodiments, while in the second mode, the processing unit 1705 is also configured 10 detect a repetition of the first input that corresponds to the request to display the application in the second mode (e.g., using the detecting unit 1709) and the processing unit 1705 is configured to switch from the second mode back to the first mode in accordance with detecting the repetition of the first input while in the second mode (e.g., using the switching unit 1717).

In some embodiments, the second input is a navigational input and the processing unit 1705 is also configured to detect the second input by detecting a contact at a first position on the display unit 1701 (e.g., using the detecting unit 1709) and detect a continuous movement of the contact to a second position on the display unit 1701 (e.g., using the detecting unit 1709), the continuous movement having a lateral component of movement without the contact breaking contact with the display unit 1701. The processing unit 1705 is also configured to scroll to a different view of the application in accordance with detecting the continuous movement (e.g., using the navigating unit 1713).

In some embodiments, the processing unit 1705 is also configured to automatically display a notification view in a top area of the display unit 1701 that is above the bottom area displaying the application (e.g., using the display enabling unit 1707), wherein the notification view includes one or more notifications for the user.

In some embodiments, the processing unit 1705 is also configured to automatically display a blank area in a top area of the display unit 1701 above the bottom area displaying the application (e.g., using the display enabling unit 1707).

In some embodiments, the processing unit 1705 is also configured to detect an input in the blank area (e.g., using the detecting unit 1709) and in response to detecting the input in the blank area, the processing unit 1705 is also configured to switch from the second mode back to the first mode (e.g., using the switching unit 1717).

In some embodiments, the blank area includes a user interface element associated with displaying a notification view including one or more notifications for the user and the processing unit 105 is also configured to detect a contact on the user interface element (e.g., using the detecting unit 1709) and detect a continuous movement of the contact moving the user interface element in a direction of the continuous movement (e.g., using the detecting unit 1709), the continuous movement having a vertical component. In accordance with detecting the vertical component is less than a threshold distance, the processing unit 1705 is also configured to determine a magnitude of the vertical component of the continuous movement (e.g., using the detecting unit 1709) and display a portion of the notification view in the top area of the display unit 1701 above the bottom area displaying the application in the second mode (e.g., using the display enabling unit 1707), wherein a height of the portion of the notification view is proportional to the determined magnitude of the vertical component. In accordance with the detecting the vertical component is greater than the threshold distance, the processing unit 1705 is also configured to display the notification view in its entirety (e.g., using the display enabling unit 1707).

In some embodiments, while the application is displayed in the second mode, the processing unit 1705 is also configured to automatically display an image of a home screen view of the device in a top area of the display unit 1701 above the bottom area displaying the application (e.g., using the display enabling unit 1707).

In some embodiments, the first mode of the application includes a toolbar of the application displayed in the bottom area of the touch screen display, the toolbar including a plurality of user interface elements each associated with a functionality of the application.

In some embodiments, the processing unit 1705 is also configured to determine a view of the application displayed in the first mode with the first height (e.g., using the determining unit 1711), the view including a first portion displaying content of the application and a second portion displaying the toolbar of the application. The processing unit 1705 is also configured to shift the view of the application in a vertical direction until the view is displayed in the bottom area of the display unit 1701 with the second height (e.g., using the shifting unit 1719), the shifted view including the first portion displaying the content of the application and not including the second portion displaying the toolbar.

In some embodiments, the processing unit 1705 is also configured to determine a first view of the application associated with the application in the first mode (e.g., using the determining unit 1711), the first view including the first portion displaying content of the application and the second portion displaying the toolbar of the application. The processing unit 1705 is also configured to determine a second view of the application associated with the application in the second mode (e.g., using the determining unit 1711), the second view including the first portion displaying content of the application resized in accordance with the second height and the second portion displaying the toolbar of the application resized in accordance with the second height.

In some embodiments, while the application is displayed in the second mode, the processing unit 1705 is also configured to determine an amount of time since an input to the application was last received (e.g., using the determining unit 1711) and in accordance with determining that the amount of time exceeds a threshold, the processing unit 1705 is also configured to automatically switch from the second mode back to the first mode (e.g., using the switching unit 1717).

In some embodiments, after entering the second mode and prior to detecting an input while in the second mode, the device 100 uses a first time threshold to determine whether to automatically switch back to the first mode and after detecting the second input the processing unit 1705 is also configured to use a second time threshold, different from the first time threshold to determine whether to automatically switch back to the first mode (e.g., using the determining unit 1711).

In some embodiments, while the application is displayed in the second mode, the processing unit 1705 is also configured to determine an amount of time since an input to the application was last received (e.g., using the determining unit 1711) and in accordance with receiving an input to the application while the amount of time is less than a threshold, the processing unit 1705 is also configured to reduce the threshold (e.g., using the threshold unit 1723). In accordance with a determination that an amount of time since the input to the application was last received exceeds the reduced threshold, the processing unit 1705 is also configured to automatically switch from the second mode back to the first mode (e.g., using the switching unit 1717) and in accordance with receiving another input to the application while the amount of time since the input to the application was last received is less than the reduced threshold, the processing unit 1705 is also configured to increase the threshold (e.g., using the threshold unit 1723).

In some embodiments, the processing unit 1705 is also configured to receive a request to prevent switching from the second mode back to the first mode (e.g., using the switching unit 1717) and is also configured to lock the application in the second mode (e.g., using the locking unit 1725). While the application is locked in the second mode, the processing unit 1705 is also configured to receive an input to dismiss the application (e.g., using the detecting unit 1709) and is configured to dismiss the application in accordance with the input to dismiss the application (e.g., using the switching unit 1717). The processing unit 1705 is also configured to receive an input to open the application (e.g., using the detecting unit 1709 and displays the application in the second mode in accordance with the input to open the application (e.g., using the display enabling unit 1707).

In some embodiments, the processing unit 1705 is also configured to display the first home screen view of the device including the first plurality of rows of icons (e.g., using the display enabling unit 1707) and receive a selection of an icon from the first plurality of rows of icons indicating a request input to open a second application (e.g., using the detecting unit 1709). The processing unit 1705 is also configured to automatically display the second application in the second mode in accordance with the selection (e.g., using the display enabling unit 1707).

In some embodiments, while the application is displayed in the second mode, the processing unit 1705 is also configured to receive an input to close the application (e.g., using the detecting unit 1709) and closes the application in accordance with the input (e.g., using the closing unit 1721). The processing unit 1705 is also configured to receive an input to reopen the application (e.g., using the detecting the unit 1709) and automatically displays the application in the first mode in accordance with the input to reopen the application (e.g., using the display enabling unit 1707).

In some embodiments, while the application is displayed in the second mode, the processing unit 1705 is also configured to receive an input to close the application (e.g., using the detecting unit 1709) and closes the application in accordance with the input (e.g., using the closing unit 1721). After closing the application, the processing unit 1705 is also configured to receive an input to open the application (e.g., using the detecting unit 1709) and in response to receiving the input to open the application, the processing unit 1705 is also configured to display the application in the second mode in accordance with the input to open the application (e.g., using the display enabling unit 1707).

In some embodiments, the application is a calendar application and wherein displaying the application in the first mode and displaying the application in the second mode comprises the processing unit 1705 displaying twelve months of a calendar year while in the first mode and displaying six months of the calendar year while in the second mode (e.g., using the display enabling unit 1707).

Figure 16:
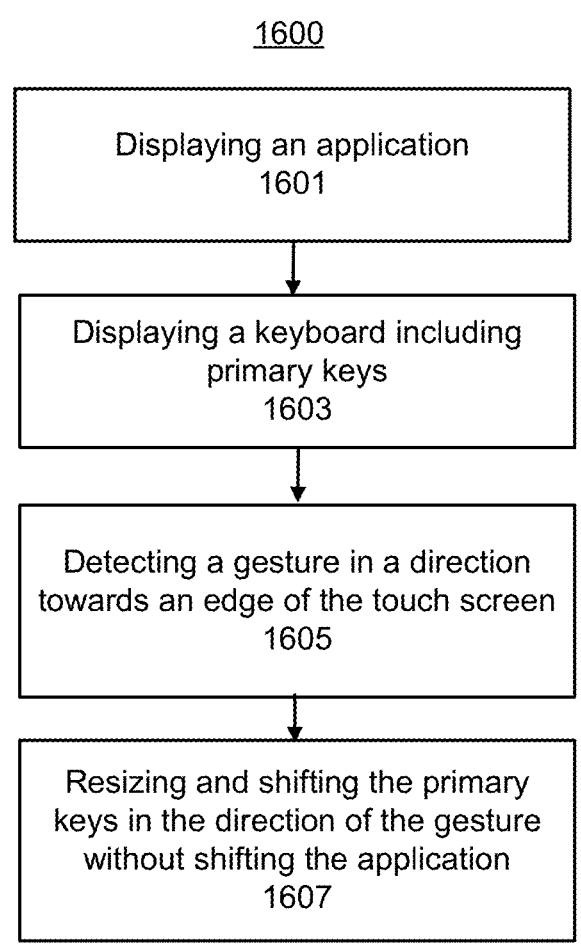
FIG. 16 is a method flow diagram for activating an ergonomic mode of a keyboard in accordance with some embodiments.

FIG. 16 is an exemplary method flow diagram of a method 1600 for displaying an ergonomic mode of a keyboard. Note that in other embodiments, different steps may be performed other than those shown in FIG. 16.

The device 100 displays 1601 a view of a first application on the touch screen 112. The view includes a full screen view of the application. While the view of the first application is displayed, the device also displays 1603 a keyboard including a set of primary keys at a first position on the touch screen 112 as shown for example at FIG. 11A. The keyboard is optionally overlaid over the first application. In some embodiments, the set of primary keys are substantially centered along the width of the touch screen 112. At the first position, the keyboard includes a key that is outside of a reachable area of the display. That is, the key from the primary set of keys is displayed at a first position that is greater than a predefined reach metric indicative that the key is unreachable by a user's finger unless the device 100 is repositioned in the user's hand.

The device 100 detects 1605 a gesture in a direction towards an edge of the touch screen 112. For example, the device 100 detects an edge swipe gesture on the keyboard that is indicative of a request to display an ergonomic mode of the keyboard as shown for example at FIGS. 11B and 11F.

In accordance with the gesture, the device 100 resizes and shifts 1607 the primary keys in the direction of the gesture to a second position on the display without shifting the application as shown for example at FIGS. 11C and 11G. While at the second position, the key is now within the reachable area of the display. That is, the key is now located at a position that is less than the predefined reach metric indicative that the key is reachable by the user's finger without the device being repositioned in the user's hand after resizing and shifting the primary set of keys in the direction of the gesture to the second position.

In some embodiments, the device 100 displays auxiliary keys in a portion of the display previously displaying a portion of the primary set of keys responsive to the gesture to display the ergonomic mode of the keyboard as shown for example at FIGS. 11C and 11G. The auxiliary keys are optionally displayed in a single column (e.g., FIGS. 11C and 11G) or in multiple columns (e.g., FIGS. 11E and 11H) and are displayed in a visually distinguished manner from the primary set of keys. The auxiliary keys optionally include a bold, underline, italic, undo, foreign language key, or punctuation keys.

In some embodiments, the user can scroll through the auxiliary keys to view additional auxiliary keys as shown for example at FIG. 11D. The device 100 detects an input on the auxiliary keys to display an additional key. The device 100 removes the key from the auxiliary keys and displays the additional key in accordance with detecting the input, the additional key displayed while continuing to display the primary set of keys.

The device 100 determines the direction in which to resize and shift the primary set of keys based on the direction of the gesture used to activate the ergonomic mode of the keyboard. The device 100 determines whether the direction of the gesture is in a first direction or a second direction. In accordance with determining the direction of the gesture in the first direction, the device resizes and shifts the primary set of keys to the second position in the first direction. In accordance with determining the direction of the gesture is in the second direction, the device 100 resizes and shifts the primary set of keys to the second position in the second direction. In some embodiments, the auxiliary keys that are displayed are the same regardless of whether the primary keys are shifted in the first direction or the second direction. In some embodiments, the device 100 detects a second gesture in a direction opposite of the detected gesture used to activate the ergonomic mode of the keyboard. In response to detecting the second gesture, the device undoes the resizing of the first set of keys and displays the first set of keys at the first position rather than at the second position without shifting the view of the first application.

In some embodiments, the primary set of keys and the auxiliary set of keys are resizable. The device 100 detects a contact at a first location on the second set of keys and a continuous movement of the contact to a second location on the keyboard as shown for example at FIG. 12A The continuous movement has a lateral component of movement without the contact breaking contact with the display. The device 100 determines a magnitude of the lateral component and resizes a width of the primary set of keys and a width of the auxiliary set of keys based on the determined magnitude of the lateral component. The width of the primary set keys is decreased to a smaller width and the width of the auxiliary set of keys is increased to a larger width in accordance with the lateral component being in the first direction as shown for example at FIG. 12B. In contrast, the width of the primary set keys is increased to a larger width and the width of the second set of keys is decreased to a smaller width in accordance with the lateral component being in the second direction.

In some embodiments, the device 100 switches from displaying the customized widths of the primary set of keys and the secondary set of keys based on time. The device 100 determines an elapsed time since the width of the primary set of keys and the width of the auxiliary keys was resized. In accordance with determining that the elapsed time exceeds a threshold, the device 100 resizes the width of the primary set of keys back to a default width and the width of the auxiliary set of keys back to a default width.

In some embodiments, the customized width of the primary set of keys and auxiliary keys is persistent in the application. The device 100 closes the first application while the primary set of keys are displayed with the resized width based on the determined magnitude of the lateral component. In accordance with an input to open the first application, the device displays the view of the first application and the keyboard including the first set of keys displayed at the first position on the display. Responsive to a detection of the gesture in the direction towards the edge of the display, the device determines the resized width of the primary set of keys prior to the first application being closed and resizes and shifts the first set of keys in the direction of the gesture to the second position without shifting the view of the first application. In alternative embodiments, the customized width of the primary set of keys is not persistent. Responsive to the detection of the gesture, the device resets the resized width of the primary set of keys and shifts the resized primary set of keys in the direction of the gesture to the second position without shifting the view of the first application in the portion of the display previously displaying the portion of the first set of keys.

In some embodiments, the ergonomic mode of the keyboard is persistent across all applications. For example, the device 100 switches from displaying the view of the first application to displaying a view of the second application. The device then displays the keyboard including the first set of keys while displaying the view of the second application, wherein the primary set of keys is automatically resized and displayed at the second position on the display.

In some embodiments, the ergonomic mode of the keyboard is persistent in the first application, but is not persistent across other applications. The device 100 switches from displaying the view of the first application to displaying a view of a second application. The device 100 displays the keyboard including the primary set of keys while displaying the view of the second application. The device 100 automatically displays the primary set of keys at the first position on the display without being resized and shifted as previously displayed in the first application. The device 100 then switches from displaying the view of the second application back to displaying the view of the first application. The device 100 then displays the keyboard including the primary set of keys while displaying the first application, wherein the primary set of keys is automatically resized and displayed at the second position on the display as previously displayed prior to closing the first application.

In some embodiments, the device 100 employs accuracy heuristics for automatically displaying the ergonomic mode of the keyboard. The device 100 detects incorrect selections of one or more keys from the primary set of keys and automatically resizes and shifts the primary set of keys in a direction based at least in part on a directional bias of the incorrect selections as shown for example in FIGS. 14A and 14B. The device 100 optionally displays a prompt to the user requesting permission to resize and shift the first set of keys to improve key selection accuracy as shown for example in FIG. 14C. In response to receiving the permission, the device 100 resizes and shifts the primary set of keys in a direction based at least in part on a direction bias of the incorrect selections.

In some embodiments, the device detects it is in an orientation associated with a landscape mode. In response to detecting that the device is in an orientation associated with a landscape mode, the device 100 displays the keyboard in the landscape mode. The landscape mode of the keyboard includes the primary set of keys substantially centered on the display and a first portion of the auxiliary set of keys displayed to a first side of the first set of keys as shown for example in FIG. 13A.

It should be understood that the particular order in which the operations in FIG. 16 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 1500) are also applicable in an analogous manner to method 1600 described above with respect to FIG. 16. For example, the inputs, applications, gestures, and user interface objects described above with reference to method 1600 optionally have one or more of the characteristics of the inputs, applications, gestures, and user interface objects described herein with reference to other methods described herein (e.g., method 1500). For brevity, these details are not repeated here. The operations described above with reference to FIG. 16 are, optionally, implemented by components depicted in FIGS. 1A-1B, and FIG. 18. For example, detection operations 1605, and displaying operations 1601, 1603 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 18.

Figure 18:
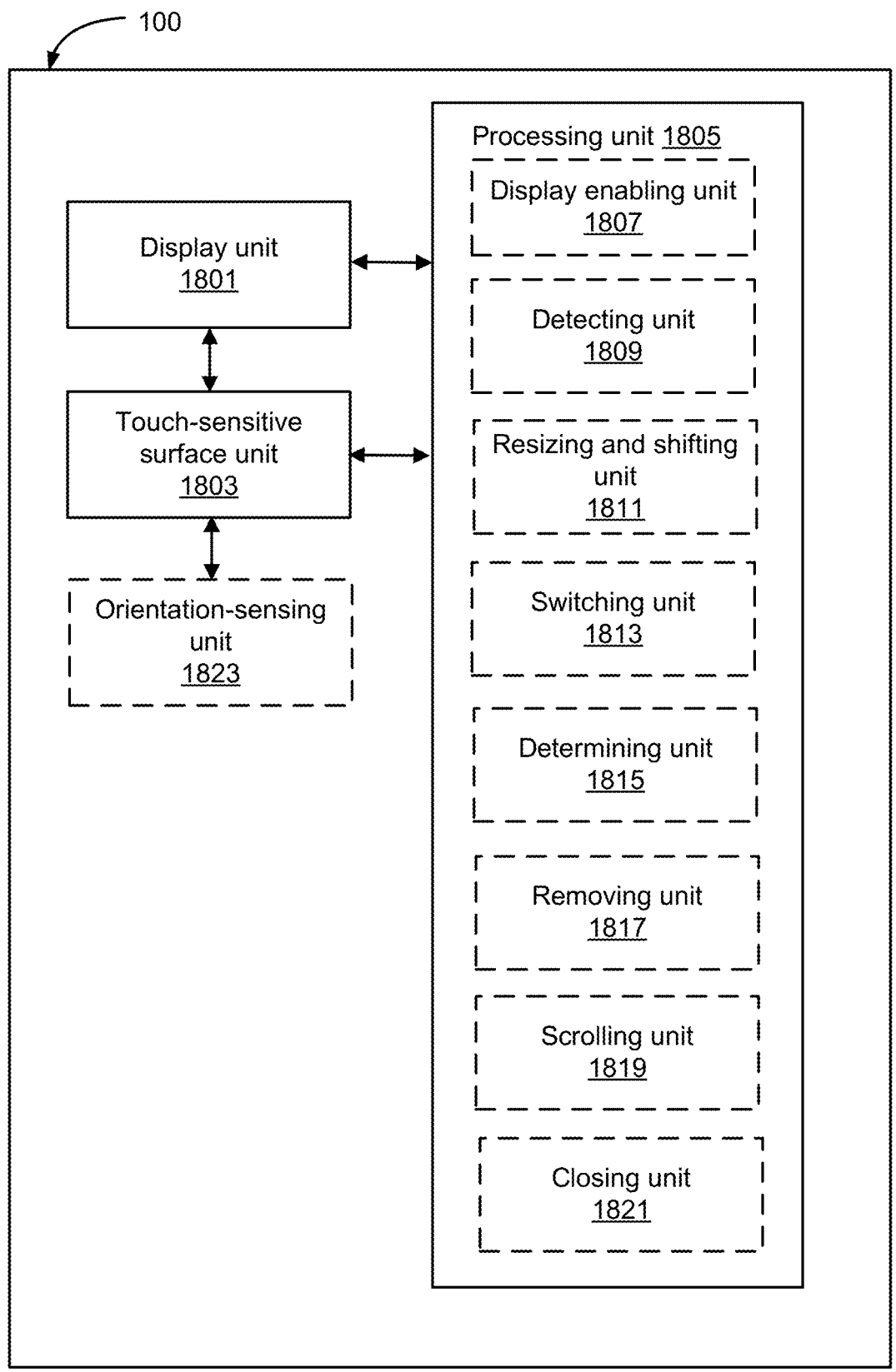

As mentioned above, the operations described with reference to FIG. 16 are optionally implemented by components depicted in FIG. 18. In accordance with some embodiments, FIG. 18 shows a functional block diagram of device 100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, the device 100 includes a display unit 1801 configured to display an application, a touch-sensitive surface unit 1803 configured to receive user contacts, an orientation-sensing unit 1823 configured to sense an orientation of the device 100, and a processing unit 1805 coupled to the display unit 1801 and the touch-sensitive surface unit 1803. In some embodiments, the processing unit 1805 includes a display enabling unit 1807, a detecting unit 1809, a resizing and shifting unit 1811, a switching unit 1813, a determining unit 1815, a removing unit 1817, a scrolling unit 1819, and a closing unit 1821.

The processing unit 1805 is configured to display a view of a first application (e.g., using the display enabling unit 1807) and display a keyboard including a first set of keys while displaying the first application (e.g., using the display enabling unit 1807), the first set of keys displayed at a first position on the display unit 1801. The processing unit 1805 is also configured to detect, at the display unit 1801, a gesture in a direction towards an edge of the display unit 1801 (e.g., using the detecting unit 1809) and responsive to the detection, the processing unit 1805 is also configured to resize and shift the first set of keys in the direction of the gesture to a second position on the display unit 1801 without shifting the view of the application (e.g., using the resizing and shifting unit 1811).

In some embodiments, wherein at the first position, the keyboard includes a key that is outside of a reachable area of the display unit 1801 and wherein at the second position, the key is within the reachable area of the display unit 1801.

In some embodiments, wherein a key from the first set of keys of the keyboard displayed at the first position that is greater than a predefined reach metric indicative that the key is unreachable by a user's finger unless the device is repositioned in the user's hand, and wherein the key is located at a position that is less than the predefined reach metric indicative that the key reachable by the user's finger without the device being repositioned in the user's hand after resizing and shifting the first set of keys in the direction of the gesture to the second position.

In some embodiments, the processing unit 1805 is also configured to switch from displaying the view of the first application to displaying a view of the second application (e.g., using the switching unit 1813) and displaying the keyboard including the first set of keys while displaying the view of the second application (e.g., using the display enabling unit 1807), wherein the first set of keys is displayed at the first position on the display unit 1801 without being resized and shifted as previously displayed in the first application. The processing unit 1805 is also configured to switch from displaying the view of the second application back to displaying the view of the first application (e.g., using the switching unit 1813) and display the keyboard including the first set of keys while displaying the first application (e.g., using the display enabling unit 1807), wherein the first set of keys is automatically resized and displayed at the second position on the display unit 1801 as previously displayed prior to closing the first application.

In some embodiments, the processing unit 1805 is also configured to switch from displaying the view of the first application to displaying a view of the second application (e.g., using the switching unit 1813) and display the keyboard including the first set of keys while displaying the view of the second application (e.g., using the display enabling unit 1807), wherein the first set of keys is automatically resized and displayed at the second position on the display.

In some embodiments, while the first set of keys is displayed at the second position, the processing unit 1805 is also configured to determine an amount of time since an input to the first application was last received (e.g., using the determining unit 1815) and in accordance with determining that the elapsed time exceeds a threshold, the processing unit 1805 is also configured to shift the first set of keys back to the first position and resize the first set of keys back to an initial size of the first set of keys prior to the first set of keys being resized and shifted to the second position (e.g., using the resizing and shifting unit 1811).

In some embodiments, the processing unit 1805 is also configured to display a second set of keys in a portion of the display unit 1801 previously displaying a portion of the first set of keys responsive to the detection of the gesture.

In some embodiments, the processing unit 1805 is also configured to display the second set of keys arranged in a single column or in a plurality of columns.

In some embodiments, the processing unit 1805 is also configured to detect an input on the second set of keys to display an additional key (e.g., using the detecting unit 1809) and remove a key from the second set of keys (e.g., using the removing unit 1817) and display the additional key in accordance with detecting the input (e.g., using the display enabling unit 1807), the additional key displayed while continuing to display the first set of keys.

In some embodiments, the processing unit 1805 is also configured to detect a gesture on the view of the first application (e.g., using the detecting unit 1809) and responsive to detecting the gesture on the view of the first application, the processing unit 1805 is also configured to scroll through the view of the first application (e.g., using the scrolling unit 1819).

In some embodiments, the processing unit 1805 is also configured to detect a contact at a first location on the keyboard adjacent to a first vertical edge of the display unit 1801 and detect a continuous movement of the contact to a second location on the keyboard (e.g., using the detecting unit 1809), the continuous movement having a lateral component of movement without the contact breaking contact with the display unit 1801.

In some embodiments, the processing unit 1805 is also configured to determine whether the direction of the gesture is in a first direction or a second direction (e.g., using the determining unit 1815) and in accordance with determining the direction of the gesture in the first direction, the processing unit 1805 is also configured to resize and shift the first set of keys to the second position in the first direction (e.g., using the resizing and shifting unit 1811). In accordance with determining the direction of the gesture in the second direction, the processing unit 1805 is also configured to resize and shift the first set of keys to the second position in the second direction (e.g., using the resizing and shifting unit 1811).

In some embodiments, the processing unit 1805 is also configured to detect a second gesture in a direction opposite the detected gesture (e.g., using the detecting unit 1809) and in response to detecting the second gesture, the processing unit 1805 is also configured to undo the resizing of the first set of keys (e.g., using the resizing and shifting unit 1811) and display the first set of keys at the first position rather than at the second position without shifting the view of the first application (e.g., using the display enabling unit 1807).

In some embodiments, the same second set of keys is displayed regardless of whether keys are shifted in the first direction or the second direction.

In some embodiments, the processing unit 1805 is also configured to display the first set of keys substantially centered on the display unit 1801 (e.g., using the display enabling unit 1807).

In some embodiments, the first set of keys is offset from a center of the display unit 1801 in the direction of the gesture.

In some embodiments, the processing unit 1805 is also configured to detect a contact at a first location on the second set of keys (e.g., using the detecting unit 1809) and detect a continuous movement of the contact to a second location on the keyboard (e.g., using the detecting unit 1809), the continuous movement having a lateral component of movement without the contact breaking contact with the display unit 1801. The processing unit 1805 is also configured to determine a magnitude of the lateral component (e.g., using the determining unit 1815) and resize a width of the first set of keys and a width of the second set of keys based on the determined magnitude of the lateral component (e.g. using the resizing and shifting unit 1811).

In some embodiments, the width of the first set keys is decreased to a smaller width and the width of the second set of keys is increased to a larger width in accordance with the lateral component being in the first direction, and wherein the width of the first set keys is increased to a larger width and the width of the second set of keys is decreased to a smaller width in accordance with the lateral component being in the second direction.

In some embodiments, the processing unit 1805 is also configured to close the first application while the first set of keys are displayed with the resized width based on the determined magnitude of the lateral component (e.g., using the closing unit 1821) and detect an input to open the first application (e.g., using the detecting unit 1809). In accordance with the input to open the first application, the processing unit 1805 is also configured to display the view of the first application (e.g., using the display enabling unit 1807) and display the keyboard including the first set of keys while displaying the first application (e.g., using the display enabling unit 1807), the first set of keys displayed at the first position on the display unit 1801. The processing unit 1805 is also configured to detect, at the display unit 1801, the gesture in the direction towards the edge of the display unit 1801 (e.g., using the detecting unit 1809) and responsive to the detection, the processing unit 1805 determines the resized width of the first set of keys prior to the first application being closed (e.g., using the determining unit 1815). The processing unit 1805 also resizes and shifts the first set of keys in the direction of the gesture to the second position without shifting the view of the first application based on the determined resized width (e.g., using the resizing and shifting unit 1811).

In some embodiments, the processing unit 1805 is also configured to close the first application while the first set of keys are displayed with the resized width based on the determined magnitude of the lateral component (e.g., using the closing unit 1821). The processing unit 1805 is also configured to detect an input to open the first application (e.g., using the detecting unit 1809) and in accordance with the input to open the first application, the processing unit 1805 is configured to display the view of the first application (e.g., using the display enabling unit 1807). The processing unit 1805 is also configured to display the keyboard including the first set of keys while displaying the first application, the first set of keys displayed at the first position on the display unit 1801 (e.g., using the display enabling unit 1807) and detect, at the display unit 1801, the gesture in the direction towards the edge of the display unit 1801 (e.g., using the detecting unit 1809). Responsive to the detection, the processing unit 1805 is also configured to reset the resized width of the first set of keys and shift the resized first set of keys in the direction of the gesture to the second position without shifting the view of the first application in the portion of the display previously displaying the portion of the first set of keys (e.g., using the resizing and shifting unit 1811).

In some embodiments, the processing unit 1805 is also configured to determine an elapsed time since the width of the first set of keys and the width of the second set of keys was resized (e.g., using the determining unit 1815) and in accordance with determining that the elapsed time exceeds a threshold, the processing unit 1805 is also configured to resize the width of the first set of keys back to a default width and the width of the second set of keys back to a default width (e.g., using the resizing and shifting unit 1811).

In some embodiments, after resizing and shifting the first set of keys while displaying the first application, the processing unit 1805 is also configured to switch from the first application to a second application (e.g., using the switching unit 1813). While displaying the second application, the processing unit 1805 is also configured to receive a request to display the keyboard (e.g., using the detecting unit 1809) and in response to receiving the request to display the keyboard, the processing unit 1805 is configured to display the keyboard with the first set of keys resized and shifted (e.g., using the display enabling unit 1807).

In some embodiments, the second set of keys includes a plurality of foreign language keyboard keys, each foreign language keyboard key associated with displaying a corresponding foreign language keyboard.

In some embodiments, the processing unit 1805 is also configured to display the second set of keys in a visually distinguished manner from the first set of keys (e.g., using the display enabling unit 1807).

In some embodiments, while displaying a first keyboard with a first set of auxiliary keys associated with the first keyboard, the processing unit 1805 is configured to receive a request to switch to a second keyboard (e.g., using the detecting unit 1809). In response to receiving the request to switch to the second keyboard, the processing unit 1805 is also configured to replace display of the second keyboard with the first keyboard (e.g., using the removing unit 1817) and replacing display of the first set of auxiliary keys associated with the first keyboard with display of a second set of auxiliary keys associated with the second keyboard (e.g., using the removing unit 1817), wherein the second set of auxiliary keys are different from the first set of auxiliary keys.

In some embodiments, the processing unit 1805 is also configured to detect a plurality of incorrect selections of one or more keys from the first set of keys (e.g., using the detecting unit 1809) and automatically resize and shift the first set of keys in a direction based at least in part on a directional bias of the plurality of incorrect selections (e.g., using the resizing and shifting unit 1811).

In some embodiments, the processing unit 1805 is also configured to detect a plurality of incorrect selections of one or more keys from the first set of keys (e.g., using the detecting unit 1809) and display a prompt to the user requesting permission to resize and shift the first set of keys to improve key selection accuracy (e.g., using the display enabling unit 1807). In response to receiving the permission, the processing unit 1805 is also configured to automatically resize and shift the first set of keys in a direction based at least in part on a direction bias of the plurality of incorrect selections (e.g., using the resizing and shifting unit 1811).

In some embodiments, the processing unit 1805 is also configured to detect that the device 100 is in an orientation associated with a landscape mode (e.g., using the orientation-sensing unit 1823) and in response to detecting that the device 100 is in an orientation associated with a landscape mode, the processing unit 1805 is also configured to display the keyboard in the landscape mode (e.g., using the display enabling unit 1807), the landscape mode of the keyboard including the first set of keys substantially centered on the display unit 1801 and a first portion of the second set of keys displayed to a first side of the first set of keys.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable storage medium storing one or more programs, the one or more programs comprising instructions, which when executed by an electronic device with a touch screen display, cause the electronic device to:
   display an application in a first mode, the application displayed with a first height while in the first mode, the application in the first mode including an icon;
   while the application is displayed in the first mode, detect a first input;
   responsive to detecting the first input:
      in accordance with a determination that the first input corresponds to activation of the icon:
         perform an operation associated with the icon without displaying the application in a second mode;
      in accordance with a determination that the first input corresponds to a request to display the application in the second mode:
         display the application in the second mode by shifting display of the application including the icon, wherein in the second mode the application is displayed in a bottom area of the touch screen display, the application displayed in the second mode with a second height that is less than the first height;
   detect a second input at a location on the touch screen display, wherein the second input is received after detecting an end of the first input and wherein the second input is received while the application is displayed in the second mode; and
   responsive to detecting the second input:
      in accordance with a determination that the second input is a navigation input detected at a location on the touch screen display that corresponds to the application, scroll within the application without switching back to the first mode;
      in accordance with a determination that the second input is an input on a blank area of the display or a background image of the display, switch from the second mode back to the first mode; and
      in accordance with a determination that the second input is an activation of the icon detected at a location on the touch screen display that corresponds to the application, perform the operation and switch from the second mode back to the first mode.

2. The non-transitory computer readable storage medium of claim 1, wherein:
   in the first mode, the application includes a user interface object that is outside of a reachable area of the touch screen display; and
   in the second mode, the user interface object is within the reachable area of the touch screen display.

3. The non-transitory computer readable storage medium of claim 1, wherein in the first mode the application includes a user interface object located at a position greater than a predefined reach metric indicative that the user interface object is unreachable by a user's finger unless the electronic device is repositioned in the user's hand, and wherein in the second mode the user interface object is located at a position less than the predefined reach metric indicative that the user interface object is reachable by the user's finger without the electronic device being repositioned in the user's hand.

4. The non-transitory computer readable storage medium of claim 1, wherein the first mode comprises a full screen mode where the application occupies an entirety of the touch screen display excluding a region for a status bar of the electronic device and the application is displayed with the first height corresponding to a height of the touch screen display and a first width corresponding to a width of the touch screen display while in the full screen mode.

5. The non-transitory computer readable storage medium of claim 1, wherein the operation associated with the icon is a request to switch between different views of the application.

6. The non-transitory computer readable storage medium of claim 1, wherein detecting the first input comprises:
   detecting a contact on the touch screen display at a first position adjacent to a vertical edge of the touch screen display; and
   detecting a continuous movement of the contact to a second position adjacent to a horizontal edge of the touch screen display that intersects the vertical edge without the contact breaking contact with the touch screen display.

7. The non-transitory computer readable storage medium of claim 1, wherein detecting the first input comprises:
   detecting a gesture on a button of the electronic device that corresponds to a request to display the application in the second mode, wherein a single press of the button is associated with performing a different function.

8. The non-transitory computer readable storage medium of claim 1, wherein the instructions when executed by the electronic device further cause the electronic device to:
   while in the second mode, detect a repetition of the first input that corresponds to the request to display the application in the second mode; and
   switch from the second mode back to the first mode in accordance with detecting the repetition of the first input while in the second mode.

9. The non-transitory computer readable storage medium of claim 1, wherein displaying the application in the second mode comprises:
   automatically displaying a blank area in a top area of the touch screen display above the bottom area displaying the application.

10. The non-transitory computer readable storage medium of claim 1, wherein displaying the application in the second mode comprises:
    automatically displaying an area of the application in a top area of the touch screen display above the bottom area displaying the application, the area of the application including a user interface element associated with displaying a notification view including one or more notifications for the user;

detecting a contact on the user interface element;
detecting continuous movement of the contact moving the user interface element in a direction of the continuous movement; the continuous movement having a vertical component;
in accordance with detecting the vertical component is less than a threshold distance:
  determining a magnitude of the vertical component of the continuous movement; and
  displaying a portion of the notification view in the top area of the touch screen display above the bottom area displaying the application in the second mode, wherein a height of the portion of the notification view is proportional to the determined magnitude of the vertical component; and
in accordance with the detecting the vertical component is greater than the threshold distance, displaying the notification view in its entirety.

11. The non-transitory computer readable storage medium of claim 1, wherein displaying the application in the second mode comprises:
while the application is displayed in the second mode, automatically displaying an image of a home screen view of the electronic device in a top area of the touch screen display above the bottom area displaying the application.

12. The non-transitory computer readable storage medium of claim 1, wherein the first mode of the application includes a toolbar of the application displayed in the bottom area of the touch screen display; the toolbar including a plurality of user interface elements each associated with a functionality of the application, and wherein displaying the application in the second mode comprises:
determining a view of the application displayed in the first mode with the first height, the view including a first portion displaying content of the application and a second portion displaying the toolbar of the application; and
shifting the view of the application in a vertical direction until the view is displayed in the bottom area of the touch screen display with the second height, the shifted view including the first portion displaying the content of the application and not including the second portion displaying the toolbar.

13. The non-transitory computer readable storage medium of claim 1, wherein the first mode of the application includes a toolbar of the application displayed in the bottom area of the touch screen display, the toolbar including a plurality of user interface elements each associated with a functionality of the application, and wherein displaying the application in the second mode comprises:
determining a first view of the application associated with the application in the first mode, the first view including the first portion displaying content of the application and the second portion displaying the toolbar of the application; and
determining a second view of the application associated with the application in the second mode, the second view including the first portion displaying content of the application resized in accordance with the second height and the second portion displaying the toolbar of the application resized in accordance with the second height.

14. The non-transitory computer readable storage medium of claim 1, wherein the instructions when executed by the electronic device further cause the device to:
while the application is displayed in the second mode, determine an amount of time since an input to the application was last received; and
in accordance with determining that the amount of time exceeds a threshold, automatically switch from the second mode back to the first mode.

15. The non-transitory computer readable storage medium of claim 1, wherein, after entering the second mode and prior to detecting the second input while in the second mode, the electronic device uses a first time threshold to determine whether to automatically switch back to the first mode, and wherein the instructions when executed by the electronic device further cause the electronic device to:
after detecting the second input, use a second time threshold, different from the first time threshold to determine whether to automatically switch back to the first mode.

16. The non-transitory computer readable storage medium of claim 1, wherein the instructions when executed by the electronic device further cause the device to:
receive a request to prevent switching from the second mode back to the first mode;
lock the application in the second mode;
while the application is locked in the second mode, receive an input to dismiss the application;
dismiss the application in accordance with the input to dismiss the application;
receive an input to open the application; and
display the application in the second mode in accordance with the input to open the application.

17. An electronic device comprising:
a touch screen display;
one or more processors;
memory; and
one or more programs, wherein the one or more programs are stored in the memory and configured and configured to be executed by the one or more processors, the one or more programs including instructions for:
displaying an application in a first mode, the application displayed with a first height while in the first mode, the application in the first mode including an icon;
while the application is displayed in the first mode, detecting a first-input;
responsive to detecting the first input:
  in accordance with a determination that the first input corresponds to activation of the icon:
    performing an operation associated with the icon without displaying the application in a second mode;
  in accordance with a determination that the first input corresponds to a request to display the application in the second mode:
    displaying the application in the second mode, wherein in the second mode the application is displayed in a bottom area of the touch screen display, the application displayed in the second mode with a second height that is less than the first height;
    detecting a second input at a location on the touch screen display, wherein the second input is received after detecting an end of the first input and wherein the second input is received while the application is displayed in the second mode; and
  responsive to detecting the second input:
    in accordance with a determination that the second input is a navigation input detected at a location on the touch screen display that corresponds to the application, scrolling within the application without switching back to the first mode;

in accordance with a determination that the second input is an input on a blank area of the display or a background image of the display, switching from the second mode back to the first mode; and in accordance with a determination that the second input is an activation of the icon detected at a location on the touch screen display that corresponds to the application, performing the operation and switch from the second mode back to the first mode.

18. The electronic device of claim 17, wherein:
in the first mode, the application includes a user interface object that is outside of a reachable area of the touch screen display; and
in the second mode, the user interface object is within the reachable area of the touch screen display.

19. The electronic device of claim 17, wherein in the first mode the application includes a user interface object located at a position greater than a predefined reach metric indicative that the user interface object is unreachable by a user's finger unless the electronic device is repositioned in the user's hand, and wherein in the second mode the user interface object is located at a position less than the predefined reach metric indicative that the user interface object is reachable by the user's finger without the electronic device being repositioned in the user's hand.

20. The electronic device of claim 17, wherein the first mode comprises a full screen mode where the application occupies an entirety of the touch screen display excluding a region for a status bar of the electronic device and the application is displayed with the first height corresponding to a height of the touch screen display and a first width corresponding to a width of the touch screen display while in the full screen mode.

21. The electronic device of claim 17, wherein the operation associated with the icon is a request to switch between different views of the application.

22. The electronic device of claim 17, wherein detecting the first input comprises:
detecting a contact on the touch screen display at a first position adjacent to a vertical edge of the touch screen display; and
detecting a continuous movement of the contact to a second position adjacent to a horizontal edge of the touch screen display that intersects the vertical edge without the contact breaking contact with the touch screen display.

23. The electronic device of claim 17, wherein detecting the first input comprises:
detecting a gesture on a button of the electronic device that corresponds to a request to display the application in the second mode, wherein a single press of the button is associated with performing a different function.

24. The electronic device of claim 17, the one or more programs further including instructions for:
while in the second mode, detecting a repetition of the first input that corresponds to the request to display the application in the second mode; and
switching from the second mode back to the first mode in accordance with detecting the repetition of the first input while in the second mode.

25. The electronic device of claim 17, wherein displaying the application in the second mode comprises:
automatically displaying a blank area in a top area of the touch screen display above the bottom area displaying the application.

26. The electronic device of claim 17, wherein displaying the application in the second mode comprises:
automatically displaying an area of the application in a top area of the touch screen display above the bottom area displaying the application, the area of the application including a user interface element associated with displaying a notification view including one or more notifications for the user;
detecting a contact on the user interface element;
detecting continuous movement of the contact moving the user interface element in a direction of the continuous movement, the continuous movement having a vertical component;
in accordance with detecting the vertical component is less than a threshold distance:
determining a magnitude of the vertical component of the continuous movement; and
displaying a portion of the notification view in the top area of the touch screen display above the bottom area displaying the application in the second mode, wherein a height of the portion of the notification view is proportional to the determined magnitude of the vertical component; and
in accordance with the detecting the vertical component is greater than the threshold distance, displaying the notification view in its entirety.

27. The electronic device of claim 17, wherein displaying the application in the second mode comprises:
while the application is displayed in the second mode, automatically displaying an image of a home screen view of the electronic device in a top area of the touch screen display above the bottom area displaying the application.

28. The electronic device of claim 17, wherein the first mode of the application includes a toolbar of the application displayed in the bottom area of the touch screen display, the toolbar including a plurality of user interface elements each associated with a functionality of the application, and wherein displaying the application in the second mode comprises:
determining a view of the application displayed in the first mode with the first height, the view including a first portion displaying content of the application and a second portion displaying the toolbar of the application; and
shifting the view of the application in a vertical direction until the view is displayed in the bottom area of the touch screen display with the second height, the shifted view including the first portion displaying the content of the application and not including the second portion displaying the toolbar.

29. The electronic device of claim 17, wherein the first mode of the application includes a toolbar of the application displayed in the bottom area of the touch screen display, the toolbar including a plurality of user interface elements each associated with a functionality of the application, and wherein displaying the application in the second mode comprises:
determining a first view of the application associated with the application in the first mode, the first view including the first portion displaying content of the application and the second portion displaying the toolbar of the application; and determining a second view of the application associated with the application in the second mode, the second view including the first portion displaying content of the application resized in accordance with the second height and the second portion displaying the toolbar of the application resized in accordance with the second height.

30. The electronic device of claim 17, the one or more programs further including instructions for:
while the application is displayed in the second mode, determining an amount of time since an input to the application was last received; and
in accordance with determining that the amount of time exceeds a threshold, automatically switching from the second mode back to the first mode.

31. The electronic device of claim 17, wherein, after entering the second mode and prior to detecting the second input while in the second mode, the electronic device uses a first time threshold to determine whether to automatically switch back to the first mode, and the one or more programs further including instructions for:
after detecting the second input, using a second time threshold, different from the first time threshold to determine whether to automatically switch back to the first mode.

32. The electronic device of claim 17, the one or more programs further including instructions for:
receiving a request to prevent switching from the second mode back to the first mode;
locking the application in the second mode;
while the application is locked in the second mode, receiving an input to dismiss the application;
dismissing the application in accordance with the input to dismiss the application;
receiving an input to open the application; and
displaying the application in the second mode in accordance with the input to open the application.

33. A computer-implemented method comprising:
at an electronic device with a touch screen display:
displaying an application in a first mode, the application displayed with a first height while in the first mode, the application in the first mode including an icon;
while the application is displayed in the first mode, detecting a first input;
responsive to detecting the first input:
in accordance with a determination that the first input corresponds to activation of the icon: performing an operation associated with the icon without displaying the application in a second mode;
determining that the first input corresponds to a request to display the application in the second mode;
in accordance with the determination that the first input corresponds to the request to display the application in the second mode:
displaying the application in the second mode, wherein in the second mode the application is displayed in a bottom area of the touch screen display, the application displayed in the second mode with a second height that is less than the first height;
after detecting an end of the first input and while the application is displayed in the second mode:
detecting a second input corresponding to a navigation input at a location on the touch screen display that corresponds to the application and
responsive to detecting the second input on the touch screen display corresponding to the navigation input, scrolling within the application without switching back to the first mode;
after detecting an end of the first input and while the application is displayed in the second mode:
detecting a third input on a blank area of the display or on a background image of the display;
responsive to detecting the third input on the blank area of the display or on the background image of the display, switching from the second mode back to the first mode;
detecting a request to display the application in the second mode; and
after detecting an end of the first input and while the application is displayed in the second mode:
detecting a fourth input corresponding to an activation of the icon detected at a location on the touch screen display that corresponds to the application; and
responsive to detecting the fourth input corresponding to the activation of the icon detected at the location on the touch screen display that corresponds to the application, performing the operation and switching from the second mode back to the first mode.

34. The computer-implemented method of claim 33, wherein:
in the first mode, the application includes a user interface object that is outside of a reachable area of the touch screen display; and
in the second mode, the user interface object is within the reachable area of the touch screen display.

35. The computer-implemented method of claim 33, wherein in the first mode the application includes a user interface object located at a position greater than a predefined reach metric indicative that the user interface object is unreachable by a user's finger unless the electronic device is repositioned in the user's hand, and wherein in the second mode the user interface object is located at a position less than the predefined reach metric indicative that the user interface object is reachable by the user's finger without the electronic device being repositioned in the user's hand.

36. The computer-implemented method of claim 33, wherein the first mode comprises a full screen mode where the application occupies an entirety of the touch screen display excluding a region for a status bar of the electronic device and the application is displayed with the first height corresponding to a height of the touch screen display and a first width corresponding to a width of the touch screen display while in the full screen mode.

37. The computer-implemented method of claim 33, wherein the operation associated with the icon is a request to switch between different views of the application.

38. The computer-implemented method of claim 33, wherein detecting the first input comprises:
detecting a contact on the touch screen display at a first position adjacent to a vertical edge of the touch screen display; and
detecting a continuous movement of the contact to a second position adjacent to a horizontal edge of the touch screen display that intersects the vertical edge without the contact breaking contact with the touch screen display.

39. The computer-implemented method of claim 33, wherein detecting the first input comprises:
detecting a gesture on a button of the electronic device that corresponds to a request to display the application in the second mode, wherein a single press of the button is associated with performing a different function.

40. The computer-implemented method of claim 33, further comprising:
    while in the second mode, detecting a repetition of the first input that corresponds to the request to display the application in the second mode; and
    switching from the second mode back to the first mode in accordance with detecting the repetition of the first input while in the second mode.

41. The computer-implemented method of claim 33, wherein displaying the application in the second mode comprises:
    automatically displaying a blank area in a top area of the touch screen display above the bottom area displaying the application.

42. The computer-implemented method of claim 33, wherein displaying the application in the second mode comprises:
    automatically displaying an area of the application in a top area of the touch screen display above the bottom area displaying the application, the area of the application including a user interface element associated with displaying a notification view including one or more notifications for the user;
    detecting a contact on the user interface element;
    detecting continuous movement of the contact moving the user interface element in a direction of the continuous movement, the continuous movement having a vertical component;
    in accordance with detecting the vertical component is less than a threshold distance:
        determining a magnitude of the vertical component of the continuous movement; and
        displaying a portion of the notification view in the top area of the touch screen display above the bottom area displaying the application in the second mode, wherein a height of the portion of the notification view is proportional to the determined magnitude of the vertical component; and
    in accordance with the detecting the vertical component is greater than the threshold distance, displaying the notification view in its entirety.

43. The computer-implemented method of claim 33, wherein displaying the application in the second mode comprises:
    while the application is displayed in the second mode, automatically displaying an image of a home screen view of the electronic device in a top area of the touch screen display above the bottom area displaying the application.

44. The computer-implemented method of claim 33, wherein the first mode of the application includes a toolbar of the application displayed in the bottom area of the touch screen display, the toolbar including a plurality of user interface elements each associated with a functionality of the application, and wherein displaying the application in the second mode comprises:
    determining a view of the application displayed in the first mode with the first height, the view including a first portion displaying content of the application and a second portion displaying the toolbar of the application; and
    shifting the view of the application in a vertical direction until the view is displayed in the bottom area of the touch screen display with the second height, the shifted view including the first portion displaying the content of the application and not including the second portion displaying the toolbar.

45. The computer-implemented method of claim 33, wherein the first mode of the application includes a toolbar of the application displayed in the bottom area of the touch screen display, the toolbar including a plurality of user interface elements each associated with a functionality of the application, and wherein displaying the application in the second mode comprises:
    determining a first view of the application associated with the application in the first mode, the first view including the first portion displaying content of the application and the second portion displaying the toolbar of the application; and
    determining a second view of the application associated with the application in the second mode, the second view including the first portion displaying content of the application resized in accordance with the second height and the second portion displaying the toolbar of the application resized in accordance with the second height.

46. The computer-implemented method of claim 33, further comprising:
    while the application is displayed in the second mode, determining an amount of time since an input to the application was last received; and
    in accordance with determining that the amount of time exceeds a threshold, automatically switching from the second mode back to the first mode.

47. The computer-implemented method of claim 33, wherein, after entering the second mode and prior to detecting the second input while in the second mode, the electronic device uses a first time threshold to determine whether to automatically switch back to the first mode, and further comprising:
    after detecting the second input, using a second time threshold, different from the first time threshold to determine whether to automatically switch back to the first mode.

48. The computer-implemented method of claim 33, further comprising:
    receiving a request to prevent switching from the second mode back to the first mode;
    locking the application in the second mode;
    while the application is locked in the second mode, receiving an input to dismiss the application;
    dismissing the application in accordance with the input to dismiss the application;
    receiving an input to open the application; and
    displaying the application in the second mode in accordance with the input to open the application.

* * * * *